US012410872B2

(12) United States Patent
Krosschell et al.

(10) Patent No.: US 12,410,872 B2
(45) Date of Patent: Sep. 9, 2025

(54) VALVE PRIMING AND DEPRIMING

(71) Applicant: Raven Industries, Inc., Sioux Falls, SD (US)

(72) Inventors: Justin Krosschell, Sioux Falls, SD (US); Travis Allen Burgers, Sioux Falls, SD (US); Drew John Waltner, Freeman, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 401 days.

(21) Appl. No.: 18/052,758

(22) Filed: Nov. 4, 2022

(65) Prior Publication Data

US 2023/0141867 A1    May 11, 2023

Related U.S. Application Data

(60) Provisional application No. 63/276,144, filed on Nov. 5, 2021.

(51) Int. Cl.
| | | |
|---|---|---|
| *F16K 37/00* | (2006.01) | |
| *A01C 23/00* | (2006.01) | |
| *A01C 23/04* | (2006.01) | |
| *A01G 25/09* | (2006.01) | |
| *A01G 25/16* | (2006.01) | |
| *A01M 7/00* | (2006.01) | |

(Continued)

(52) U.S. Cl.
CPC ........ *F16K 37/0041* (2013.01); *A01C 23/007* (2013.01); *A01C 23/047* (2013.01); *A01G 25/09* (2013.01); *A01G 25/16* (2013.01); *A01M 7/0042* (2013.01); *A01M 7/0089* (2013.01); *B05B 1/1609* (2013.01); *F16K 31/0655* (2013.01)

(58) Field of Classification Search
USPC .......... 137/554; 251/129.04, 129.15; 239/69, 239/73, 769, 159, 443; 700/283, 284
See application file for complete search history.

(56) References Cited

U.S. PATENT DOCUMENTS

| | | |
|---|---|---|
| 1,582,986 A | 5/1926 | Frank |
| 3,197,299 A | 7/1965 | Bosse et al. |
| | (Continued) | |

FOREIGN PATENT DOCUMENTS

| | | |
|---|---|---|
| AU | 725448 | 10/2000 |
| AU | 2004219715 | 9/2004 |
| | (Continued) | |

OTHER PUBLICATIONS

"European Application Serial No. 20872967.3, Extended European Search Report mailed Sep. 29, 2023", 9 pgs.

(Continued)

*Primary Examiner* — Matthew W Jellett
(74) *Attorney, Agent, or Firm* — Schwegman Lundberg & Woessner, P.A.

(57) ABSTRACT

A system for applying an agricultural product includes at least one control valve. For instance, the control valve has a moveable valve operator. One or more sensors monitor one or more control valve characteristics. A valve controller is configured to determine the control valve is in one or more of a primed state or an unprimed state based on a comparison of the one or more control valve characteristics to a primed valve characteristic threshold.

31 Claims, 14 Drawing Sheets

(51) Int. Cl.
    *B05B 1/16*     (2006.01)
    *F16K 31/06*     (2006.01)

(56) References Cited

U.S. PATENT DOCUMENTS

| | | |
|---|---|---|
| 3,770,198 A | 11/1973 | Mihara |
| 3,955,795 A | 5/1976 | Neely |
| 4,283,010 A | 8/1981 | Arzi et al. |
| 4,392,611 A | 7/1983 | Bachman et al. |
| 4,398,605 A | 8/1983 | Conklin et al. |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 4,970,973 A | 11/1990 | Lyle et al. |
| 5,134,961 A | 8/1992 | Giles et al. |
| 5,285,814 A | 2/1994 | Pettersson et al. |
| 5,310,113 A | 5/1994 | Cowgur |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,520,333 A | 5/1996 | Tofte |
| 5,615,836 A | 4/1997 | Graef |
| 5,635,911 A | 6/1997 | Landers et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,785,246 A | 7/1998 | King et al. |
| 5,801,948 A | 9/1998 | Wood et al. |
| 5,864,781 A | 1/1999 | White |
| 5,881,919 A | 3/1999 | Womac et al. |
| 5,883,383 A | 3/1999 | Dragne |
| 5,884,205 A | 3/1999 | Elmore et al. |
| 5,884,224 A | 3/1999 | McNabb et al. |
| 5,897,600 A | 4/1999 | Elmore et al. |
| 5,911,362 A | 6/1999 | Wood et al. |
| 5,913,915 A | 6/1999 | McQuinn |
| 5,919,242 A | 7/1999 | Greatline et al. |
| 5,924,371 A | 7/1999 | Flamme et al. |
| 5,931,882 A | 8/1999 | Fick et al. |
| 5,936,234 A | 8/1999 | Thomas et al. |
| 5,938,071 A | 8/1999 | Sauder |
| 5,941,303 A | 8/1999 | Gowan et al. |
| 5,967,066 A | 10/1999 | Giles et al. |
| 5,969,340 A | 10/1999 | Dragne et al. |
| 5,971,294 A | 10/1999 | Thompson et al. |
| 5,978,723 A | 11/1999 | Hale et al. |
| 6,009,354 A | 12/1999 | Flamme et al. |
| 6,012,996 A | 1/2000 | Lo |
| 6,029,907 A | 2/2000 | McKenzie |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,089,743 A | 7/2000 | Mcquinn et al. |
| 6,093,926 A | 7/2000 | Mertins et al. |
| 6,112,999 A | 9/2000 | Fingleton et al. |
| 6,122,581 A | 9/2000 | McQuinn |
| 6,145,455 A | 11/2000 | Gust et al. |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,196,473 B1 | 3/2001 | Beeren et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,240,861 B1 | 6/2001 | Memory |
| 6,250,564 B1 | 6/2001 | Chahley |
| 6,269,757 B1 | 8/2001 | Kiest |
| 6,276,385 B1 * | 8/2001 | Gassman .............. G05B 19/19 137/554 |
| 6,285,938 B1 | 9/2001 | Lang et al. |
| 6,305,583 B1 | 10/2001 | Ward et al. |
| 6,373,057 B1 | 4/2002 | Penfold |
| 6,486,761 B1 | 11/2002 | Czarnetzki et al. |
| 6,522,948 B1 | 2/2003 | Benneweis |
| 6,533,334 B1 | 3/2003 | Bonn |
| 6,584,920 B1 | 7/2003 | Cresswell |
| 6,598,944 B1 | 7/2003 | Wolff et al. |
| 6,606,542 B2 | 8/2003 | Hauwiller et al. |
| 6,661,514 B1 | 12/2003 | Tevs et al. |
| 6,666,384 B2 | 12/2003 | Prandi |
| 6,678,580 B2 | 1/2004 | Benneweis |
| 6,698,368 B2 | 3/2004 | Cresswell |
| 6,708,080 B2 | 3/2004 | Benneweis |
| 6,720,684 B2 | 4/2004 | Czimmek |
| 6,755,390 B2 | 6/2004 | Masuda et al. |
| 6,776,355 B2 | 8/2004 | Ringer et al. |
| 6,851,377 B2 | 2/2005 | Mayerle et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,147,241 B2 | 12/2006 | Beaujot et al. |
| 7,152,540 B1 | 12/2006 | Sauder et al. |
| 7,156,322 B1 | 1/2007 | Heitzman et al. |
| 7,162,961 B2 | 1/2007 | Grimm |
| 7,195,027 B2 | 3/2007 | Goossens et al. |
| 7,243,899 B2 | 7/2007 | Acar et al. |
| 7,311,004 B2 | 12/2007 | Giles |
| 7,347,221 B2 | 3/2008 | Berger et al. |
| 7,395,769 B2 | 7/2008 | Jensen |
| 7,441,746 B2 | 10/2008 | Sugiyama |
| 7,472,660 B2 | 1/2009 | Mariman et al. |
| 7,478,603 B2 | 1/2009 | Riewerts et al. |
| 7,490,564 B2 | 2/2009 | Allan et al. |
| 7,502,665 B2 | 3/2009 | Giles et al. |
| 7,626,288 B2 | 12/2009 | Protze |
| 7,654,473 B2 | 2/2010 | Hibberd |
| 7,685,951 B2 | 3/2010 | Beaujot et al. |
| 7,690,440 B2 | 4/2010 | Dean et al. |
| 7,694,638 B1 | 4/2010 | Riewerts et al. |
| 7,706,926 B2 | 4/2010 | Peterson |
| 7,742,842 B2 | 6/2010 | Giles et al. |
| 7,789,321 B2 | 9/2010 | Hitt |
| 7,826,930 B2 | 11/2010 | Giles et al. |
| 7,845,914 B2 | 12/2010 | Engelbrecht et al. |
| 7,848,865 B2 | 12/2010 | Di Federico et al. |
| 7,917,249 B2 | 3/2011 | Jacobsen et al. |
| 7,954,731 B2 | 6/2011 | Antonucci et al. |
| 8,078,367 B2 | 12/2011 | Sauder et al. |
| 8,109,448 B2 | 2/2012 | Giles |
| 8,141,504 B2 | 3/2012 | Dean et al. |
| 8,170,825 B2 | 5/2012 | Beaujot et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,196,534 B2 | 6/2012 | Meyer et al. |
| 8,214,111 B2 | 7/2012 | Heiniger et al. |
| 8,246,004 B2 | 8/2012 | Kratzer |
| 8,401,704 B2 | 3/2013 | Pollock et al. |
| 8,488,874 B2 | 7/2013 | Zaman et al. |
| 8,505,573 B2 * | 8/2013 | Herbert .............. F16K 31/0672 137/554 |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,733,257 B2 | 5/2014 | Beaujot et al. |
| 8,733,259 B2 | 5/2014 | Beaujot |
| 8,739,830 B2 | 6/2014 | Bradbury et al. |
| 8,825,310 B2 | 9/2014 | Kowalchuk |
| 8,844,838 B2 | 9/2014 | Funseth et al. |
| 8,868,300 B2 | 10/2014 | Kocer et al. |
| 8,915,200 B2 | 12/2014 | Barsi et al. |

(56) References Cited

U.S. PATENT DOCUMENTS

| | | |
|---|---|---|
| 8,919,676 B2 | 12/2014 | Funseth et al. |
| 9,052,031 B2 | 6/2015 | Leidig |
| 9,061,296 B2 | 6/2015 | Peterson |
| 9,073,070 B2 | 7/2015 | Funseth et al. |
| 9,080,684 B2 | 7/2015 | Stahr |
| 9,113,591 B2 | 8/2015 | Shivak |
| 9,144,190 B2 | 9/2015 | Henry et al. |
| 9,266,124 B2 | 2/2016 | Humpal |
| 9,453,585 B2 | 9/2016 | Sato et al. |
| 9,470,332 B2 | 10/2016 | Miura |
| 9,504,212 B2 | 11/2016 | Michael et al. |
| 9,506,578 B2 | 11/2016 | Lee |
| 9,635,848 B2 | 5/2017 | Needham et al. |
| 9,702,475 B2 | 7/2017 | Scheffel et al. |
| 9,781,916 B2 | 10/2017 | Preheim et al. |
| 9,894,829 B2 | 2/2018 | Shivak |
| 10,058,879 B2 | 8/2018 | Needham |
| 10,173,236 B2 | 1/2019 | Preheim et al. |
| 10,189,031 B2 | 1/2019 | Funseth et al. |
| 10,368,538 B2 | 8/2019 | Preheim et al. |
| 10,518,284 B2 | 12/2019 | Thurow et al. |
| 10,568,257 B2 | 2/2020 | Shivak |
| 10,799,898 B2 | 10/2020 | Posselius et al. |
| 10,821,460 B2 | 11/2020 | Batcheller et al. |
| 11,051,505 B2 | 7/2021 | Humpal et al. |
| 11,071,247 B2 | 7/2021 | Shivak et al. |
| 11,134,668 B2 | 10/2021 | Preheim et al. |
| 11,160,204 B2 | 11/2021 | Michael |
| 11,236,841 B2 | 2/2022 | Krosschell et al. |
| 11,261,998 B2 * | 3/2022 | Bodenschatz ......... H01F 7/1844 |
| 11,309,112 B2 * | 4/2022 | Katagiri ................. H01F 7/064 |
| 11,396,892 B2 | 7/2022 | Long et al. |
| 11,612,160 B2 | 3/2023 | Krosschell et al. |
| 11,944,046 B2 | 4/2024 | Wonderlich et al. |
| 12,055,234 B2 | 8/2024 | Krosschell et al. |
| 12,274,260 B2 | 4/2025 | Long et al. |
| 2002/0030119 A1 | 3/2002 | Proharam |
| 2002/0107609 A1 | 8/2002 | Benneweis |
| 2003/0028321 A1 | 2/2003 | Upadhyaya et al. |
| 2003/0070597 A1 | 4/2003 | Cresswell |
| 2003/0234301 A1 | 12/2003 | Swan |
| 2004/0036048 A1 | 2/2004 | Petersen |
| 2004/0104370 A1 | 6/2004 | Suzuki |
| 2004/0128045 A1 | 7/2004 | Benneweis |
| 2005/0000277 A1 | 1/2005 | Giles |
| 2005/0048196 A1 | 3/2005 | Yanagita et al. |
| 2005/0051749 A1 | 3/2005 | Lee |
| 2005/0076818 A1 | 4/2005 | Grimm |
| 2005/0092951 A1 | 5/2005 | Groetzinger |
| 2005/0125083 A1 | 6/2005 | Kiko |
| 2005/0173979 A1 | 8/2005 | Voss |
| 2006/0086295 A1 | 4/2006 | Jensen |
| 2006/0097210 A1 | 5/2006 | Fong et al. |
| 2006/0237562 A1 | 10/2006 | Hedegard |
| 2006/0265106 A1 | 11/2006 | Giles et al. |
| 2006/0273189 A1 | 12/2006 | Grimm et al. |
| 2007/0039880 A1 | 2/2007 | Mayerle |
| 2008/0110476 A1 | 5/2008 | Amestoy et al. |
| 2008/0114497 A1 | 5/2008 | Giles et al. |
| 2008/0114498 A1 | 5/2008 | Giles |
| 2008/0147282 A1 | 6/2008 | Kormann |
| 2008/0163807 A1 | 7/2008 | Dean et al. |
| 2008/0230624 A1 | 9/2008 | Giles et al. |
| 2008/0283633 A1 | 11/2008 | Nozaki et al. |
| 2008/0296398 A1 | 12/2008 | Hickman et al. |
| 2009/0078178 A1 | 3/2009 | Beaujot |
| 2009/0101371 A1 | 4/2009 | Melanson et al. |
| 2009/0112372 A1 | 4/2009 | Peterson |
| 2009/0114210 A1 | 5/2009 | Guice et al. |
| 2009/0134237 A1 | 5/2009 | Giles |
| 2009/0184182 A1 | 7/2009 | Beeren |
| 2009/0271136 A1 | 10/2009 | Beaujot et al. |
| 2010/0032492 A1 | 2/2010 | Grimm et al. |
| 2010/0096476 A1 | 4/2010 | Callies et al. |
| 2010/0101469 A1 | 4/2010 | Landphair et al. |
| 2010/0132600 A1 | 6/2010 | Dean et al. |
| 2010/0163774 A1 | 7/2010 | Rimboym et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2011/0210186 A1 | 9/2011 | Kugler et al. |
| 2012/0045013 A1 | 2/2012 | Chen et al. |
| 2012/0080624 A1 | 4/2012 | Stahr et al. |
| 2012/0153051 A1 | 6/2012 | Kah, Jr. et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0241533 A1 | 9/2012 | Moeller et al. |
| 2012/0271467 A1 | 10/2012 | Grimm et al. |
| 2013/0032737 A1 | 2/2013 | Neilson et al. |
| 2013/0037633 A1 | 2/2013 | Walter et al. |
| 2013/0092746 A1 | 4/2013 | Scott et al. |
| 2013/0119154 A1 | 5/2013 | Sawyer |
| 2013/0192503 A1 | 8/2013 | Henry et al. |
| 2013/0269578 A1 | 10/2013 | Grimm |
| 2013/0292590 A1 | 11/2013 | Stahr |
| 2013/0306894 A1 | 11/2013 | Weis et al. |
| 2013/0320105 A1 | 12/2013 | Schmidt |
| 2013/0320106 A1 | 12/2013 | Schmidt |
| 2013/0333601 A1 | 12/2013 | Shivak |
| 2014/0014863 A1 | 1/2014 | Najmolhoda et al. |
| 2014/0026995 A1 | 1/2014 | Mayr et al. |
| 2014/0048002 A1 | 2/2014 | Grimm et al. |
| 2014/0084196 A1 | 3/2014 | Heyer et al. |
| 2014/0091243 A1 | 4/2014 | Leidig |
| 2014/0216315 A1 | 8/2014 | Beaujot et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0312141 A1 | 10/2014 | Ravishankar |
| 2014/0333398 A1 | 11/2014 | Nila et al. |
| 2014/0361094 A1 | 12/2014 | Michael |
| 2015/0115058 A1 | 4/2015 | Wilger |
| 2015/0167861 A1 * | 6/2015 | Ferrer Herrera ....... A01G 25/16 137/554 |
| 2015/0257331 A1 | 9/2015 | Shivak |
| 2015/0336116 A1 | 11/2015 | Gerdes |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0050206 A1 | 2/2017 | Bullock et al. |
| 2017/0079200 A1 | 3/2017 | Posselius et al. |
| 2017/0120263 A1 | 5/2017 | Needham |
| 2017/0251656 A1 | 9/2017 | Kolb et al. |
| 2017/0284285 A1 | 10/2017 | Lenk et al. |
| 2017/0314580 A1 | 11/2017 | Steensma et al. |
| 2017/0348718 A1 | 12/2017 | Preheim et al. |
| 2018/0042214 A1 | 2/2018 | Preheim et al. |
| 2018/0111148 A1 | 4/2018 | Batcheller et al. |
| 2018/0288934 A1 | 10/2018 | Shivak |
| 2019/0029170 A1 | 1/2019 | Wilger |
| 2019/0040972 A1 | 2/2019 | Schrader |
| 2019/0047694 A1 | 2/2019 | Zivan et al. |
| 2019/0321844 A1 | 10/2019 | Schrader et al. |

(56) References Cited

U.S. PATENT DOCUMENTS

| | | |
|---|---|---|
| 2019/0350187 A1 | 11/2019 | Kocer et al. |
| 2019/0373880 A1 | 12/2019 | Kocer et al. |
| 2020/0037519 A1 | 2/2020 | Wonderlich et al. |
| 2020/0101480 A1 | 4/2020 | Schrader et al. |
| 2020/0107538 A1 | 4/2020 | Preheim et al. |
| 2020/0113170 A1 | 4/2020 | Davis et al. |
| 2020/0113171 A1 | 4/2020 | Davis et al. |
| 2020/0214193 A1 | 7/2020 | Shivak |
| 2020/0217894 A1* | 7/2020 | Ferrarini ............... F16K 11/044 |
| 2020/0253111 A1 | 8/2020 | Schlipf et al. |
| 2020/0406281 A1 | 12/2020 | Funseth et al. |
| 2021/0000006 A1 | 1/2021 | Ellaboudy et al. |
| 2021/0102637 A1 | 4/2021 | Krosschell et al. |
| 2021/0144906 A1 | 5/2021 | Shivak et al. |
| 2021/0219538 A1 | 7/2021 | Krosschell et al. |
| 2021/0282315 A1 | 9/2021 | Charcosset |
| 2021/0289693 A1 | 9/2021 | Harmon et al. |
| 2021/0400946 A1 | 12/2021 | Burgers et al. |
| 2022/0079132 A1 | 3/2022 | Preheim et al. |
| 2022/0099213 A1 | 3/2022 | Krosschell et al. |
| 2023/0329220 A1 | 10/2023 | Krosschell et al. |
| 2023/0356248 A1 | 11/2023 | Krosschell et al. |
| 2024/0418289 A1 | 12/2024 | Krosschell et al. |

FOREIGN PATENT DOCUMENTS

| | | |
|---|---|---|
| AU | 2005247004 | 12/2006 |
| AU | 2006202376 B2 | 12/2006 |
| AU | 2009203181 A1 | 2/2010 |
| AU | 2012201357 A1 | 9/2012 |
| AU | 2013203361 A1 | 10/2013 |
| AU | 2013204455 A1 | 3/2014 |
| AU | 2013248190 | 5/2014 |
| AU | 2013277513 B2 | 3/2017 |
| AU | 2015204319 B2 | 4/2019 |
| AU | 2017285727 B2 | 7/2020 |
| AU | 2020357581 | 8/2023 |
| AU | 2023214344 | 8/2023 |
| CA | 2229852 A1 | 8/1998 |
| CA | 2517031 A1 | 9/2004 |
| CA | 2528708 A1 | 11/2006 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CA | 2830306 | 4/2014 |
| CA | 2926448 A1 | 4/2015 |
| CA | 2926448 C | 9/2020 |
| CN | 102435019 A | 5/2012 |
| CN | 202255911 U | 5/2012 |
| CN | 102266829 B | 12/2012 |
| CN | 203264929 U | 11/2013 |
| DE | 102011053182 | 3/2013 |
| DE | 112017003084 T5 | 6/2019 |
| EP | 0576121 B1 | 3/1996 |
| EP | 969712 | 1/2000 |
| EP | 0963255 B1 | 10/2002 |
| EP | 0847307 B2 | 1/2003 |
| EP | 1426112 B1 | 6/2011 |
| FR | 2964047 A1 | 3/2012 |
| GB | 990346 A | 4/1965 |
| GB | 2322573 A | 9/1998 |
| JP | 2759711 B2 | 5/1998 |
| JP | 2000139245 A | 5/2000 |
| JP | 2005161221 A | 6/2005 |
| WO | WO-9712388 A1 | 4/1997 |
| WO | WO-1997012688 A1 | 4/1997 |
| WO | WO-98037751 | 9/1998 |
| WO | WO-9842178 A1 | 10/1998 |
| WO | WO-9916007 A1 | 4/1999 |
| WO | WO-2004023865 | 3/2004 |
| WO | WO-2004081499 | 9/2004 |
| WO | WO-2005048704 A2 | 6/2005 |
| WO | WO-2008059984 A1 | 5/2008 |
| WO | WO-2008112930 A1 | 9/2008 |
| WO | WO-2010105221 A1 | 9/2010 |
| WO | WO-2012022903 A1 | 2/2012 |
| WO | WO-2013135430 A1 | 9/2013 |
| WO | WO-2013191990 A2 | 12/2013 |
| WO | WO-2013191990 A3 | 12/2013 |
| WO | WO-2014201008 A1 | 12/2014 |
| WO | WO-2014210043 A1 | 12/2014 |
| WO | WO-2015058091 A1 | 4/2015 |
| WO | WO-2016145081 A2 | 9/2016 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |
| WO | WO-2021066962 A1 | 4/2021 |
| WO | WO-2021263024 A1 | 12/2021 |
| WO | WO-2022216285 A1 | 10/2022 |
| WO | WO-2023081371 A1 | 5/2023 |
| WO | 2023215178 | 11/2023 |

OTHER PUBLICATIONS

"U.S. Appl. No. 17/465,644, Restriction Requirement mailed Oct. 13, 2023", 6 pgs.

"International Application Serial No. PCT US2021 026252, International Preliminary Report on Patentability mailed Oct. 19, 2023", 6 pgs.

"U.S. Appl. No. 17/465,644, Response filed Dec. 13, 2023 to Restriction Requirement mailed Oct. 13, 2023", 11 pgs.

"U.S. Appl. No. 17/465,644, Notice of Allowance mailed Mar. 21, 2024", 12 pgs.

"Agrifac Pulse-width modulation (PWM) spraying", (c) 2021 Agrifac Machinery B.V. [online]. [archived Jan. 16, 2021]. Retrieved from the Internet: <URL: https://web.archive.org/web/20210116150413/ https://www.agrifac.com/optional-spray-technology/strictsprayplus/ >, (Jan. 16, 2021), 15 pgs.

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

"U.S. Appl. No. 13/776,285, Notice of Allowance mailed Jan. 27, 2015", 5 pgs.

"U.S. Appl. No. 13/776,285, Notice of Allowance mailed May 4, 2015", 6 pgs.

"U.S. Appl. No. 13/776,285, Response filed Dec. 30, 2014 to Non Final Office Action mailed Jul. 30, 2014", 25 pgs.

"U.S. Appl. No. 13/832,678, Advisory Action mailed Jun. 3, 2016", 3 pgs.

"U.S. Appl. No. 13/832,678, Final Office Action mailed Mar. 17, 2016", 12 pgs.

"U.S. Appl. No. 13/832,678, Non Final Office Action mailed Oct. 1, 2015", 15 pgs.

"U.S. Appl. No. 13/832,678, Notice of Allowance mailed Jul. 20, 2016", 13 pgs.

"U.S. Appl. No. 13/832,678, Response filed May 12, 2016 to Final Office Action mailed Mar. 17, 2016", 10 pgs.

"U.S. Appl. No. 13/832,678, Response filed Jul. 27, 2015 to Restriction Requirement mailed Jun. 9, 2015", 7 pgs.

"U.S. Appl. No. 13/832,678, Response filed Dec. 31, 2015 to Non Final Office Action mailed Oct. 1, 2015", 10 pgs.

"U.S. Appl. No. 13/832,678, Restriction Requirement mailed Jun. 9, 2015", 7 pgs.

"U.S. Appl. No. 13/832,735, Final Office Action mailed Aug. 5, 2016", 29 pgs.

"U.S. Appl. No. 13/832,735, Non Final Office Action mailed Feb. 19, 2016", 26 pgs.

"U.S. Appl. No. 13/832,735, Non Final Office Action mailed Jul. 15, 2015", 22 pgs.

"U.S. Appl. No. 13/832,735, Response filed May 19, 2016 to Non Final Office Action mailed Feb. 19, 2016", 13 pgs.

"U.S. Appl. No. 13/832,735, Response filed Nov. 16, 2015 to Non-Final Office Action mailed Jul. 15, 2015", 16 pgs.

(56) References Cited

OTHER PUBLICATIONS

"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action mailed May 24, 2018", 16 pgs.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", (9 pgs).
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.
"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action mailed Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.
"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action mailed Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response filed Nov. 13, 2018 to Examiner's Reasons for Allowance mailed May 3, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.
"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Examiner Interview Summary mailed Apr. 15, 2022", 2 pgs.
"U.S. Appl. No. 16/476,016, Examiner Interview Summary mailed Oct. 4, 2022", 2 pgs.
"U.S. Appl. No. 16/476,016, Final Office Action mailed Jan. 11, 2022", 15 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Preliminary Amendment filed Jul. 3, 2019", 12 pgs.

(56) References Cited

OTHER PUBLICATIONS

"U.S. Appl. No. 16/476,016, Response filed Apr. 11, 2022 to Final Office Action mailed Jan. 11, 2022", 18 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Oct. 24, 2022 to Non Final Office Action mailed Jun. 24, 2022", 22 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/476,069, Examiner Interview Summary mailed Mar. 18, 2022", 2 pgs.
"U.S. Appl. No. 16/476,069, Examiner Interview Summary mailed U.S. Appl. No. 16/476,069, Examiner Interview Summary mailed Oct. 28, 2022", 2 pgs.
"U.S. Appl. No. 16/476,069, Final Office Action mailed Jul. 25, 2022", 13 pgs.
"U.S. Appl. No. 16/476,069, Non Final Office Action mailed Nov. 12, 2021", 13 pgs.
"U.S. Appl. No. 16/476,069, Preliminary Amendment filed Jul. 3, 2019", 13 pgs.
"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Response filed Oct. 25, 2022 to Final Office Action mailed Jul. 25, 2022", 13 pgs.
"U.S. Appl. No. 16/476,069, Restriction Requirement mailed May 3, 2021", 9 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Preliminary Amendment filed Jan. 28, 2021", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.
"U.S. Appl. No. 17/410,852, Preliminary Amendment filed Dec. 10, 2021", 8 pgs.
"U.S. Appl. No. 17/465,644, Preliminary Amendment filed Dec. 17, 2021", 11 pgs.
"U.S. Appl. No. 17/504,601, Preliminary Amendment filed Dec. 22, 2021", 7 pgs.
"U.S. Appl. No. 17/809,223, Preliminary Amendment filed Nov. 3, 2022", 7 pgs.
"U.S. Appl. No. 18/140,491, Preliminary Amendment filed May 3, 2023", 15 pgs.
"U.S. Appl. No. 18/164,321, Preliminary Amendment filed Jul. 7, 2023", 7 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023", 2 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", W/ English Translation, 6 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Jul. 4, 2022 Opinion for non- patentability (RPI 7.1) mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Voluntary Amendment filed Jun. 22, 2020", (w/ English Translation), 44 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Apr. 8, 2021 to Office Action mailed Dec. 9, 2020", 16 pgs.
"Canadian Application Serial No. 2,877,195, Response filed Dec. 18, 2019 to Office Action mailed Jun. 18, 2019", 10 pgs.

(56) References Cited

OTHER PUBLICATIONS

"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23,, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communication pursuant to Rules 161(2) and 162 EPC mailed Aug. 13, 2019", 16 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response to Communication Pursuant to Rules 161(2) and 162 EPC filed Feb. 28, 2020", 14 pgs.
"European Application Serial No. 20872967.3, Response to Communication Pursuant to Rules 161 and 162 EPC filed Nov. 17, 2022", 9 pgs.
"German Application Serial No. 11 2017 003 084.6, Office Action mailed Feb. 5, 2019", (w/ English Translation), 5 pgs,.
"German Application Serial No. 11 2017 003 084.6, Response filed May 8, 2019 to Office Action mailed Feb. 5, 2019", (w/ Concise Statement of Relevance), 17 pgs.
"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.

(56) References Cited

OTHER PUBLICATIONS

"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Preliminary Report on Patentability mailed Apr. 14, 2022", 6 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"International Application Serial No. PCT/US2022/048981, International Search Report mailed Apr. 13, 2023", 6 pgs.
"International Application Serial No. PCT/US2022/048981, Invitation to Pay Additional Fees mailed Jan. 19, 2023", 5 pgs.
"International Application Serial No. PCT/US2022/048981, Written Opinion mailed Apr. 13, 2023", 18 pgs.
"International Application Serial No. PCT/US2023/020275, International Search Report mailed Jul. 26, 2023", 2 pgs.
"International Application Serial No. PCT/US2023/020275, Written Opinion mailed Jul. 26, 2023", 12 pgs.
"Wilger 2019-20 Manufacturer's Suggested Retail Price List", (Revised Sep. 1, 2019), 20 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization a Nonpesticidal Method for Controlling Diseases, Nematodes, and Weeds", University of California Division of Agriculture and Natural Resources Publication 21377, (1997), 1-17.
Luck, et al., "A Case Study Concerning the Effects of Controller Response and Turning Movements on Application Rate Uniformity With a Self-Propelled Sprayer", Biological Systems Engineering, University of Nebraska, [Online]. Retrieved from the Internet: <https://elibrary.asabe.org/abstract.asp?aid=36445>, (Dec. 12, 2011), 10 pgs.
Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.
"International Application Serial No. PCT US2022 048981, International Preliminary Report on Patentability mailed May 16, 2024", 20 pgs.
"U.S. Appl. No. 18/164,321, Non Final Office Action mailed Jun. 4, 2024", 7 pgs.
"U.S. Appl. No. 17/465,644, Supplemental Notice of Allowability mailed Jun. 27, 2024", 2 pgs.
"Brazilian Application Serial No. BR112022006486-1, Office Action mailed Jul. 13, 2024", w English translation, 9 pgs.
"International Application Serial No. PCT US2023 020275, International Preliminary Report on Patentability mailed Aug. 29, 2024", 10 pgs.
"U.S. Appl. No. 18/750,201, Preliminary Amendment filed Sep. 5, 2024", 12 pgs.
"Australian Application Serial No. 2023214344, First Examination Report mailed Sep. 9, 2024", 2 pgs.
"Australian Application Serial No. 2021439481, First Examination Report mailed Sep. 19, 2024", 3 pgs.
"Brazil Application Serial No. BR112022006486-1, Response filed Oct. 25, 2024 to Office Action mailed Jul. 13, 2024", w English Claims, 227 pgs.
"U.S. Appl. No. 18/164,321, Response Filed Nov. 4, 2024 to Non Final Office Action mailed Jun. 4, 2024", 17 pgs.
"U.S. Appl. No. 18/164,321, Final Office Action mailed Nov. 20, 2024", 7 pgs.
"European Application Serial No. 22890829.9, Response to Communication pursuant to Rules 161(1) and 162 EPC filed Dec. 12, 2024", 22 pgs.
"European Application Serial No. 21936210.0, Extended European Search Report mailed Dec. 18, 2024", 11 pgs.
"Canadian Application Serial No. 3,214,361, Office Action mailed Jan. 28, 2025", 6 pgs.
"Australian Application Serial No. 2022382950, First Examination Report mailed Mar. 14, 2025", 3 pgs.
U.S. Appl. No. 17/001,539 U.S. Pat. No. 11,236,841, filed Aug. 24, 2020, Valve Control System and Method.
U.S. Appl. No. 17/465,644, filed Sep. 2, 2021, Valve Control System and Method.
U.S. Appl. No. 17/224,955 U.S. Pat. No. 11,612,160, filed Apr. 7, 2021, Valve Control System and Method.
U.S. Appl. No. 18/164,321, filed Feb. 3, 2023, Valve Control System and Method.
U.S. Appl. No. 18/140,491, filed Apr. 27, 2023, Valve Control Systems and Methods.
"U.S. Appl. No. 18/164,321, Response filed May 7, 2025 to Final Office Action mailed Nov. 20, 2024", 9 pgs.
"U.S. Appl. No. 18/140,491, Non Final Office Action mailed Jul. 28, 2025", 44 pgs.
"U.S. Appl. No. 18/164,321, Notice of Allowance mailed May 15, 2025", 5 pgs.
"U.S. Appl. No. 18/164,321, Notice of Allowance mailed Jun. 25, 2025", 9 pgs.
"U.S. Appl. No. 18/164,321, PTO Response to Rule 312 Communication mailed Jul. 15, 2025", 2 pgs.
"Australian Application Serial No. 2023214344, Response filed Jun. 18, 2025 to First Examination Report mailed Sep. 9, 2024", 154 pgs.
"Canadian Application Serial No. 3,214,361, Response filed May 23, 2025 to Office Action mailed Jan. 28, 2025", 94 pgs.
"European Application Serial No. 21936210.0, Response filed Jul. 10, 2025 to Extended European Search Report mailed Dec. 18, 2024", w/ English Claims, 47 pgs.
"European Application Serial No. 23799847.1, Response to Communication Pursuant to Rules 161 and 162 EPC filed Jun. 5, 2025", 22 pgs.

\* cited by examiner

VALVE PRIMING AND DEPRIMING

CLAIM OF PRIORITY

This patent application claims the benefit of priority of [Lead Inventor Name] U.S. Provisional Patent Application Ser. No. 63/276,144, entitled "VALVE PRIMING AND DEPRIMING," filed on Nov. 5, 2021, which is hereby incorporated by reference herein in its entirety.

TECHNICAL FIELD

This document pertains generally, but not by way of limitation, to agricultural equipment.

BACKGROUND

In an example, an agricultural product (e.g., fertilizer, water, pesticides, or the like) is applied to a field (e.g., croplands, farmland, or the like). For instance, a sprayer includes one or more nozzles, and the nozzles discharge the agricultural product from the sprayer. Optionally, the sprayer includes one or more valves that facilitate flow through the nozzles. In one example, the control valve includes a solenoid-operated valve that is a normally-closed-valve (e.g., an NCV, or the like). For example, the solenoid-operated valve is biased closed, and thereby inhibits flow through the valve. Application of current to the solenoid-operated valves energizes the solenoid, and accordingly overcomes the bias of the valve to open the valve. For instance, current is selectively supplied to the solenoid-operated valves, and the valves are modulated according to a specified duty cycle. In another example, the valves are primed with an agricultural product, for instance to displace air from the valves. For example, the valves are opened until agricultural product is discharged from at least one of the nozzles.

SUMMARY

In an example, an agricultural sprayer applies an agricultural product to plants (e.g., vegetables, fruits, crops, weeds or the like). In an example, the agricultural product is delivered to one or more control valves of the sprayer. For instance, the control valves are included in the agricultural sprayer, such as a sprayer coupled with a prime mover (e.g., a tractor, truck, or the like). In some examples, the one or more valves are normally-closed (e.g., an NCV, or the like) solenoid-operated valves, and the valves are biased closed. For instance, a first valve includes a solenoid having a coil, and the solenoid generates a magnetic flux when powered. The magnetic flux moves a valve operator of the valve with respect to the coil. Movement of the valve operator selectively permits (or inhibits) flow of fluid (e.g., water including agricultural product, air, or the like) through the control valve.

In another example, the valves are in communication with a valve controller. The valve controller facilitates opening and closing of the valve according to a specified duty cycle. For instance, the valve controller includes an actuator, and the actuator cooperates with the one or more valves to move the valve operator. Accordingly, the actuator helps open (or close) the one or more of the valves, and thereby permit (or inhibit) flow of fluid through the valves.

In yet another example, the system determines whether the valve operator has moved with respect to the coil. For instance, the system monitors variations of control valve characteristics of the one or more valves to determine whether the valve operator has moved. In an example, movement of the valve operator alters electrical characteristics of the control valve. Optionally, the actuator helps supply a current to the coil, and the current flowing through the coil generates a magnetic flux with the coil. The magnetic flux helps move the valve operator with respect to the coil (e.g., to open the valve). In some examples, movement of the valve operator with respect to the coil varies electrical characteristics of the control valve, such as by changing the magnitude of current flowing through the coil.

In still yet another example, the valve controller monitors control valve characteristics to determine a status, configuration or the like of the one or more valves, for instance whether the valves are in an unprimed state or a primed state. For example, the control valve is in an unprimed state with a quantity of gas in a fluid chamber of the control valve. In another example, the valve is in a primed state with a quantity of liquid in the fluid chamber of the control valve (e.g., with incidental gas therein). Accordingly, in an example the control valve characteristics includes fluid mechanical characteristics of the valve or fluid (e.g., including, but not limited to, properties of the fluids, related mechanical characteristics of the valve, or the like) delivered through the valve. For instance, the fluid mechanical characteristics include, but are not limited to fluid characteristics and associated changes in valve operation. For instance, the fluid mechanical characteristics include one or more of density of fluid, viscosity of fluid, compressibility (including incompressibility) of fluid, surface tension of fluid, state (e.g., liquid, gas, mixture), channeling or porting of the valve (e.g., with one or more flutes included in the valve operator, or the like), changes in these characteristics or the like.

In a further example, the system monitors control valve characteristics including performance of the valve operator in response to operation by the actuator of the valve controller. In an example, performance of the valve operator varies based on whether the valves are in the unprimed state, or in the primed state. For instance, the controller monitors at least one operator transition time corresponding to a time span for the valve operator to translate between the closed position and the open position. In some examples, the operator transition time varies according to whether the control valve is in the unprimed state, or in the primed state.

For example, variations in a ratio between liquid and gas in the fluid chamber induces variations in the control valve characteristics, such as the operator transition time. In an example, as the valve operator moves through the fluid in the fluid chamber, the fluid induces forces (e.g., drag, friction, or the like) on the valve operator as it moves through the fluid. For instance, the fluid in the fluid chamber includes one or more of a gas (e.g., air) or a liquid (e.g., water, agricultural product, or the like). In an example, force applied to the valve operator by a gas are less than forces applied to the valve operator by a liquid. For instance, the liquid (e.g., water including agricultural product) has a greater density than the gas (e.g., air) and accordingly liquid resists motion of the valve operator more than a gas. Accordingly, in the unprimed state, the forces applied on the valve operator are less than the forces applied in the primed state (e.g., according to the change in density of fluid in the fluid chamber, viscosity, surface tension, compressibility, incompressibility, or the like). As described herein, opening the valve operator (e.g., with a driving current) is opposed by the forces applied by liquid or gas to the valve operator, and accordingly monitoring associated electrical characteristics affected by the opposed forces facilitates determination of characteristics of the valve including, but not limited to, primed and unprimed states.

As described herein, the system monitors the control valve characteristics, for example to determine whether the control valve is in one or more of the unprimed state or the primed state. For instance, the controller monitors the control valve characteristics to determine differences in the control valve characteristics, such as differences in control valve characteristics with respect to time. One or more of the control valve characteristics (e.g., current through the coil, operator transition time, or the like) vary based on the control valve being in the unprimed state or the unprimed state. Accordingly, the system monitors the variations in control valve characteristics to determine whether the control valve is in the unprimed state or the primed state. With monitoring of the prime configuration of control valves performance of the system is enhanced. For example, automated priming (or depriming) of the control valves is conducted to enhance agricultural product application and minimize waste of the agricultural product.

In an example, the system minimizes waste of agricultural product by determining whether the plurality of control valves are in the unprimed state or the primed state. For instance, the controller primes individual ones of the plurality of control valves and arrests priming operation upon detect of the primed state thereby minimizing waste of agricultural product. In some approaches, agricultural product is delivered to the plurality of control valves with the control valves while each of the control valves are open (thereby permitting flow through each of the control valves). The agricultural product optionally flows through each of the control valves until each of the control valves along a sprayer boom are primed. In this approach, the control valves are closed as each control valve indicates (e.g., through monitored electrical characteristics) it has reached the primed state. In practice in one example the sprayer nozzles nearest the sprayer vehicle begin spraying with a priming operation as the system pressurizes. Spraying cascades along the boom as the distal control valves receive agricultural product and begin priming. As the control valves near to the sprayer vehicle prime, and priming is detected, the valves close and those associated spray nozzles cease spraying. Accordingly, in this example priming appears as a cascade of spraying beginning near to the vehicle and ending at the sprayer boom end followed by arresting of spraying near to the vehicle and continuing to the sprayer boom end.

In an example, the system primes individual ones of the plurality of control valves to minimize waste of the agricultural product, such as by closing individual ones of the control valves while the control valves are in the primed state (thereby inhibiting flow through the primed control valves). The system continues delivery of agricultural product to control valves in the unprimed state, and monitors the control valve characteristics to determine whether remaining control valves in the unprimed state transition to the primed state. Accordingly, the system minimizes flow of agricultural product through control valves in the primed state. Thus, the system facilitates priming of the plurality of control valves while minimizing waste of agricultural product. In yet another example, the system monitors valve characteristics to determine whether the control valves transition from the primed state to the unprimed state (e.g., to evacuate agricultural product from the control valves). Thus, monitoring of the unprimed or primed states helps ensure agricultural product is evacuated from the sprayer. For instance, an operator evacuates agricultural product from the sprayer prior to traversing a public roadway (or other area where avoiding application of the agricultural product is desired). Accordingly, monitoring of the unprimed and primed states of the control valves enhances performance of the agricultural sprayer.

As described herein the system includes one or more smart nozzles. In some approaches, flow of fluid through the nozzle is restricted by an obstruction. For instance, debris blocks (including partially blocks) the flow of fluid through the nozzle, and flow of fluid through the nozzle is thereby diminished. Accordingly, the nozzle is in a restricted state (as opposed to an unrestricted state).

In an example, the system determines whether the nozzle is in the restricted state or the unrestricted state. For instance, the controller monitors valve characteristics, such as pressure, between valve operator cycles to determine whether the nozzle is in the restricted state or the unrestricted state. In another example, the rate of pressure decay in the valve outlet changes in correspondence with whether the nozzle is in the restricted or unrestricted state. In an example, pressure at the valve outlet decays at a first rate with the nozzle in the unrestricted state. The pressure at the valve outlet decays at a second rate with the nozzle in the restricted state. The second rate is less than the first rate. The system determines the nozzle is in the restricted state or the unrestricted state based on the comparison of the pressure decay corresponding to a valve operator cycle relative to a restricted nozzle threshold. In an example, the controller determines the nozzle is in the restricted state when the pressure decay of a valve operator cycle exceeds the restricted nozzle threshold. For instance, the controller monitors pressure decay using one or more electrical characteristics of the system (e.g., current, voltage, or the like)

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates a perspective view of an example of an agricultural sprayer.

FIG. 2 illustrates a schematic of an exemplary nozzle control system.

FIG. 3 illustrates a detailed schematic view of an exemplary nozzle control system.

FIG. 4 illustrates a cross-sectional view an example of a valve, according to an embodiment of the present subject matter.

FIG. 5 illustrates another cross-sectional view of the valve of FIG. 4, according to an embodiment of the present subject matter.

FIG. 6 illustrates an example of a system for applying an agricultural fluid including a controller, according to an embodiment of the present subject matter.

FIG. 7 illustrates a representation of one or more drive signals used to apply a specified duty cycle to a valve and the resultant waveform shapes that are monitored by the controller, according to an embodiment of the present subject matter.

DETAILED DESCRIPTION

Figure 1:
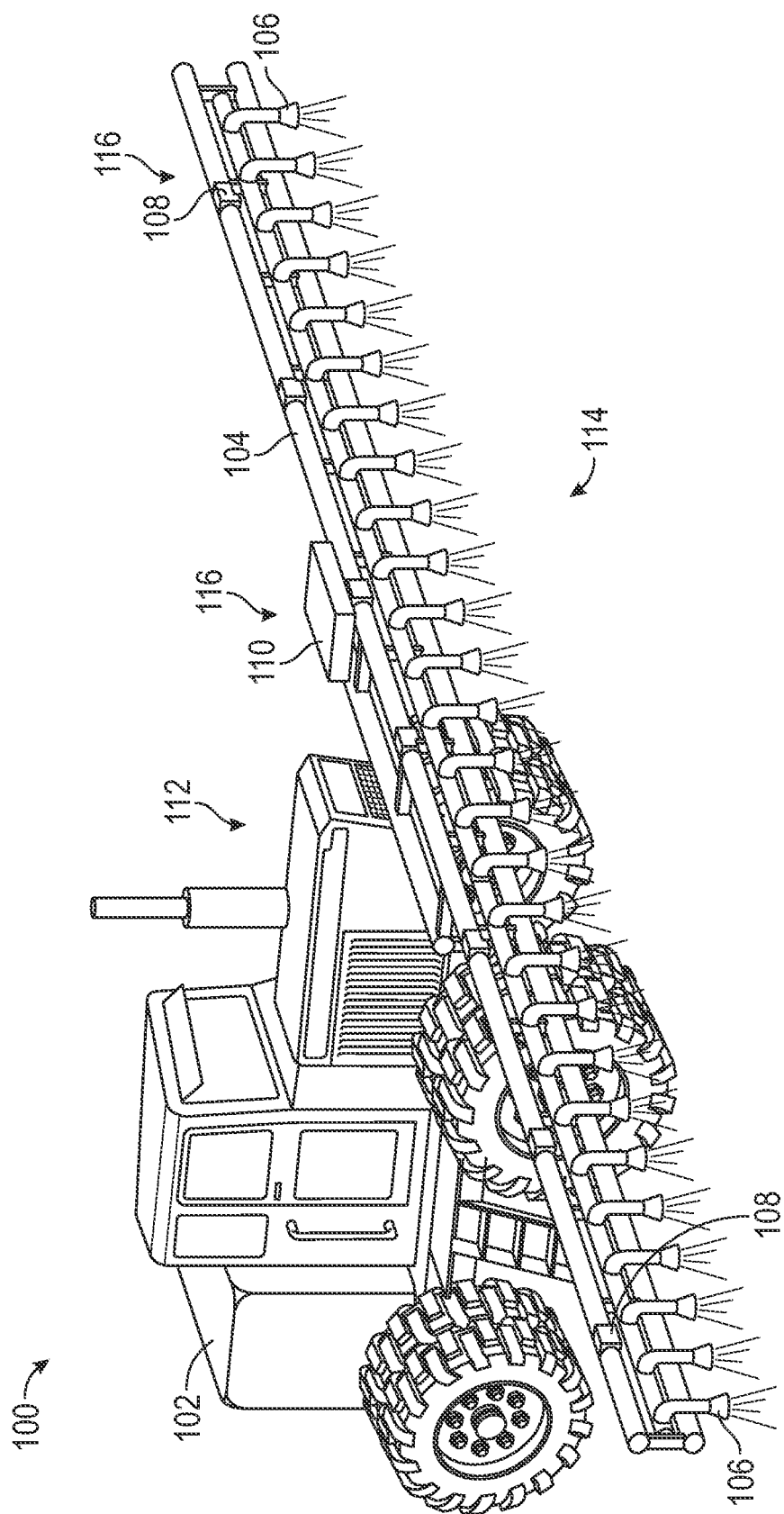

FIG. 1 illustrates a perspective view of an example of an agricultural sprayer 100. In an example, the agricultural sprayer 100 includes a reservoir tank 102 and one or more sprayer booms 104. The sprayer booms 104 optionally include one or more nozzles 106. In some examples, the agricultural sprayer 100 includes one or more electronic control units (ECU) 108 (e.g., a microprocessor based system), and for instance a master node 110. (e.g., a microprocessor based system)

In an example, the reservoir tank 102 is integral with a prime mover 112 (e.g., a tractor, truck, combine, vehicle, or the like). In some examples, the reservoir tank 102 is a towed behind the prime mover 112 (e.g., the reservoir tank 102 is included with a trailer, or the like). The reservoir tank 102, in an example, includes an agricultural product mixed with a carrier fluid, such as water. In some examples, the carrier fluid and the agricultural product are mixed in-line prior to or at the sprayer boom 104. The nozzles 106 are positioned along the sprayer boom 104 to deliver the agricultural product (and the carrier fluid) to a crop (e.g., vegetables, fruit feed, or the like) according to the operation of one or more control valves associated with the nozzles 106. Crops include, but are not limited to, any product grown in an agricultural field, such as row and non-row based crops as well as targets associated with crops including, but not limited to, weeds, pests, soil or the like. Agricultural products include, but are not limited to, fertilizers, water, pesticides, fungicides, herbicides, or the like.

The agricultural sprayer 100 includes one or more controllers 116, for example the ECU 108 and the master node 110. In an example, the master node 110 operates in conjunction with the one or more ECUs 108 to control delivery of the agricultural product from the reservoir tank 102, to the sprayer boom 104 and the associated nozzles 106 for delivery to the agricultural field or crop.

Figure 2:
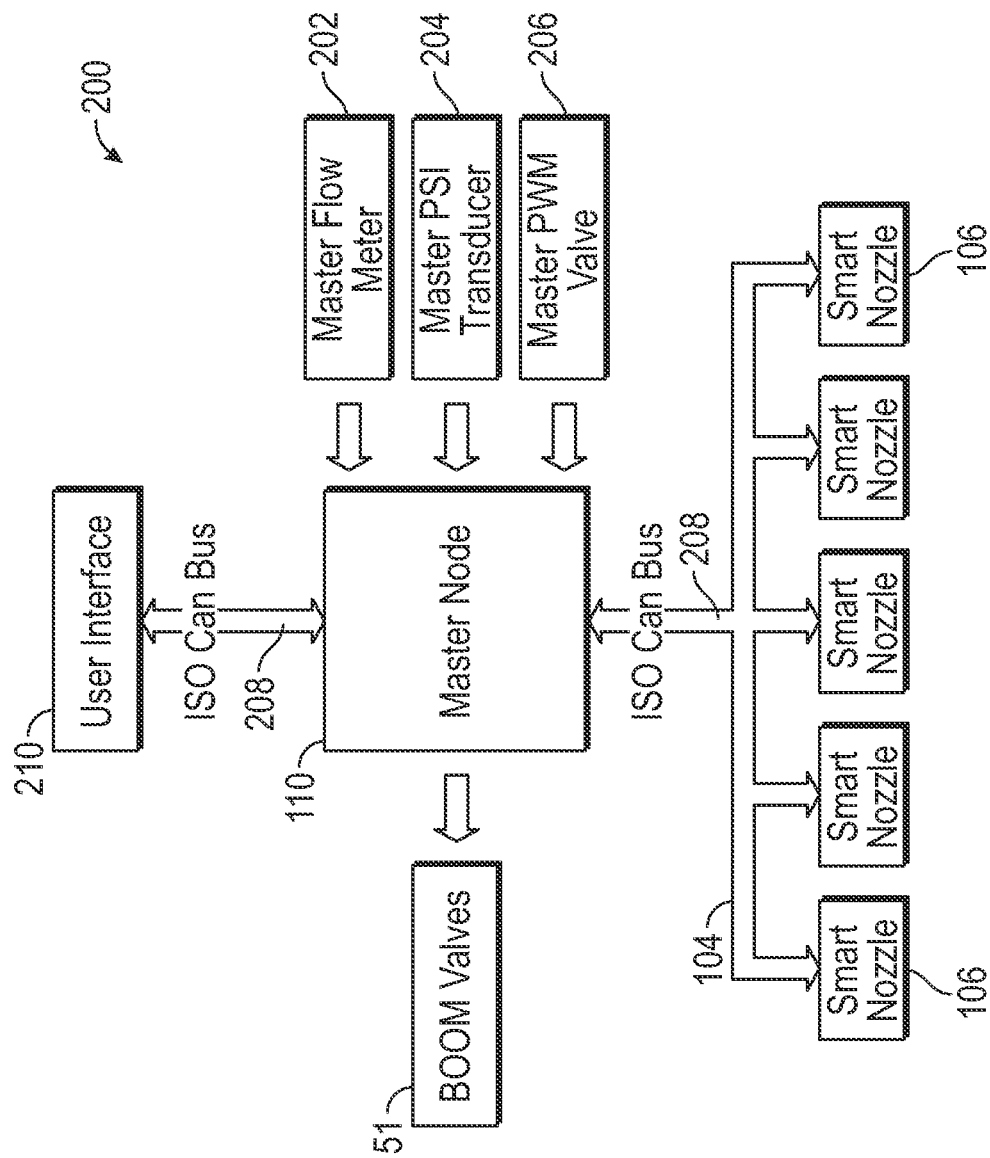

FIG. 2 illustrates a schematic of an exemplary nozzle control system 200, wherein the one or more nozzles 106 located on the boom 104 control a respective nozzle flow rate of an agricultural product dispensed from the nozzle 106, shown in FIG. 2 as smart nozzles 106 discussed herein. As shown in FIG. 2, the master node 110 is communicatively coupled to one or more valves (e.g., the PWM valve 206) of the boom 104, such that system pressure within the boom 104 can be controlled by the master node 110. In some examples, the master node 110 of the current system is not configured to control the flow rate within the system 200, boom 104, or at the smart nozzles 106. Instead, the master node 110 controls the pressure within the system 200, boom 104, or at the smart nozzles 106, and the pressure control provides control of the flow rate (e.g., control to a lower pressure decreases flow while control to a higher pressure increases flow). The master node 110 is in communication with a master flow meter 202, a master pressure transducer 204, and a master pulse width modulation (PWM) valve 206. The master node 110 controls the master PWM valve 206 to provide a targeted system pressure (through modulated operation of a system pump associated with the master PWM valve 206), such that a desired droplet size of the agricultural product is generated at the nozzles 106. For example, environmental conditions, such as wind, humidity, rain, temperature, field characteristics, or user preference determine whether a smaller or larger droplet size of the agricultural product is preferred. By controlling a targeted system pressure (e.g., maintaining, changing with variations in flow rate or the like), the preferred droplet size is maintained with the system 200.

Figure 3:
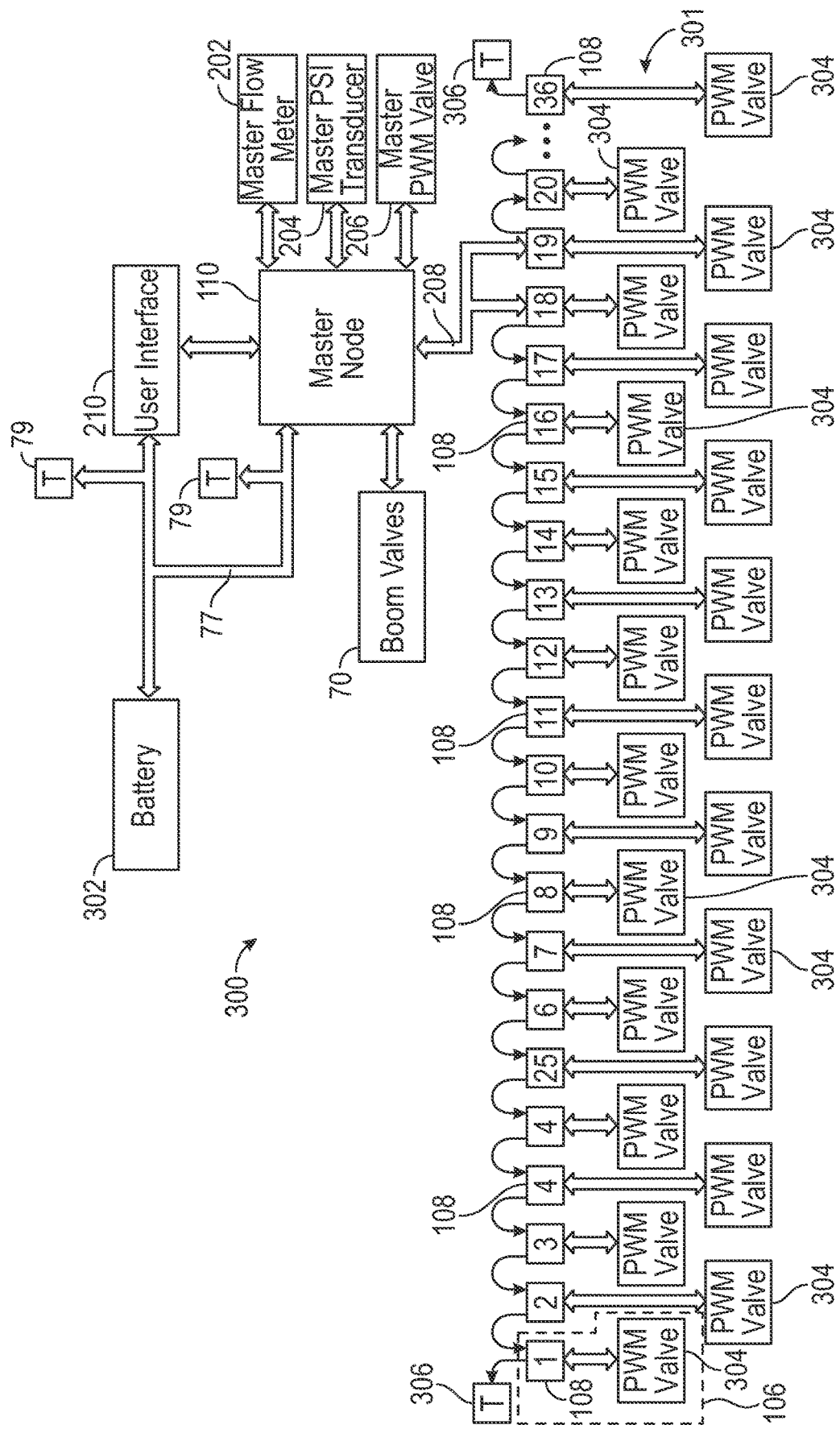

In the exemplary embodiment, each of the nozzles 106 is a smart nozzle that includes an electronic control unit (ECU) (e.g., ECU 108, shown in FIG. 1 or the like) that regulates, determines, and/or controls the nozzle flow rate of the agricultural product dispensed from the nozzle 106 with an associated control valve, as discussed in reference to FIG. 3. In other embodiments, a group of the nozzles 106 are associated with a common ECU and is collectively considered a single smart nozzle. The smart nozzles 106 are connected to, for example, the boom 104 and communicatively coupled to a controller area network (e.g., nozzle CAN bus 208, wireless network or the like) of the overall control system 200. As discussed herein, the CAN bus 208 is configured to distribute overall system information from the master node 110 (e.g., master node). The ECU at each smart nozzle 106 uses data from the overall system information to regulate, determine, and/or control the nozzle flow rate of each corresponding smart nozzle 106.

The master node 110 controls one or more of a system pressure or system flow rate using, for example, the master pressure transducer 204 (or in other examples the flow meter, flow meter and pressure transducer together or the like) and the master pulse width modulation (PWM) valve 206. Although FIG. 2 illustrates a PWM valve as a master valve 206, embodiments are not so limited. For example, the master valve 206 includes any valve capable of controlling pressure or flow rate of a system, such as a ball valve, PWM valve, butterfly valve or the like. For instance, the master node 110 maintains the system pressure or flow rate at a target system value (e.g., a target system pressure or target system flow rate). In another example, each smart nozzle 106 having an associated control valve (or valves) controls the component flow rate to the constituent nozzles associated with each smart nozzle. In another example, the master node controls the system pressure or system flow rate to one or more target values and the smart nozzles 106 control the flow rate for each of the constituent nozzles (e.g., one or more) associated with each smart nozzle. Collectively, the smart nozzles 106 may control the overall agricultural product flow rate of the system.

In an example, the target system pressure is provided by a user, such as at the user interface 210 connected to the master node 110 by the nozzle CAN bus 208. In an additional example, the user also provides a target system flow rate (e.g., volume/area) at the user interface 210. In an example, the master node 110 provides one or more of the target system flow rate or the target system pressure to each of the one or more smart nozzles 106, such that each smart nozzle 106 (or each ECU, as discussed herein) determines an individual agricultural product flow rate (or pressure) for the smart nozzle 106. For example, the system target flow rate is divided by the number of nozzles 106 to provide a target agricultural product flow rate for each of the one or more nozzles 106. In an example, the master node 110 measures the flow rate (e.g., volume per time) with a master flow meter 202 and compares it with the overall target flow rate (e.g., designated by one or more of the user, crop type, soil characteristic, agricultural product type, historical data, or the like). The master node 110 is configured to determine a difference or error, if present, between the measured system flow rate and the target system flow rate. In such an example, the master node 110 provides the determined difference, by the nozzle CAN bus 208, to the individual nozzles 106 (or ECUs, as discussed herein). The one or more nozzles 106 receive the difference on the CAN bus 208 and adjust their pressure/flow/duty cycle curve using the difference (e.g., compensating for errors in the system) to reduce the error between the measured and target system flow rates (or reduce the error between the measured and target system pressures).

Additionally, in at least some examples, the master node 110 reports the actual pressure, measured by the master pressure transducer 204, as well as boom 104 information, including, but not limited to, one or more of yaw rate, speed, number of smart nozzles of the boom, distance between smart nozzles on the boom, to the smart nozzles 106 (or ECUs, as described herein) for individual flow rate control (or pressure control) of each of the smart nozzles 106. For example, the information provided from the master node 110 is used in addition to nozzle characteristics to control the individual flow rate control of each smart nozzle 106. Nozzle characteristics include, but are not limited to nozzle position on a boom, length of the boom, nozzle spacing, target flow rate for the system, yaw rate of the boom, yaw rate of the agricultural sprayer, speed of the agricultural sprayer, the overall system pressure or flow rate, agricultural product characteristics, valve performance such as a moveable valve operator transition time (including differences between specified and actual duty cycles), or the like.

The system 200 is configured for installation on an agricultural sprayer (e.g., the agricultural sprayer 100, shown in FIG. 1). In operation, because the sprayer moves during operation (translates and rotates, accelerates or the like), the one or more nozzle characteristics, in an example, are dynamic and flow rates through nozzles associated with a smart nozzle 106 dynamically change in some examples relative to other smart nozzles 106 of the system.

FIG. 3 illustrates a detailed schematic view of an exemplary nozzle control system 300. The control system 300 includes the master node 110 communicatively coupled to one or more valves 301 of the boom 104, such that system pressure within the boom 104 can be controlled by the master node 110. Further, the master node 110 includes inputs from one or more of the master flow meter 202, the master pressure transducer 204, and the master pulse width modulation (PWM) valve 206. Further, as described herein, the master node 110 is coupled to the user interface 210 and, in an example, a battery 302, so as to provide power to one or more of the master node 110 and user interface 210.

As shown in the embodiment of FIG. 3, a smart nozzle 106 optionally includes an ECU 108 coupled to a valve 304 (e.g., a PWM valve, ball valve, butterfly valve, or the like). That is, FIG. 3 illustrates 36 ECUs relating directly to 36 nozzles of the nozzle control system 300, but embodiments are not so limited. The master node 110 is communicatively coupled, by nozzle CAN bus 208 to ECU-18 and ECU-19, wherein ECU-18 108 and ECU-19 108 define a center region of the boom. From the center region of the boom, the ECUs 108 are communicatively coupled to the most proximate ECU 108 in the direction toward each terminal end 306 of the boom. That is, ECU-18 is communicatively couple to ECU-17, which is communicatively coupled to ECU-16, and so forth until the terminator after ECU-1 is reached. The same pattern holds for the other half of the boom. Although 36 ECUs 72 are illustrated, embodiments are not so limited.

Further, as shown in FIG. 3, each ECU 108 is coupled to one PWM valve 304, however, embodiments are not so limited. In another example, a single ECU 108 is communicatively coupled to more than one PWM valve 304. For instance, a single ECU 108 is communicatively coupled to more than one valve, such as every other valve, arrays of valves along portions of booms or the like. In an example, 12 ECUs split control of the 36 nozzles of the boom. In an example, a plurality of nozzles are partitioned into nozzle groups, such that each nozzle group includes an ECU 108 configured to control a nozzle group flow rate (or nozzle pressure that in turn controls flow) of the agricultural product dispensed from each nozzle of the nozzle group (by way of associated control valves 301) based on the nozzle characteristics, as described herein, of the respective nozzles. Thus, a smart nozzle includes, but is not limited to, a single nozzle, an associated valve and an associated ECU. In another example, a smart nozzle includes a group of nozzles (having associated valves) that are associated with a common ECU.

In still another example, the system 300 includes one or more location fiducials associated with the system 300, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 108 of the system is configured to control the agricultural product at individual rates according to the location of the one or more nozzles (or ECUs 108), the movement of the one or more nozzles relative to the field, another frame of reference or the like (and optionally in addition to the nozzle characteristics described herein). Further, each of the plurality of nozzles (or ECUs 108) is optionally cycled, such as on/off, according to the location of the nozzle (or location of a nozzle group or ECU 108) relative to a frame of reference, such as a field.

In an example, each nozzle ECU 108 is programmable to receive, track, or manipulate designated nozzle control factors (e.g., the specified duty cycle, the actual duty cycle, or the like) and monitor characteristics associated with each smart nozzle 106 (including one or more associated control valves). For example, each ECU 108 monitors one or more of nozzle spacing, target flow rate for the system, target pressure for the system, speed of the agricultural sprayer, yaw rate, nozzle location on the field, or the like. In yet another example, the ECUs 108 associated with each nozzle are instead consolidated into one or more centralized nodes that determine the individual flow rates of each of the respective nozzles in a similar manner to the previously described ECUs 108 associated with each of the nozzles.

In other examples, each ECU 108 (or the master node 110) monitors characteristics of the associated smart nozzle 106 including, but not limited to, operation of the control valve, electrical characteristics of the control valve (e.g., indicative of valve operation or performance) or the like. Such examples provide the benefit of comporting the system to user specifications, providing greater control of the system, and providing cost effective nozzle specific solutions including, but not limited to, efficient priming and depriming of the smart nozzles 106 as well as detection of maintenance issues such as tip blockage (e.g., fouling, plugging, sticking, seizing or the like).

The controllers 116 (e.g., the ECU 108, the master node 110, or the like) control the nozzle flow rate (or the timing of flow through the nozzle) based on a number of parameters, including, but not limited to: speed of the sprayer or boom, yaw rate, target system flow rate (e.g. volume/area), and on/off command at runtime. Such parameters permit the controllers 116 to calibrate the duty cycle curve (e.g., by adjusting the actual duty cycle of a valve) of each smart nozzle needed to achieve the target nozzle flow rate (or a target nozzle timing) of each of the smart nozzles. For instance, calibrating the duty cycle curve includes guiding an actual duty cycle of the nozzles (and their associated valves 301) to a specified duty cycle of the nozzles. Each smart nozzle is further configured according to nozzle spacing on the boom, location on the boom, and nozzle type. Further, in some examples, each smart nozzle regulates or controls the nozzle flow rate (or pressure) based on the location of the nozzle in the field (as described above).

As described herein, the agricultural sprayer 100 (shown in FIG. 1) includes a nozzle control system including a plurality of smart nozzles 106 having one or more associated valves 301 (e.g., such as a PWM solenoid valve 304 as shown in FIG. 3, or the like) that regulate flow in order to provide a specified target application of an agricultural product from the nozzles 106. In an example, the one or more associated valves 301 include the PWM solenoid valve 304. As a plurality of nozzles 106 are used across the boom 104 (shown in FIG. 1), achieving specified flow performance for each of the nozzles 106 enhances application precision and accuracy while minimizing application errors (e.g., misapplication, underapplication, overapplication, or the like). In some examples, one or more factors cause inconsistency in nozzle flow and droplet size (e.g., the size of droplets of agricultural product dispensed by the nozzle 106) of the sprayed agricultural product. Examples of these factors include, but are not limited to voltage drop of a solenoid drive voltage due to chassis wiring resistance, manufacturing tolerances of the mechanical elements in a valve itself (e.g., the valve 304, shown in FIG. 3), valve wear, valve contamination from the agricultural product, blocking (e.g., fouling or obstructions) of the nozzles or associated control valves, pressure variations across the boom or boom sections, variation due to an installed tip on the outlet of the nozzle, or open-stroke and close-stroke transition times for a moveable valve operator within the valve 304 controlling flow to the nozzle 106.

In an example, and as described in greater detail herein, the system includes (or utilizes) an algorithm for tracking a position of a moveable valve operator (e.g., a poppet, or the like) of the valve 304 based on, for example, monitoring of back-emf (BEMF) generated in a solenoid coil by the moving valve operator as it transitions between its open and closed positions in the valve 304. In another example, monitoring (e.g., capturing, recording, observing, cataloging, compiling, collecting, or the like) of the performance of the valve 304 optionally provides insight into valve health or nozzle faults and, for instance alerts a system user to a specific problem (e.g., with the user interface 210, shown in FIG. 2).

Figure 4:
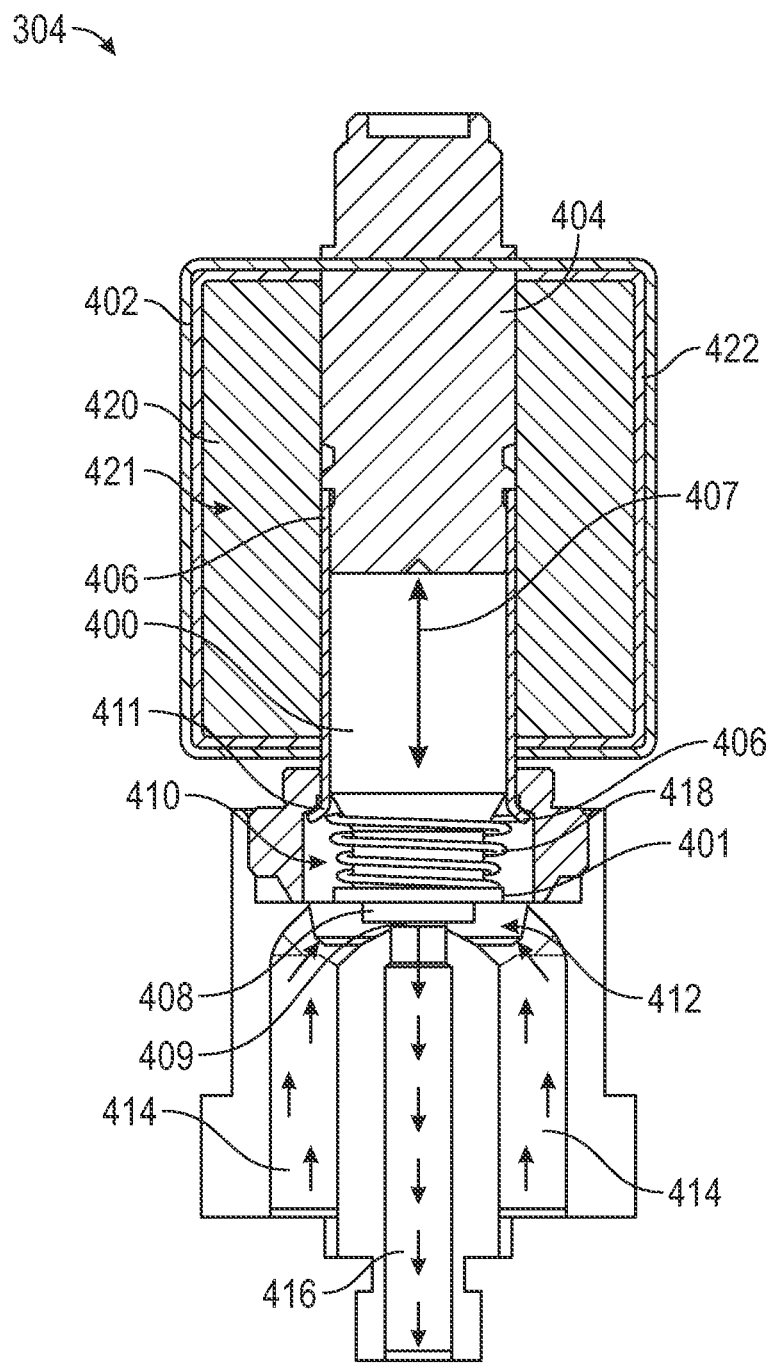
Figure 5:
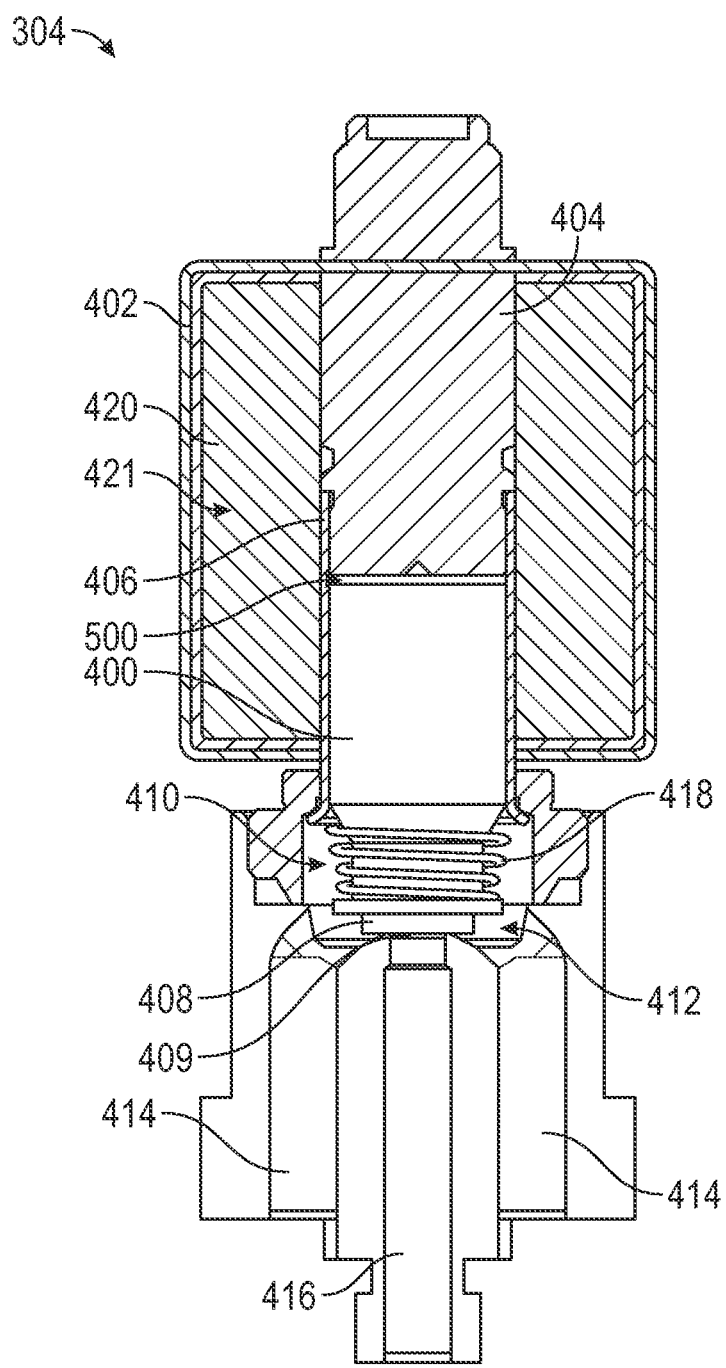

FIG. 4 and FIG. 5 illustrate cross-sectional views of an example of the valve 304 in an open position and a closed position, respectively. The valve 304 is optionally a solenoid valve, for instance an electro-mechanical device that opens and closes an orifice by moving a moveable valve operator 400 (e.g., a poppet, gate, or the like) in a valve body 402 (e.g., a pressure vessel, frame, or the like). In an example, the valve body 402 of the valve 304 contains a lug 404 (e.g., a ferromagnetic material) and a housing 406 (e.g., a non-ferromagnetic material) that is coupled to the lug 404. The valve operator 400 is movable in the housing 406, for instance with a range of motion 407 to open and close the valve. The valve operator 400 includes a seal 408 (e.g., a gasket, membrane or the like) coupled with a first end 410 of the valve operator 400. In an example, movement of the valve operator 400 within the housing 406 selectively opens and closes a channel 412 between a valve inlet 414 and a valve outlet 416. For example, the seal 408 engages with a valve seat 409 (shown in the closed configuration in FIG. 5) thereby inhibiting flow through the channel 412. In the open position, the seal 408 is disengaged from the seat 409 (as shown in FIG. 4) thereby allowing flow through the channel 412 (e.g., because the valve operator 400 is moved away from the seat 409). FIG. 4 includes arrows indicating flow within the valve inlet 414 and the valve outlet 416.

In an example, the valve 304 (the operator 400) is biased toward the closed position, for instance with a biasing element 418, such as a coil spring, leaf spring, elastomer, magnet, or the like. In an example, the moveable valve operator 400 includes an operator flange 401 and the housing 406 includes a flare 411. The biasing element 418 (a spring in this example) is coupled between the operator flange 401 and the flare 411. In this example, the biasing element 418 provides a force between the housing 406 and the valve operator 400 to bias the valve operator 400 toward the closed position.

In some examples, the valve 304 operates by applying a voltage potential to a coil 420 (e.g., a winding of wire, or the like) that generates current in the coil 420. The coil 420 generates magnetic flux when current flows through the coil 420. In an example, the moveable valve operator 400 translates with respect to the coil 420 based on the magnetic flux generated by the coil 420. The current flowing through the coil 420 optionally magnetizes the lug 404 (and the valve operator 400) of the valve 304. For instance, the lug 404 is ferromagnetic, and a magnetic pole is established that attracts (e.g., draws, pulls, pushes, drives, or the like) the valve operator 400 toward the lug 404. Accordingly, the valve 304 optionally includes a solenoid 421, and the solenoid 421 includes (but is not limited to) the valve operator 400, the lug 404, and the coil 420.

The valve 304 optionally includes a magnetic flux frame 422 surrounding one or more of the lug 404 or the valve operator 400. The magnetic flux frame 422 encapsulates the magnetic field between the lug 404 and valve operator 400 and accordingly concentrates the magnetic field. For instance, the magnetic flux frame 422 enhances bounding of flux generated by the coil 420 to concentrate the magnetic field between the lug 404 and the valve operator 400.

Referring again to FIG. 4, as the amount of current flowing through the coil 420 increases, the magnetic field generated by the coil 420 increases as does the resulting force applied to the valve operator 400. For instance, an attractive force increases between the valve operator 400 and the lug 404. As the attractive force generated (e.g., induced, developed, provided, or the like) by the magnetized lug 404 overcomes forces such as fluid pressure within the housing 406, bias from the biasing element 418 or the like—the valve operator 400 begins moving from the closed position (FIG. 5) to the open position (FIG. 4). As described herein, the movement of the valve operator 400 is affected by one or more valve characteristics including fluid mechanical characteristics that affect valve characteristics (operation), such as the previously described fluid pressure, density of fluid (e.g., gas, liquid or the like), position of the fluid between the valve operator 400 and the lug 404, bias from the biasing element 418, pressure in the valve outlet 416, plugging or fouling of the valve or the like, and these characteristics alter the movement and accordingly vary the operation of the valve (e.g., length of opening and closing, initiation of opening and closing, sticking or plugging of the valve, an actual duty cycle of the valve 304 or the like) relative to specified (e.g., predicted) behavior or values for the valve 304.

A generated counter current (e.g., back electromotive force or back EMF) and corresponding magnetic field are examples of characteristics that alter the performance of the valve 304 relative to a specified duty cycle. For example, as the valve operator 400 moves toward the open position a counter current is generated in the coil 420 as the flux linkage changes because of a change of magnetically permeable material within the magnetic field (e.g., more of the valve operator having a higher magnetic permeability moves into the magnetic field and displaces fluid having a lower permeability). As the valve opens the flux linkage of the valve 304 changes due to the valve operator 400 occupying the previously fluid filled fluid gap 500. Conversely, when the valve operator 400 is in the closed position (FIG. 4) the fluid gap 500 is filled with the fluid having a lower magnetic permeability and the flux linkage again changes and generates counter current. The changes in flux linkage generate correspond counter currents (e.g., back EMF) that resist otherwise specified operation of the valve including opening and closing movements and thereby slow opening and slow closing as flux linkage changes and back EMF is generated.

The direction of the current generated in the coil 420 and its magnetic field caused by the moving valve operator 400 opposes the initial magnetic field of the coil 420 (e.g., the magnetic field generated by a current flowing through the coil 420). In an example, opposition of the initial magnetic field decreases the initial magnetic field generated by the coil 420 (e.g., according to Lenz's Law, or the like). Thus, in some examples, as the valve operator 400 moves nearer the coil 420 (or within the housing 406), the magnitude of current in the coil is reduced to oppose the originally created field caused by the current applied to the coil 420 (e.g., a ramping current, or the like).

In an example, as liquid (e.g., during priming of the valve, or the like) enters portions of the valve, the ratio of liquid to gas of the fluidic mixture changes. The fluid mechanical resistance to movement of the valve operator 400 changes in correspondence with the composition of the fluidic mixture in the fluid chamber 800 (shown in FIG. 8) and in contact with the operator 400. Accordingly, in an example the control valve characteristics include or are based on fluid mechanical characteristics of the valve 304 (or fluid in the valve 304). For instance, the fluid mechanical characteristics prompt changes in valve operation due to changes in composition of the fluid within the valve 304. For instance, the fluid mechanical characteristics include one or more of density of fluid, viscosity of fluid, compressibility (including incompressibility) of fluid, surface tension of fluid, state (e.g., liquid, gas, mixture), channeling or porting of the valve 304, changes in the same or the like. Differing densities, viscosities or the like affect valve operation and accordingly generate detectable changes in control valve characteristics.

For instance, the resistance to motion of the valve operator 400 increases based on the quantity of liquid in the fluid chamber 800 relative to gas. The denser a liquid (or greater proportion of liquid to gas) the greater the resistance to motion of the valve operator 400. As discussed herein, resistance to motion of the valve operator 400 (including lack thereof) is detected and monitored to determine the primed and unprimed states of control valves and other states, such as tip blockage. For instance, an increase in density of the fluidic mixture (or associate ratio of liquid to gas) slows movement of the valve operator 400, and accordingly increases a valve operator transition time. The controller 606 monitors the valve operator transition time (or changes in the valve operator transition time between cycles of the valve operator 400) to determine whether the valve is in the primed state or the unprimed state.

In another example, the valve operator 400 moves from the closed position to the open position. The valve operator 400 displaces fluid in the fluid chamber 800 (e.g., fluid between the housing 406 and the valve operator 400), from, in one example, the fluid gap 500 toward the valve outlet 416. A compressible fluid (e.g., a more gaseous fluid) is easier to compress (in comparison to an incompressible fluid, such as water or the like) and move toward the valve outlet 416. Accordingly, the fluid resistance to motion for a compressible fluid is less than an incompressible fluid. Thus, the force to open the poppet (and the associated current) is less with a compressible fluid. In another example, the valve operator transition time for a compressible fluid is less than the valve operator transition time for an incompressible fluid. Each of these control valve characteristics is measurable (e.g., with current monitoring, timing or the like) to assess the state of the valve including primed, unprimed, blocked or the like.

Figure 6:
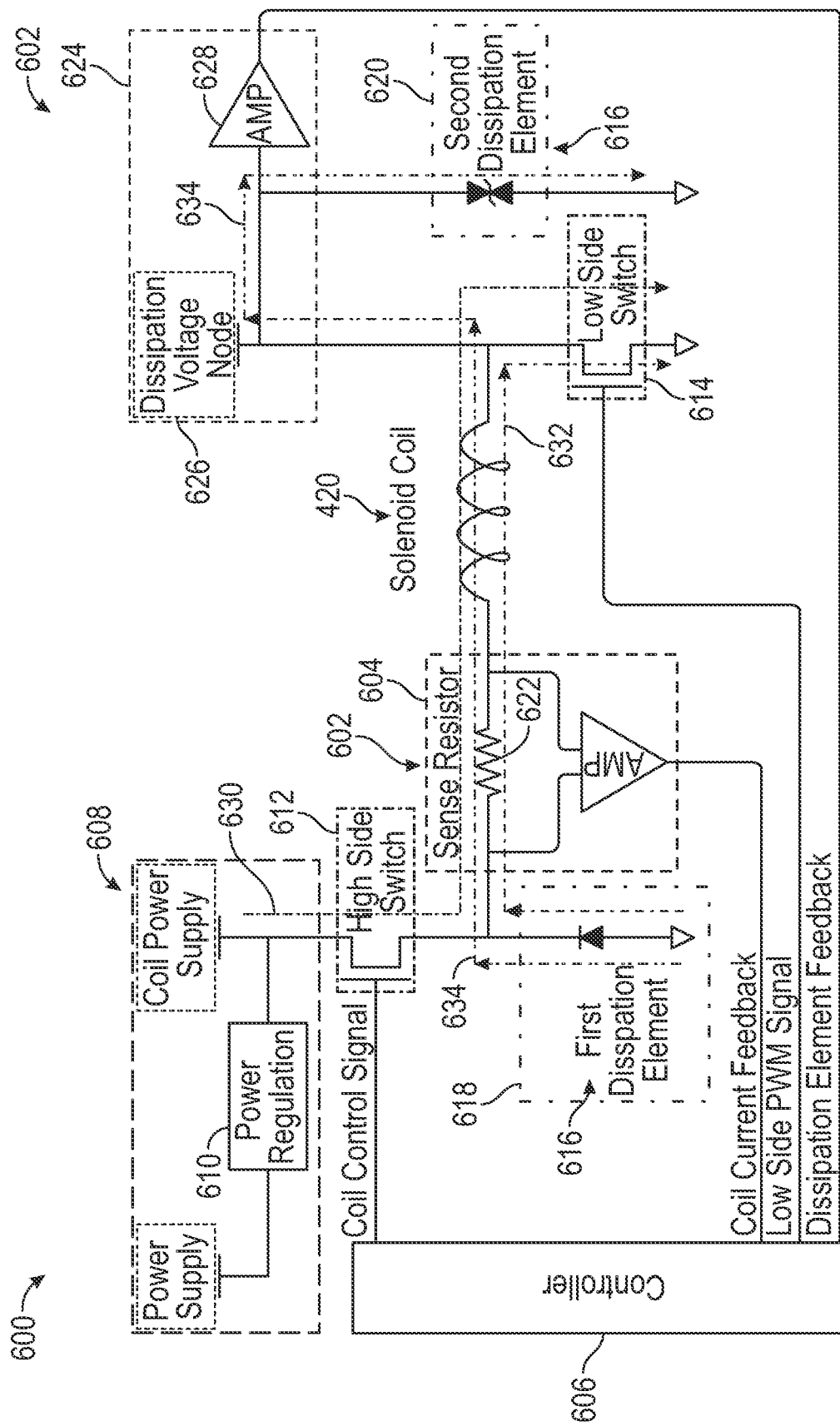

FIG. 6 illustrates a schematic diagram of a nozzle control system 600. The agricultural sprayer 100 (shown in FIG. 1) includes the nozzle control system 600. For instance, the nozzle control system 600 is used in combination with one or more components (or functions) of the nozzle control system 200 (shown in FIG. 2) or the nozzle control system 300 (shown in FIG. 3). In an example, the nozzle control system 600 includes the plurality of nozzles 106 (shown in FIG. 1) and one or more associated valves 301. For instance, the valves 301 include one or more of the PWM solenoid valve 304 (shown in FIGS. 3-5). Optionally, the nozzle control system 600 is a component of a controller for one or more valves (e.g., 304, smart nozzle 106 or the like) such as the associated ECUs 108 (see FIG. 3). The valves 301 (shown in FIG. 3) regulate flow to provide a specified target application rate of an agricultural product from respective nozzles of the agricultural sprayer 100.

The nozzle control system 600 includes one or more sensors 602 that facilitate monitoring of one or more electrical characteristics (e.g., current, voltage, resistance, inductance or the like) of components of the system 600. For example, the nozzle control system 600 includes a coil characteristic sensor 604 included in series with the coil 420. In an example, the coil characteristic sensor 604 determines (e.g., measures, monitors, obtains, provides, evaluates, observes, or the like) the magnitude of current through the coil 420 (or voltage across the coil 420). In another example, a dissipation characteristic sensor 624 determines one or more electrical characteristics of the dissipation elements 616.

In an example, the system 600 includes a nozzle controller 606 that monitors the electrical characteristics of the system 600. The controller 606 is in communication with the sensors 602 as described herein. For example, the controller 606 monitors the magnitude of the current through the coil 420 with the characteristic sensor 604. In another example, the controller 606 monitors other electrical characteristics, such as voltage with the sensor 602 provided on an opposed side of the solenoid coil 420. The sensor 602 detects the voltage at the dissipation voltage node 626 (and across the second dissipation element 620). In some examples, the controller 606 performs one or more mathematical operations upon the monitored electrical characteristics. For instance, the controller 606 monitors one or more rates of change of the current through the coil 420, rate of change of voltage (e.g., dissipation of voltage) or the like.

As discussed herein, movement of the valve operator 400 facilitates flow through the valve 304. In an example, movement of the valve operator 400 (e.g., with respect to the housing 406, shown in FIG. 3) generates a change in current through the coil 420. The controller 606 monitors the change in current through the coil 420 by way of the sensor 604. By monitoring an electrical characteristic, such as current through the coil 420, the controller 606 determines when the valve operator 400 actually moves (in contrast to when it should move based on a specified duty cycle). For instance, a decrease in current indicates actual movement of the valve operator 400. Thus, the control system 600 (e.g., the controller 606 and sensor 604) detects actual movement of the valve operator 400 including one or more of initial (e.g., beginning, starting, or the like) movement of the operator, full transition of the valve operator 400 (e.g., to open or closed positions) and movement therebetween. As discussed herein, by comparing opening or closing movement (including associated electrical characteristics) with previous examples of opening or closing one or more states are detected including, but not limited to, primed, unprimed states, or tip blockage (e.g., fouling or plugging) of the valves and associated nozzles.

In an example, the valve control system 600 includes a power conditioning system 608. The power conditioning system 608 provides a drive voltage potential to operate the system 600 (including the valve 304 having the coil 420). The coil 420 behaves as an inductor, and the current flowing through the coil 420 does not change instantaneously. The rate of adding energy into the coil 420 is optionally increased, for example by increasing the drive voltage potential (e.g., a voltage applied across the coil 420 with the power conditioning system 608) to overcome the inductance of the coil 420.

In an example, the system 600 includes a coil drive voltage regulator 610, for instance to facilitate operating the power conditioning system 608 at a fixed, or nearly fixed voltage. The controller 606 optionally modulates one or more of a high side switch 612 and a low side switch 614, for instance to provide energy to the coil 420. The high side switch 612 and the low side switch 614 are optionally located on either side of the coil 420. For example, the high side switch 612 is included in the system 600 on a first side of the coil 420. In an example, the low side switch 614 is included in the system 600 on a second side of the coil 420. In an example, current flows through the coil 420 (and energizes the coil 420) when the switches 612, 614 are closed. In some examples, one or more of the switches 612, 614 are normally open, and modulation of the switch closes a circuit and allows current to flow through the switches 612, 614. For instance, the switches 612, 614 are normally open to facilitate conservation of power in the system 600 (e.g., by selectively supplying power to the system 600 as needed).

In some examples, the coil 420 has a defined resistance, and when a potential is applied across the coil 420, a first amount of energy will be dissipated by the coil 420 to build the magnetic field. A second amount of energy is dissipated due to the resistance of the coil 420 (e.g., as heat). Once the magnetic field builds to a sufficient level to overcome the fluid pressure at the valve inlet 414 and the bias provided by the biasing element 418, the valve operator 400 moves toward the open position. Once the valve 304 transitions from the closed position to the open position, the amount of magnetic field needed to maintain the open position of the valve operator 400 is reduced because the initial additional force to separate the seal 408 from the seat 409 against the fluid pressure built-up upstream from the valve 304 is reduced (e.g., in comparison to when the valve operator is in the closed position). The amount of current running through the valve 304 is optionally reduced to maintain the valve 304 (e.g., the valve operator 400) in the open position, for example to save power (e.g., hitting and holding the valve operator 400 in the open position). In an example, a full voltage potential is applied to the coil 420 until the valve operator 400 transitions to the open position from the closed position. Once the valve 304 has opened, a reduced voltage potential (or current), or a modulated current (shown in FIG. 7 as the rapid saw tooth portion of the current plot), is applied to the coil 420 to facilitate maintaining the valve operator 400 in the open position while reducing the power consumption due to the wiring resistance in the coil 420.

In some examples, the system 600 includes one or more dissipation elements 616, for instance a first dissipation element 618 and a second dissipation element 620. The dissipation elements 616 include (but are not limited to) a flyback diode, freewheeling diode, clamp diode, transient voltage suppression diode, resistor, capacitor, or the like. In an example, the first dissipation element 618 includes a freewheeling diode, and the dissipation element 618 facilitates recirculation of current through the coil 420 to facilitate the maintenance of the magnetic field with less energy. The dissipation element 616 optionally has a dissipation characteristic and dissipates energy within the system 600, for instance from the coil 420. In some examples, the dissipation element 616 facilitates recirculation of energy within the system 600 (e.g., by recirculating current through the freewheel path 632, or the like). For example, the dissipation element 618 facilitates recirculation of current through the coil 420 (with corresponding maintenance of the magnetic field) when the high side switch 612 is open (e.g., to inhibit current flow through the switch 612) and the low side switch 614 is closed (e.g., to allow recirculating current to flow between the switch 614 and the dissipation element 616 with the intervening circuit having the coil 420 and ground).

The second dissipation element 620, for example, facilitates deenergizing of the coil 420. For instance, the dissipation element 620 includes a clamping diode, and the dissipation element 620 quickly dissipates recirculating energy in the system 600 (e.g., removes, reduces, diminishes, dumps, minimizes or the like) from the coil 420 (or the system 600) when both switches 612, 614 are opened. Accordingly, current flowing through the coil 420 is forced to divert to a flyback path (e.g., the flyback path 634, or the like) for dissipation across the dissipation element 620 (e.g., a clamping diode).

The valve 304 is optionally closed (e.g., to arrest flow in the channel 412 between the valve inlet 414 and the valve outlet 416) by dissipating the magnetic field between the lug 404 and the valve operator 400. For example, the magnetic field between the lug 404 and the valve operator 400 is dissipated and the biasing element 418 biases the valve operator 400 away from the lug 404 and toward the closed position. In an example, the current flowing through the coil 420 is reduced to dissipate the magnetic field generated by the coil 420. For example, the voltage potential applied to the coil 420 is removed from the coil 420. When the voltage potential is removed, the current flowing through the coil 420 decreases and the magnetic field generated by the coil 420 also begins to dissipate (e.g., decay, reduce, decrease, diminish or the like). When the magnetic field has sufficiently dissipated, the biasing element 418 biases the valve operator 400 back towards the valve seat 409 and the closed position.

As the valve operator 400 begins to transition from the open position (shown in FIG. 4) toward the closed position (shown in FIG. 5), the amount of flux linkage in the magnetic circuit (e.g., between the lug 404 and the valve operator 400) decreases. For instance, fluid having a lower magnetic permeability fills the fluid gap 500 as the valve operator 400 (with a relatively higher magnetic permeability) moves out of the gap and toward the closed position. A counter current is generated in the coil 420 as the valve operator 400 begins to move, and the counter current opposes the change in flux linkage (e.g., according to Lenz's law, or the like). The direction of the current generated in the coil 420 by the transitioning valve operator 400 is such that the generated current generates a counter magnetic field opposed to the dissipating magnetic field in the coil 420. In an example, the generated current is monitored (e.g., by the controller 606 in communication with the one or more sensors 602) to determine when the valve operator 400 transitions from the open position toward the closed position.

In some examples, the open time (initiation of opening, length of time to open or the like) for the valve 304 is improved by enhancing the addition of energy to the coil 420 with the power conditioning system 608 to rapidly overcome the bias provided by the biasing element 418.

In other examples, the closing time (initiation of closing, length of time to close or the like) of the valve 304 is enhanced by dissipating energy in the coil 420 rapidly and thereby initiating movement of the valve operator 400 earlier with the biasing element 418. For example, a dissipation element 620 allows for rapid dissipation of energy from the coil 420. Increasing the rate that energy is dissipated from the coil 420 (and corresponding dissipation of the magnetic field) optionally reduces the close time of the valve 304 (e.g., a time duration for the valve operator 400 to transition from the open position to the closed position). Further, reducing the amount of energy to be dissipated from the valve 304 (e.g., the coil 420) optionally reduces the close time of the valve 304 because there is relatively less energy to dissipate before closing is initiated.

As described herein, the controller 606 monitors the sensors 602 (e.g., the coil characteristic sensor 604, dissipation characteristic sensor 624, tip pressure sensor 1204, or the like). For instance, the controller 606 determines when the valve operator 400 moves based on the monitoring of electrical characteristics with the sensor 604 (e.g., a decrease in current corresponding to movement of the valve operator 400 with respect to the housing 406).

The controller 606 monitors the sensors 602 to correspondingly monitor the mechanical response of the valve operator 400 (e.g., movement of the valve operator 400 between the closed position and the open position). Monitoring of the mechanical response of the valve operator 400 facilitates, in one example, determining whether the valve is in a primed state or an unprimed state.

In some examples, the coil characteristic sensor 604 includes the sense resistor 622. For instance, the sense resistor 622 facilitates monitoring of electrical characteristics of the system 600 (e.g., current through the coil 420), for example with the controller 606. For example, the sense resistor 622 facilitates determining electrical characteristics of the coil 420. Monitoring of the electrical characteristics of the coil 420 facilitates monitoring of movement of the valve operator 400, for instance to determine when the valve operator 400 begins to transition from the closed position to the open position. In an example, the sense resistor 622 (in cooperation with the controller 606) facilitates determining when the valve operator 400 has fully transitioned to the open position (from the closed position). In some examples, the sense resistor 622 is located in series with the coil 420. In an example, the sense resistor 622 is located in the system 600 between the coil 420 and the switch 612. The sense resistor 622 is optionally located in series with the power conditioning system 608 and the coil 420. Thus, the coil characteristic sensor 604 determines electrical characteristics of the coil 420 and facilitates monitoring of the electrical characteristic of the coil 420 with the controller 606. Accordingly, monitoring of the electrical characteristics of the coil 420 facilitates determining when the valve operator 400 actually moves (e.g., because the mechanical response of the valve 304 differs from the electrical signals operating the valve 304).

In an example, the sensors 602 include a dissipation characteristic sensor 624. For instance, the dissipation characteristic sensor 624 determines one or more electrical characteristics of the dissipation elements 616. For example, the dissipation characteristic sensor 624 determines a voltage across the second dissipation element 620, for instance by determining a voltage at a dissipation voltage node 626 between the coil 420 and the second dissipation element 620.

In an example, the dissipation characteristic sensor 624 facilitates monitoring of movement of the valve operator 400. For instance, the controller 606 optionally monitors the dissipation characteristic sensor 624 to monitor the mechanical response of the valve operator 400 (e.g., movement of the valve operator 400 between the open position and the closed position). The controller 606 monitors the sensor 624 to determine when the valve operator 400 begins to transition from the open position to the closed position. In another example, the sense resistor 622 (in cooperation with the controller 606) facilitates determining when the valve operator 400 has fully transitioned to the closed position (from the open position).

The system 600 optionally includes one or more signal processors 628. For instance, the signal processors 628 provide signal conditioning, amplification, or the like for components of the system 600. In an example, the signal processors 628 facilitate monitoring of electrical characteristics by the controller 606. For example, the signal processors 628 condition electrical characteristics of the system 600 for monitoring by the controller 606. For instance, the signal processors 628 allow the controller 606 to monitor the voltage at the dissipation voltage node 626. The signal processors 628 allow the controller 606 to monitor current flowing through the coil 420, for example by monitoring the voltage across the sense resistor 622.

FIG. 6 shows arrows indicating flow of current through the system 600 in the various configurations described herein (e.g., during energizing of the coil 420, maintenance of the energized coil, and dissipation of energy from the coil 420). The system 600 shown in FIG. 6 includes an energizing path 630 (dot-dash stippled lines) that energies the coil 420 to generate the magnetic field (e.g., to open the valve). In an example, current flows through the energizing path 630 when the high side switch 612 and the low side switch 614 are closed. In another example, the system 600 includes the freewheel path 632 (dot-dash-dash stippled lines) that allows current to recirculate through the coil 420 (e.g., to maintain the magnetic field and hold the valve operator 400 in the open position). For instance, current flows in the freewheel path 632 including ground and the coil 420 when the high side switch 612 is open and the low side switch 614 is closed. In yet another example, the system 600 includes a flyback path 634 (dot-dot-dash stippled lines) that dissipates energy from the coil 420. In an example, current flows through the flyback path 634 when the high side switch 612 and the low side switch 614 are open. Accordingly, the system 600 operates the switches 612, 614 to direct current flow through one or more of the energizing path 630, the freewheel path 632, or the flyback path 634 to accomplish energizing of the coil 420 and generation of the magnetic field, maintenance of the magnetic field or dissipation of energy (and the magnetic field), respectively.

Figure 7:
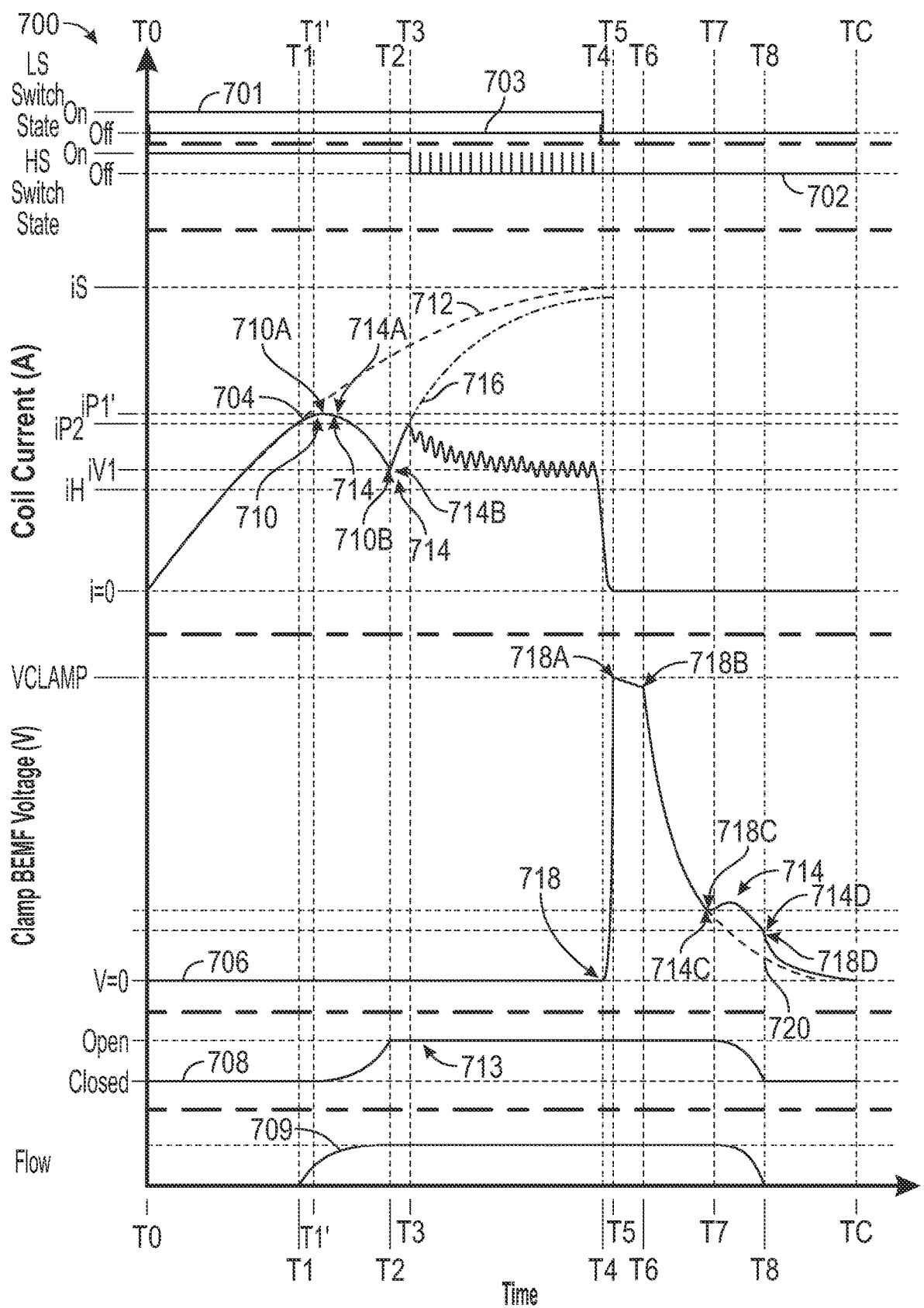

FIG. 7 illustrates a representation of one or more drive signals used to apply a specified duty cycle to a valve (e.g., the valve 304, shown in FIG. 3) and the resultant waveforms (e.g., valve characteristics, such as one or more electrical characteristics, valve operator positions, specified and actual duty cycles, or the like) that are monitored (or determined) by the controller 606 in combination with the sensors described herein. FIG. 7 shows one iteration (sequence) of an example specified duty cycle, the resulting actual duty cycle and the monitored or sensed characteristics described herein.

FIG. 7 shows time intervals T0, T1, T1', T2, T3, T4, T5, T6, T7, T8, and TC along a common X-axis for each of differing plots that follow characteristics of the nozzle control system 600 during operation. The Y axes of the respective plots are graduated by corresponding characteristics including, but not limited to, voltage, current, open or closed states (and intermediate positions) or the like. In an example, the high side switch 612 and the low side switch 614 (shown in in the upper most plots of FIG. 6) are modulated between on off states. The first (upper most) plot of FIG. 7 shows a low side switch state 700 and the second plot shows a high side switch state 702. For instance, the high side switch state 702 is in the on state at T0, and the low side switch state 700 is in the off state at T4. In some examples, a specified duty cycle 701 of the valve corresponds to the low side switch state 700 having a corresponding specified time length 703, in this example of T0 to T4 of one full cycle (e.g., for a complete cycle including on and off of time T0 to TC). In other examples, the specified duty cycle 701 is represented as a percentage (e.g., 30, 40, 50, 60 percent or so on) of one full cycle (time T0 to TC).

The controller 606 (in cooperation with the sensor 604, shown in FIG. 6) monitors a coil electrical characteristic 704 (e.g., current) of the coil 420 as shown in the third plot of FIG. 7. In another example, the controller 606 (in cooperation with the sensor 624, shown in FIG. 6) monitors a dissipation element electrical characteristic 706 (e.g., one or more of voltage, current, or the like) of the dissipation element 620 shown in the fourth plot of FIG. 7. Additionally, FIG. 7 shows a fifth plot of a valve operator position 708 indicating the position of the valve operator 400 within the valve 304 with the bottom of the curve corresponding to the closed position and the peak of the curve corresponding to the open position. In an example, the actual duty cycle of the valve corresponds to the valve operator position 708.

Further, flow 709 agricultural product or the like through the valve of the valve system 600 is shown in the sixth plot (lower most) in FIG. 7 and varies between a value of 0 (e.g., no flow) and 1 (e.g., 100 percent flow indicating the valve is open and steady state flow is provided). As discussed herein, movement of the valve operator 400 permits (or inhibits) flow 709 through the valve.

As shown in FIG. 7 with the specified duty cycle 701 corresponding to the low side switch state 700 and the actual duty cycle 713 corresponding to the valve operator position 708 the valve operator movement (opening and closing) lags in comparison to the specified duty cycle 701. For instance, the actual duty cycle 713 is clearly positioned behind (e.g., lagging, retarded, delayed, or the like) the specified duty cycle 701. This variation or lag between the actual and specified duty cycles 713, 701 causes errant application of agricultural product (e.g., quantity of product applied, location of application, or the like) relative to the specified duty cycle 701.

In one example, at time T0, the valve operator 400 is a closed position as shown with the valve operator position plot 708. At time T0 both of the high side switch 612 and low side switch 614 (shown in FIG. 6) are closed, a circuit is completed, and current begins to flow through the current sense resistor 622 and the coil 420 (shown in FIG. 6). The coil 420 initially behaves as an inductor (resisting the increased current), and the coil electrical characteristic 704 (e.g., current) does not change instantaneously, but instead increases over time from T0 onward. For example, the coil electrical characteristic 704 increases with time as shown in FIG. 7 after closure of the low side switch state 700 at T0. The resulting magnetic field generated from the coil 420 builds as current increases. The building magnetic field applies a corresponding increasing force to the moveable valve operator 400. As the magnetic field builds in the coil 420 and the lug 404 the force produced by the field overcomes the combination of forces holding the valve operator 400 in the closed position (e.g., pressure holding the valve 304 closed, the bias force holding the valve closed, and any other forces on the valve operator 400 holding it closed position such as gravity) and the operator 400 begins moving toward the open position.

The plotted coil electrical characteristic 704 shows a plurality of inflection points 710. As previously described, as the valve operator 400 begins to move (e.g., from closed to open) at approximately T1 a counter current is generated, and the counter current is graphically shown in FIG. 7 with a first inflection point 710A at T1 along the coil characteristic 704 plot. In contrast, if there was no moveable valve operator 400, the current would follow the upward trending path indicated by the first dashed line 712. In some examples, monitoring of this electrical characteristic is utilized to diagnose a service issue with the valve 304, such as the absence of a valve operator 400 (e.g., after servicing). If the valve operator 400 is missing from the valve 304 (e.g., errantly not replace after service) the electrical characteristic 704 will behave in a manner consistent with first dashed line 712 and thereby facilitate diagnosis of a missing operator 400.

The fifth plot of FIG. 7 shows the valve operator position 708, and the valve operator position 708 corresponds to a position of the valve operator 400 within the valve 304 with the bottom of the curve corresponding to the closed position and the peak of the curve corresponding to the open position. In an example, FIG. 7 shows the valve operator 400 beginning to translate at time T1 (e.g., a translation start time, corresponding to when the measured current signature starts to depart from the dashed line 712). In an example, Faraday's law indicates that movement of the valve operator 400 generates a field in the coil 420. Lenz's law indicates that the current generated by the valve operator 400 must oppose the direction of the building magnetic field caused by the driver of the coil 420 (e.g., the characteristic 704, current, provided with the power conditioning system 608, or the like). Accordingly, in an example, a change (e.g., decrease with respect to time) in the coil electrical characteristic 704 (the third plot), current, indicates one or more valve operator translation signatures 714, specifically indicating when the valve operator 400 begins opening movement (from closed) toward the lug 404 of the valve 304.

In some examples, the controller 606 (shown in FIG. 6) compares the monitored electrical characteristics of the system 600 to the one or more valve operator translation signatures 714 (shown in the third plot and the fourth plot of FIG. 7). For instance, a first valve operator translation signature 714A corresponds to at least one inflection point 710 of the coil electric characteristic 704 for example at T1'. In an example, the inflection points 710 include one or more of a change in magnitude of a derivative of the characteristic 704, such as an increase in the rate that the slope is decreasing; a change in sign of the slope of the characteristic 704; a change in sign of the derivative of characteristic 704; peaks and valleys; or the like. The controller 606 monitors the coil electric characteristic 704 (the third plot) and indexes at least a component of movement of the valve operator 400 (shown in the fifth plot) based on features of one or more of the coil electrical characteristic 704 or the dissipation element characteristic 706 (the fourth plot). The controller 606 compares the indexed the electrical characteristics to the valve operator translation signature 714, for example by locating one or more of the inflection points in one or more of the coil electric characteristic 704 or the dissipation element characteristic 706.

Referring to FIG. 7, as the valve operator 400 moves (indicated with the valve operator position 708), the inductance of the coil 420 begins to change as more of the volume inside the solenoid 421 is converted from fluid with a low magnetic permeability to include the valve operator 400 material with a relatively higher magnetic permeability. When the valve operator 400 reaches the top of the valve 304 (fully open, shown in FIG. 4) and shown at T2 in the fifth plot of FIG. 7 the valve operator 400 stops moving and no longer generates a counter current in the coil 420. As shown with the coil electric characteristic 704 (third plot), the current ceases decreasing at a second inflection point 710B and begins to rise again. The current in the coil 420 continues to build as it did before due to the potential through the coil 420 (applied by the power conditioning system 608) without the counter current provided by the previously moving valve operator 400. Accordingly, the second inflection point 710B corresponds to a second valve operator translation signature 714B indicating the valve operator 400 is fully open. Thus, the controller 606 monitors the coil electric characteristic 704 and determines that the valve operator 400 has fully moved to the open position based on the valve operator translation signature 714B at time T2.

At time T2, the valve operator 400 is at the open position, and at time T3 the controller 606 optionally reduces the current and associated magnetic field in the solenoid 421 for instance to save energy. For instance, the controller 606 maintains the current at a lower level recognized to retain (e.g., maintain) the valve operator 400 in the open position. In an example, the current is modulated as shown with the sawtooth wave at T3 (e.g., with selective opening and closing of the high side switch 612 while the low side switch 614 is closed). For example, the electrical resistance in the coil 420 and loss in one or more of the dissipation elements 616 and switches 612, 614 causes the coil electrical characteristic 704 to decay. In order to maintain the field generated by the coil 420, the high side switch 612 is modulated to add energy to the solenoid 421 (e.g., the coil 420, or the like) as needed to maintain the valve operator 400 open while minimizing power usage.

The modulated current maintains the magnetic field in the solenoid 421 with a slight imbalance (e.g., relative to gravity, fluid pressure, bias from the bias element or the like) to ensure retention of the valve operator 400 in the open position. In an approach, the inductance of the coil 420 is higher and the coil electrical characteristic 704 would follow the path indicated by a second dotted line 716 in the coil electrical characteristic 704 until it had saturated near a maximum value (e.g., approaches a limit, or the like) if the high side switch 612 was maintained in the on state.

Modulating (e.g., selectively opening and closing) the high side switch 612 circulates current in the system 600 at a level to generate a magnetic flux between the lug 404 and the valve operator 400 so as to maintain the position of the valve operator 400 (e.g., in the open position). Accordingly, the system 600 modulates the switch 612 to provide a force imbalance incident upon the valve operator 400 and ensure retention of the valve operator 400 in the open position while reducing the power needed to maintain the position of the valve operator 400.

In some examples, the high side switch 612 is modulated between the on state and the off state (e.g., by selectively closing and opening the switch 612) while maintaining the low side switch 614 in the on (e.g., closed) state. Modulating the high side switch 612 while the low side switch 614 is in the on state causes current to flow through the freewheel path 632 that, in some examples, includes the low side switch 614, the first dissipation element 618, the sense resistor 622, and the coil 420 (shown in FIG. 6). Accordingly, modulating the high side switch 614 reduces the power usage for the system 600 to maintain the position of the valve operator 400 (e.g., in the open position). Thus, the performance of the system 600 is enhanced because of the reduced power consumption to maintain the position of the valve operator 400. In some examples, modulating the high side switch 612 between closed and open (with the low side switch 614 closed) ensures retention of the valve operator 400 in the open position is referred to as a hit-and-hold algorithm.

In an example, during a rising edge of the low side switch control, a hit state is initiated in the high side switch 612 and the controller 606 starts recording electrical characteristics, for example by monitoring the current flowing through the coil 420. The controller 606 analyzes the current data collected to determine if the valve operator 400 has translated between the open position and the closed position. In some examples, the controller 606 waits for a specified delay and repeats the analysis if a translation is not detected. In another example, the monitored valve characteristics change during operation based on the composition of fluid (liquid, gas, or mixture of liquid and gas) present in the valve 304 (e.g., the valve is primed with agricultural product, or the like). For instance, the monitored valve characteristics change when the valve 304 transitions from the unprimed state to the primed state. In yet another example, the controller 606 monitor either or both of current or voltage to assess variations in opening and closing behavior of the valve 304 that indicates whether the valve 304 is in an unprimed state or a primed state.

In an example, when the controller 606 determines the valve operator 400 has translated, the controller 606 optionally stops monitoring the electrical characteristics of the coil 420 and maintains the position of the valve operator 400 (e.g., by modulating the switch 612, or the like). Optionally, the controller 606 waits for a specified duration for a compare event in the low side switch 614 timer. When a compare event occurs, the low side switch 614 and the high side switches 612 are turned to an off state. Accordingly, current is forced to recirculate in the flyback path 634 to be dissipated across the second dissipation element 620 (e.g., a clamping diode, or the like). At this point, the controller 606 monitors the dissipation characteristic 706 (e.g., a flyback voltage, or the like). At the end of a wait period (e.g., either 10 ms or the until the next update event), the controller 606 analyzes the dissipation characteristic for transition signature 714.

The valve operator 400 is optionally moved to the closed position, for instance at time T4. In an example, both the high side switch 612 and the low side switch 614 are transitioned to the off state (e.g., to inhibit current flow through the switches 612, 614). With the switches 612, 614 in the off state, current is inhibited from flowing through the freewheel path 632. Accordingly, the current recirculating in the coil 420 flows through the flyback path 634 (see FIG. 6), optionally including the dissipation element 620 (e.g., a clamping diode), and begins to dissipate to free the valve operator 400 to move to the closed position.

FIG. 7 shows the monitored dissipation element electrical characteristic 706 (e.g., one or more of voltage, current, or the like) of the dissipation element 620 in the fourth plot. In an example, the dissipation element electrical characteristic 706 ("dissipation characteristic 706") includes a monitored voltage at the dissipation voltage node 626 (shown in FIG. 6). Since the dissipation characteristic 706 is greater than the voltage potential across the coil 420 with the switches 612, 614 in the off state, the energy of the magnetic field is quickly collapsed into a high electrical potential at the dissipation voltage node 626. Conversely, as the voltage across the coil 420 rapidly rises the coil characteristic 704 (e.g., current) shown in the fourth plot flowing through the coil 420 quickly collapses to 0, for instance as shown by time T5 proximate to time T4. As previously discussed, current generates the magnetic field that retains the valve operator 400 in the open position, and the rapid decrease of current (and corresponding magnetic field) accordingly permits the movement of the operator toward the closed position.

In between T5 and T6, the dissipation characteristic (voltage) 706 is saturated, current decreases as shown in the third plot, and the magnetic field generated by the coil 420 decreases quickly. As the field decreases, the corresponding force retaining the open position of valve operator 400 against the fixed lug 404 dissipates—and the force provided by the biasing element 418 (shown in FIG. 4) overcomes the retaining force and closing movement of the valve operator 400 is initiated. In some examples, the dissipation characteristic 706 includes one or more voltage inflection points 718. For instance, a first voltage inflection point 718A (shown at T5) correlates to the time when the current is directed to the second dissipation element 620 (and the voltage at the node 626 rises). In an example, a second voltage inflection point 718B (shown at T6) corresponds to when the dissipation element 620 is no longer saturated. FIG. 7 shows the valve operator position 708 (fifth plot) begins movement from the open position to the closed position at approximately T7 (e.g., a translation start time) corresponding to a third voltage inflection point 718C. Closing movement finishes at approximately T8 (e.g., a translation stop time) corresponding to a fourth voltage inflection point 718D. In an example, as the valve operator 400 moves away from the collapsing magnetic field, the valve operator 400 induces a current in the coil 420, and accordingly provides a corresponding change in the otherwise dissipating voltage of characteristic 706 having a third valve operator translation signature 714C. For example, the valve operator translation signature 714C includes a change (e.g., an increase with respect to time, or the like) in the dissipation element electrical characteristic 706, voltage in the example shown. In an example, the third voltage inflection point 718C corresponds to movement of the valve operator 400 (e.g., translation signature 714C). Completion of movement corresponds to, for instance, the fourth inflection point 718D and a fourth translation signature 714D when the valve operator 400 comes to a rest (and the valve 304 is closed).

In one example, Lenz's law indicates that the current generated by the valve operator 400 transitioning to the closed position opposes the change in the characteristic 706 as a result of the collapsing magnetic field. Thus, in an example, instead of seeing the voltage decay of the coil 420 (e.g., an inductor, or the like) that is discharging (represented by a third dotted line 720), the dissipation characteristic 706 will rise and then fall relative to the previous decay until the valve operator 400 has completed its movement (e.g., translation, transition, stroke, displacement, change, shift, or the like) from the open position (e.g., at T7) to the closed position (e.g., at T8). In an example where the field generated by the solenoid 421 is insufficient to maintain the valve operator 400 in the open position, the valve operator 400 will transition to the closed position prior to turning off the switches 612, 614. At time T8, the valve operator 400 has fully completed movement to the closed position, and any remainder of the field generated by the coil 420 decays based on the lower inductance in the coil 420 since the fluid gap 500 has been reintroduced. In some examples, the valve 304 remains in this de-energized state until time TC which is the duration of a cycle.

Figure 8A:
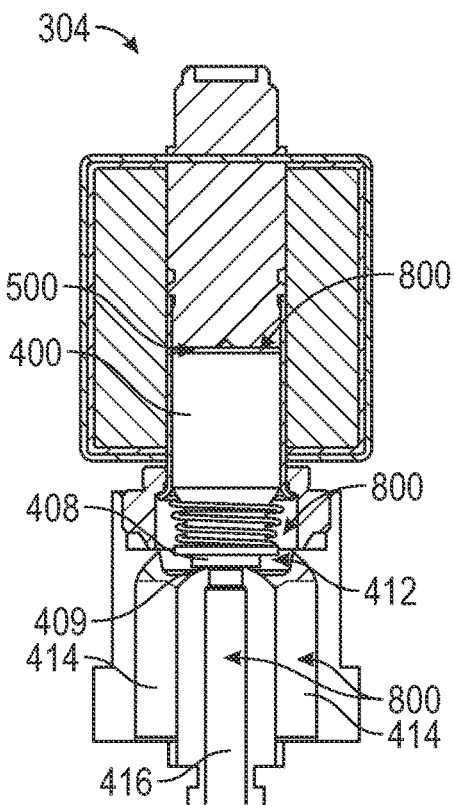
FIG. 8A illustrates a cross-sectional view of the valve of FIG. 4 in a fully unprimed state.
Figure 8B:
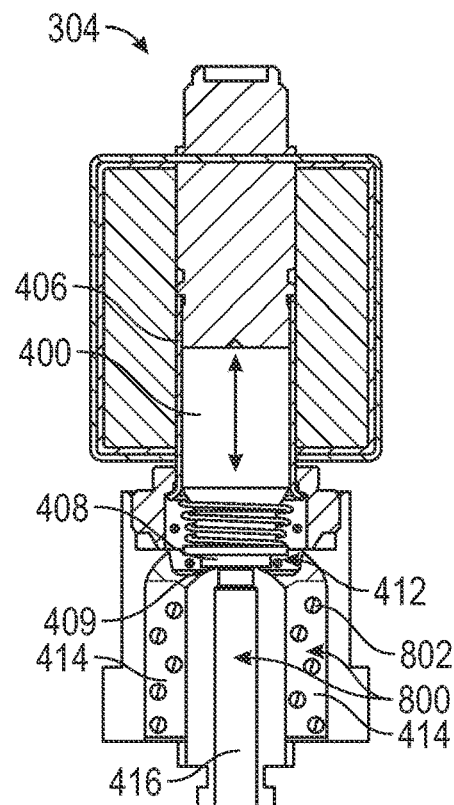
FIG. 8B illustrates a cross-sectional view of the valve of FIG. 4 in a partially unprimed state.
Figure 8C:
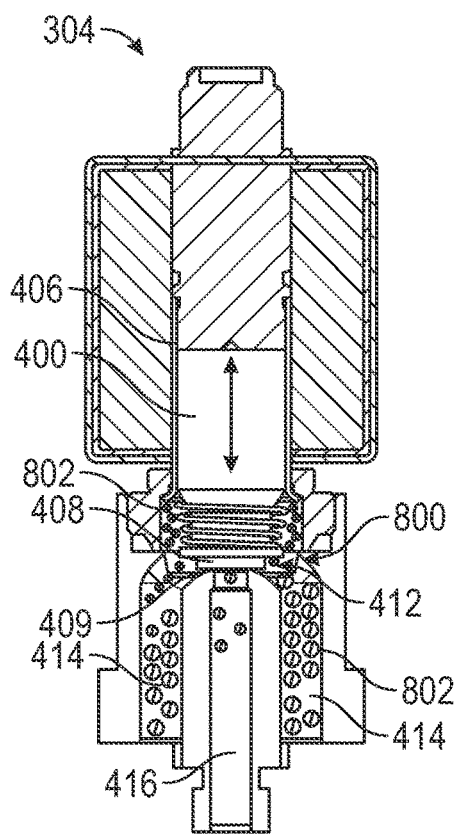
FIG. 8C illustrates a cross-sectional view of the valve of FIG. 4 in a primed state with a valve operator in an open position.
Figure 8D:
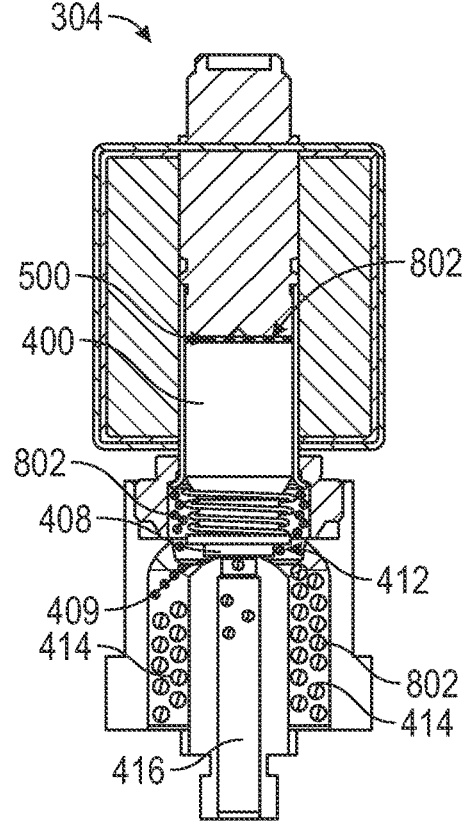
FIG. 8D illustrates a cross-sectional view of the valve of FIG. 4 in a primed state with a valve operator in a closed position.

FIGS. 8A, 8B, 8C, and 8D illustrate cross-sectional views of the control valve 304 in one or more of a primed state, an unprimed state and intermediate states. For example, FIG. 8A and FIG. 8B show the valve 304 in a fully unprimed state and partially unprimed state (collectively referred to as unprimed). FIG. 8C and FIG. 8D show the valve 304 in the primed state with the valve operator open and closed, respectively (also shown in FIGS. 4 and 5). In an example, the fluid chamber 800 of the valve 304 receives a fluidic mixture including one or more of a gas (e.g., air) or a liquid (e.g., water, agricultural product such as fertilizer, or the like). The fluid chamber 800 includes one or more of the valve inlet 414, the valve outlet 416, the channel 412 between the inlet 414 and the outlet 416, and a space between the valve operator 400 and the housing 406, such as a fluid gap 500. The valve 304 receives fluid (e.g., agricultural product, water, air, or the like) through the valve inlet 414. Movement of the valve operator 400 selectively opens and closes the channel 412 and allows fluid flow through the valve 304 to the outlet 416. For example, the seal 408 of the valve operator 400 engages with a valve seat 409 (shown in the closed configuration in FIG. 5, FIG. 8A, and FIG. 8D) thereby arresting flow of fluid through the channel 412. In the open position, the seal 408 is disengaged from the seat 409 (as shown in FIG. 4, FIG. 8B, and FIG. 8C) thereby allowing fluid flow through the channel 412 (e.g., because the valve operator 400 having the seal 408 is moved away from the seat 409).

FIG. 8A shows the fluidic mixture in the fluid chamber 800 having a first fluidic composition (FIG. 8A is shown without liquid to illustrate the presence of a gas). For example, the fluid mechanical characteristics of the valve 304 change in correspondence with the composition of the fluidic mixture in the fluid chamber 800. In an example, the first fluidic composition has a first density when the fluid chamber 800 primarily includes a gas (e.g., air, or the like). Accordingly, in this example the valve 304 is in the unprimed state when the first fluidic composition in the fluid chamber 800 has the first density. FIG. 8B shows a second fluidic composition in the fluid chamber 800. In another example, the second fluidic composition has a second density (shown by the presence of liquid 802 in comparison to FIG. 8A). In one example, the fluid chamber 800 includes the liquid 802 at a first proportion or ratio (with respect to gas in the fluid chamber 800) and accordingly the fluidic mixture has the second fluidic composition (shown with proportion of liquid 802 in the fluid chamber 800). The liquid 802 is supplied to the control valve 304 (e.g., by the master PWM valve 206) and selectively flows through the valve 304 according to movement of the valve operator 400.

In an example, the flow of liquid 802 through the valve 304 displaces the gas included in the fluid chamber 800 and corresponds to the valve 304 transitioning from the unprimed state to the primed state (e.g., ready to apply the fluid agricultural product). For example, the valve 304 is in the unprimed state when the fluidic mixture in the chamber 800 has the first fluidic composition or the second fluidic composition indicating initiation of priming of the valve 304. In another example, the fluidic mixture in the chamber 800 has a third fluidic composition where the fluid chamber 800 has a greater percentage of liquid (with respect to gas in the fluid chamber 800) in comparison to the percentage of liquid in the second fluidic composition. FIG. 8C and FIG. 8D show the fluidic mixture in the fluid chamber 800 having the third fluidic composition (shown by the increased concentration of liquid 802 in comparison to FIG. 8A and FIG. 8B). In an example, the valve 304 is in the primed state when fluidic mixture in the fluid chamber 800 fills the fluid chamber (e.g., at least the valve inlet 414), for instance illustrated with the third fluidic composition in FIGS. 8C-8D. Accordingly, in an example, filling of the valve 304 (e.g., the valve inlet) with the agricultural product and minimizing of gases is illustrative of priming of the valve 304, and is shown in FIGS. 8A-D by the illustrated changes in composition of the fluidic mixture in the fluid chamber 800.

Figure 9:
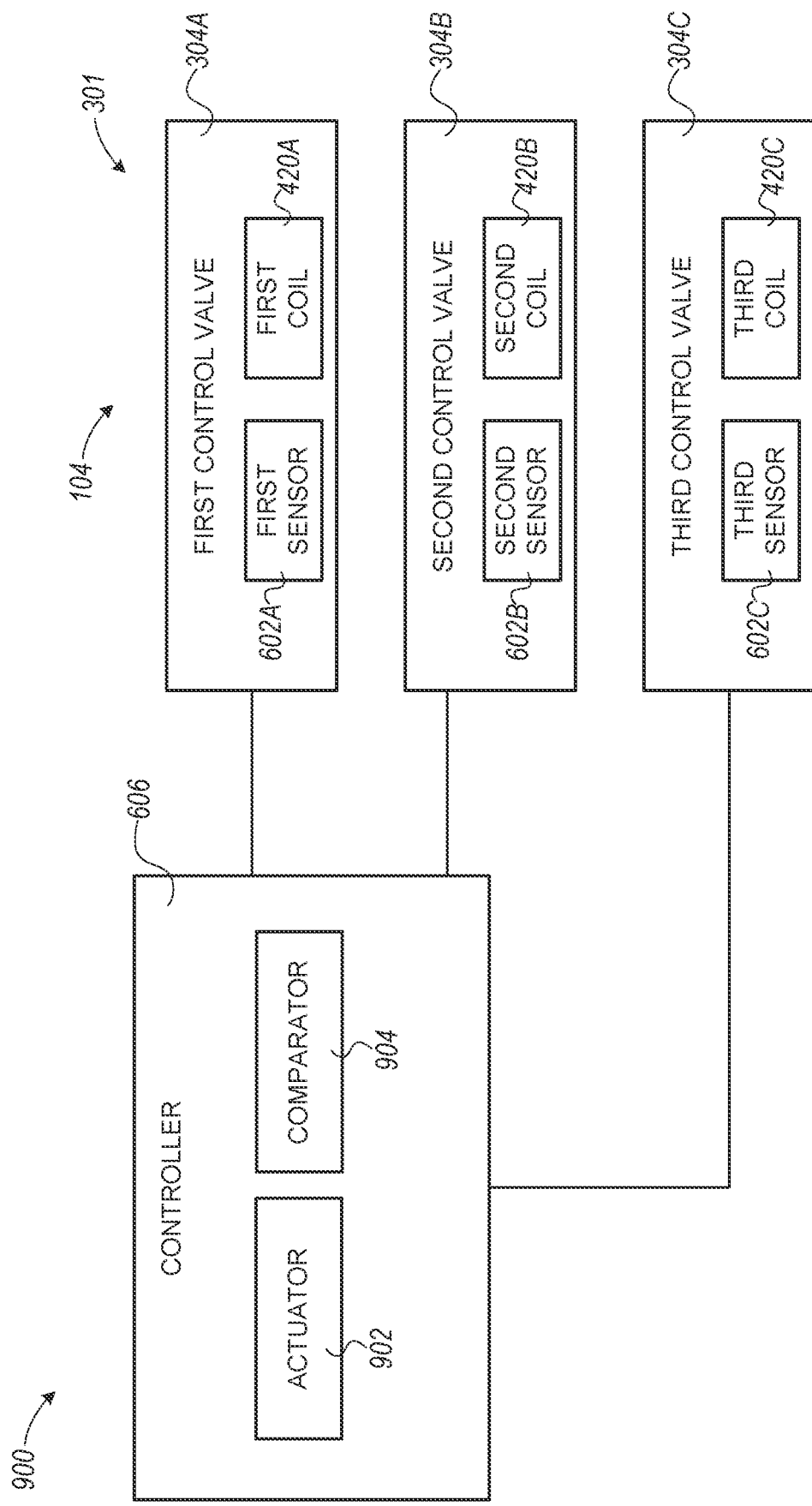
FIG. 9 illustrates a block diagram of a system for applying an agricultural product.

FIG. 9 illustrates a block diagram of an agricultural product application system 900. The system 900 includes the controller 606 and the one or more control valves 301 (e.g., one or more of the valve 304 shown in FIGS. 3-5 and 8A-8D). The controller 606 monitors the operation of the valve operator 400 (shown in FIGS. 3-5 and 8A-8D). As discussed herein, monitoring the operation of the valve operator 400 facilitates, in one example, determining if one or more of the valves 301 are in the primed state, the unprimed state, or blocked (e.g., fully blocked, fouled or the like).

In an example, the one or more control valves 301 include a first control valve 304A, a second control valve 304B, and a third control valve 304C. The controller 606 includes an actuator interface 902 that facilitates opening and closing of the valves 301. For instance, the actuator interface 902 is in communication with the first control valve 304A to energize a first coil 420A and cause movement of the valve operator (e.g., the valve operator 400, shown in FIGS. 4-5 and 8A-8D) from the closed position toward the open position. In another example, the actuator interface 902 cooperates with the valve 304B to energize a second coil 420B (and accordingly move a valve operator of the valve 304B). In yet another example, the actuator interface 902 cooperates with the valve 304C to energize a third coil 420C (and accordingly move a valve operator of the valve 304C).

The controller 606 monitors one or more valve characteristics of the one or more control valves 301. In an example, the first control valve 304A includes at least a first sensor 602A that facilitates monitoring of valve characteristics of the control valve 304A. The first sensor 602A measures an amount of electrical current across the first coil 420A and the controller 606 monitors the first sensor 602A. Accordingly the controller 606 monitors the current across the first coil 420A with the first sensor 602A. In a similar example, the second control valve 304B and third control valves 304C include respective second and third sensors 602B, 602C that facilitate monitoring of valve characteristics of the control valves 304B, 304C. The controller 606 optionally monitors other valve characteristics of the valves 301, such as electrical characteristics (e.g., voltage, or the like), valve operator positions (e.g., by way of monitoring associated electrical characteristics), specified and actual duty cycles, or the like.

Referring to FIGS. 8A-8D and as described herein, movement of the valve operator 400 facilitates flow (or no flow) through the valve 304. As the liquid 802 enters the fluid chamber 800, the ratio of liquid to gas (corresponding to composition) of the fluidic mixture changes. For example, the ratio of the fluidic mixture in the fluid chamber 800 increases as liquid 802 (e.g., agricultural product, or the like) displaces the gas (e.g., air) in the valve 304. Accordingly, in one example the density of the fluidic mixture within the fluid chamber 800 increases. The fluid mechanical resistance to movement of the valve operator 400 changes in correspondence with the fluid mechanical characteristics of the valve 304, for instance density of the fluidic mixture in the fluid chamber 800 and in contact with the operator 400. For example, FIG. 8A shows the fluidic mixture having the first fluidic composition in the fluid chamber 800, a relatively high ratio of gas to liquid. As shown in FIG. 8B, the liquid 802 is received in the fluid chamber 800, and the liquid 802 fills the fluid chamber 800 changing the ratio of liquid relative to gas. The liquid 802 is denser than the gas in the fluid chamber 800, and accordingly the liquid 802 increases resistance to movement of the valve operator 400 (e.g., increases drag, inertia or the like). In another example, the liquid 802 is less compressible than the gas in the fluid chamber 800, and accordingly the fluid mechanical resistance to movement increases with the presence of liquid 802 in the fluid chamber 800. In an example, the ratio of liquid to gas of the fluidic mixture in FIG. 8B is greater than the ratio of the fluidic mixture in FIG. 8A since the fluid chamber 800 includes the liquid 802 at the first concentration in FIG. 8B (and the liquid 802 is absent or an incidental quantity in the fluid chamber 800 in FIG. 8A).

In another example, the liquid 802 is received between the valve operator 400 and the housing 406. For instance, FIG. 8D shows the liquid 802 (shown as small dot stippling) is received in the fluid gap 500. Accordingly, the fluidic mixture is interposed between the operator and the remainder of the valve 304 and flows around the valve operator 400 as the valve operator 400 moves with respect to the housing 406. As described herein, a change in the ratio of liquid to gas of the fluidic mixture (and corresponding change in density) in the fluid chamber 800 induces a corresponding change in resistance to movement of the valve operator 400. For example, the fluidic mixture having the first fluidic composition (e.g., shown in FIG. 8A) imparts a first amount of drag, inertia or the like on the valve operator 400 as the valve operator 400 moves with respect to the housing 406. In another example, the fluidic mixture having the second ratio of liquid to gas (shown with the liquid 802 at a first concentration in FIG. 8B) imparts a second greater resistance to movement (e.g., drag, inertia or the like) on the valve operator 400 as the valve operator 400 moves with respect to the housing 406. In yet another example, the fluidic mixture having the third greater ratio of liquid to gas (and corresponding increased density) in FIGS. 8C, D imparts a greater third resistance to movement to the valve operator 400. The resistance to motion of the valve operator 400 increases based on the quantity of liquid 802 in the fluid chamber 800 relative to the quantity of gas in the fluid chamber 800. The denser liquid resists motion of the valve operator 400. As discussed herein, resistance to motion of the valve operator 400 (including lack thereof) is detected and monitored to determine the primed and unprimed states of control valves and other states, such as tip blockage.

Referring to FIG. 4 and FIG. 5 (and as described herein), the coil 420 generates a magnetic flux, and the valve operator 400 moves according to the magnetic flux generated by the coil 420. For instance, the coil 420 induces a force on the valve operator to move the valve operator from the closed position (shown in FIG. 5) and the open position (shown in FIG. 4). In an example, the resistance to movement of the valve operator 400 varies in correspondence with the fluid mechanical characteristics of the valve 304, for instance the ratio of the liquid to gas in the fluid mixture (and the attendant density) in the fluid chamber 800 (shown in FIGS. 8A-8D). Accordingly, the force to move the valve operator 400 with respect to the housing 406 varies in correspondence with the resistance to motion imparted to the valve operator 400 by the fluidic mixture. In an example, the fluidic mixture in the chamber 800 has a greater ratio of gas to liquid (e.g., the first fluidic composition shown in FIG. 8A), and the coil 420 receives a current value and generates a corresponding first magnetic flux to cause movement of the valve operator 400. Because of the gas, the current and associated first magnetic flux are minimal in comparison to other example states (e.g., FIGS. 8B-D). The first state shown in FIG. 8A and associated current to cause movement of the valve operator 400 are indicative of the valve 304 having an unprimed state.

In yet another example, the fluidic mixture in the chamber 800 has the second ratio of liquid to gas (and, in one example, corresponding greater density) as shown in FIG. 8B, and the fluidic mixture accordingly imparts a greater resistance to movement to the valve operator 400. The coil 420 receives a second greater current that generates a second (also greater) magnetic flux to cause movement of the valve operator 400. The second greater magnetic flux overcomes greater resistance to movement provided by the fluidic mixture. In the third configuration shown in FIGS. 8C, 8D the fluidic mixture in the chamber 800 has the third ratio of liquid to gas and corresponding fluidic composition. The coil 420 receives a third current (greater than the second current) and generates a corresponding third magnetic flux to overcome the greater resistance to motion provided by the fluid fixture to the valve operator 400. The third magnetic flux and associated current are greater than the second magnetic flux and associated current. The second and third states shown in FIGS. 8B-D and associated current to cause movement of the valve operator 400 are indicative of the valve 304 approaching and achieving a primed state. As discussed herein, the monitoring of current, voltage or the like associated with the valve 304 and variations in those characteristics facilitates identification of the state of the valve 304 including, but not limited to primed or unprimed states, intermediate states therebetween, as well as tip blockage (including full blockage, partial blockage, fouling or the like). Thus, one or more valve characteristics of the valves 301 vary in correspondence with the priming of the valves 301 (e.g., whether the valves 301 are in the primed state or unprimed state) and monitoring of the valve characteristics facilitates identification of the status of the valves 304.

The agricultural product application system 900 (shown in FIG. 9), including the controller 606 monitors valve characteristics such as current through the coil 420. For example, the controller 606 determines whether individual ones of the valves 301 are in the primed state or unprimed state, blocked (e.g., fully, partially, fouled) or the like based on the monitored valve characteristics. In an example, the controller 606 monitors current through the coil 420 to determine whether individual ones of the valves 301 are in the primed state or the unprimed state. For instance, the controller 606 monitors variations in current applied to coils to determine whether individual ones of the valves 301 are in the primed state or the unprimed state. In another example, the controller 606 monitors a valve operator transition time to determine whether each of the valves 301 are in the primed state or the unprimed state.

As shown in FIG. 9, the system 900 includes a comparator 904 with the controller 606, and the comparator 904 facilitates assessment of the status of the valves 301 (e.g., primed, unprimed, blocked or the like). For instance, the comparator 904 compares the monitored valve characteristics to a primed valve characteristic threshold to determine whether the valves 301 are in the primed state or the unprimed state. In an example, the controller 606 determines the valve 304A (shown in FIG. 9) is in the primed state when the monitored valve characteristics (in one example current to develop magnetic flux) exceed the primed characteristic threshold, such as a current threshold indicative of a lower magnetic flux that opens a valve filled or partially filled with a gas. In an example, the primed valve characteristic threshold includes a specified current value (e.g., a known current for an unprimed valve). In another example, the primed valve characteristic threshold includes a preceding current value when the valve 304 is known to be in an unprimed state (e.g., at start up of the system or after flushing of the system). In yet another example, the primed valve characteristic threshold includes identification of trend in current values with opening or closing of the valve 304. For instance, the primed valve characteristic threshold includes differences between current values during a priming operation. The controller 606 operates the valve 304 with multiple instances of opening, and the current values approach a consistent current value after the valve 304 is primed (e.g., the current approaches an asymptote, or the like). The controller 606 optionally monitors differences between current values during valve movement (e.g., opening) and determines the valve operator threshold is exceeded when the differences between current are minimized, for instance the current used to open in successive opening operations is similar (e.g., identical, or with minimal change between operations).

For instance, the actuator interface 902 (shown in FIG. 9) cooperates with the valves 301 to repeatedly open and close individual ones of the valves 301 (e.g., valve 304A). In an example, the actuator interface 902 cooperates with a switch (e.g., the low-side switch 614, shown in FIG. 6) to provide energy to the coil 420A (and induce a force on the valve operator of the first control valve 304A). The controller 606 monitors the valve characteristics of the valves 301 while opening and closing the valves 301. Opening and closing the valves while the controller 606 monitors the valve operation (e.g., current to open the valve) identifies whether the valve is in the primed state or the unprimed state (as well as intermediate states, the valve is blocked or the like) based on variations in valve characteristics.

In one example, the controller 606 cooperates with the first sensor 602A to monitor the valve characteristics of the valve 304A. In an example, the controller 606 monitors the current through the coil 420A with the sensor 602A while opening and closing the valve 403A with the actuator interface 902. The comparator 904 compares the monitored current through the coil 420A to the valve characteristic threshold (e.g., a current threshold, previous current value or behavior or the like). The controller 606 determines whether the valve 403A is in the primed state based on the comparison of the monitored valve characteristics (e.g., current) to the valve characteristic threshold. For instance, the controller 606 determines the valve 304A is in the primed state when the current through the coil 420A exceeds the valve characteristic threshold.

Figure 10:
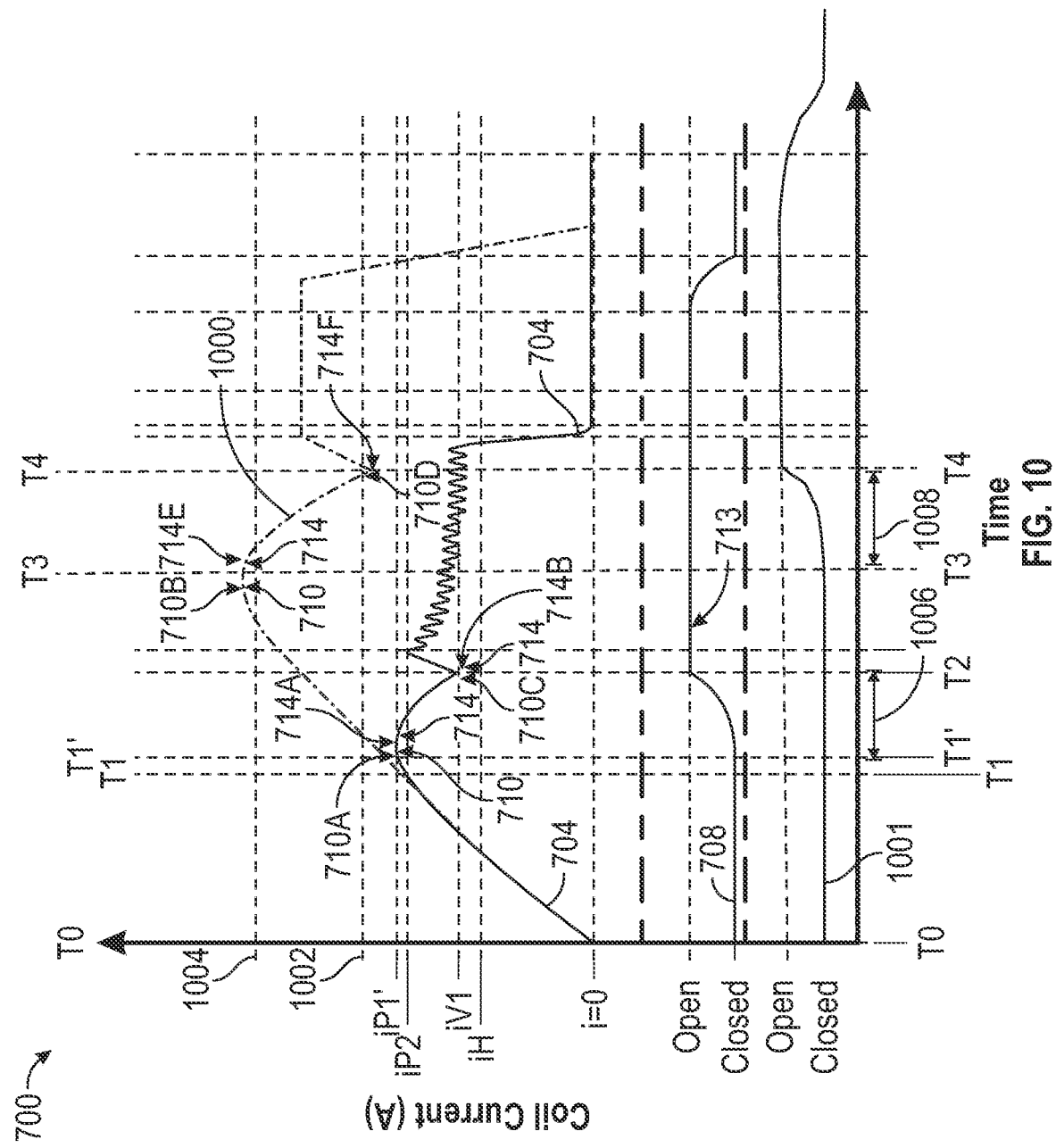
FIG. 10 illustrates a representation of characteristics of valve operation that are monitored (or determined) by the controller in combination with sensors described herein.

FIG. 10 illustrates a representation of characteristics of valve operation (e.g., electrical characteristics, valve operator positions, or the like) that are monitored (or determined) by the controller 606 in combination with the sensors described herein. FIG. 10 shows two types of monitored or determined valve characteristics. For instance, FIG. 10 shows the coil electrical characteristic 704. In this example, the coil characteristic 704 is a first coil characteristic, such as current through a coil (e.g., the coil 420A, shown in FIG. 9) during a first valve operator cycle. Additionally, FIG. 10 shows a second coil characteristic 1000. Further, FIG. 10 shows the valve operator position 708 as a second example characteristic of valve operation representative of the position of the valve operator (e.g., the valve operator 400) during the first valve operator cycle. For example, the bottom of the curve for the valve operator position 708 corresponds to the closed position and the peak of the curve corresponds to the open position, while the sloped portions are representative of the operator moving between the open and closed positions.

The second coil characteristic 1000 corresponds to the current through the coil during a second valve operator cycle indicative of the valve in a primed state. Still further, FIG. 10 shows the valve operator position 1001 indicating the position of the valve operator (e.g., the valve operator 400) during the second valve operator cycle. For instance, the bottom of the curve for the valve operator position 1001 corresponds to the closed position and the peak of the curve corresponds to the open position.

As described herein, one or more valve characteristics of the valves 301 vary in correspondence with the priming of the valves 301 (e.g., whether the valves 301 are in the primed state or unprimed state). The valves 301 include a fluid chamber (e.g., the fluid chamber 800, shown in FIG. 8, or the like), and the valve characteristics vary in correspondence with the presence of a fluidic mixture (and ratio of gas and liquid) in the fluid chamber. FIG. 10 shows variations in valve characteristics between the first valve operator cycle (e.g., having coil characteristic 704) and the second valve operator cycle (e.g., having coil characteristic 1000). For instance, the first coil characteristic 704 is representative of valve operation with the fluid chamber of the valve 304 having a first ratio of fluids (e.g., the fluid chamber primarily includes a gas, such as air or the like). The second coil characteristic 1000 is representative of the fluid chamber having the third fluidic composition (e.g., the fluid chamber 800 includes a greater ratio of liquid to gas, including liquid predominantly or entirely). Accordingly, the current value to move the valve operator 400 in the first valve operator cycle is less than the current to move the valve operator 400 in the second valve operator cycle (e.g., because of the greater resistance to motion in the second cycle). FIG. 10 shows the first coil characteristic 704 with a first inflection point 710A (in this example a peak). The second coil characteristic 1000 has a second inflection point 710B (also a peak in this example). In this example, the second inflection point 710B has a greater magnitude than the first inflection point 710A. Thus, FIG. 10 shows the current flowing through the coil during the first valve operator cycle (e.g., coil characteristic 704) is less than the current flowing through the coil in the second valve operator cycle (e.g., coil characteristic 1000).

The controller 606 (shown in FIG. 9) monitors the valve characteristics to determine whether the valves 301 are in the primed state or the unprimed state. For example, the comparator 904 (shown in FIG. 9) of the controller 606 compares valve characteristics between valve operator cycles. In an example, the controller 606 helps compare the control valve characteristics of the second valve operator cycle (represented with the characteristics 1000) with the control valve characteristics of the first valve operator cycle (represented with the characteristics 704). For instance, the comparator 606 helps determine a difference between the control valve characteristics with respect to the first and second valve operator cycles to facilitate identification of the status of the associated valve (e.g., primed, unprimed, an intermediate state or the like).

In an example, the controller 606 actuates the valves 301 (shown in FIG. 9) to open and close (as described herein). The comparator 904 of the controller 606 compares the valve characteristics to a first valve characteristic threshold 1002 (e.g., a current threshold, previous current value, or the like). The first valve characteristic threshold 1002 corresponds to a current value indicative of the valve being in the unprimed state. For instance, the comparator 904 compares one or more of the first coil electrical characteristic 704 or the second coil characteristic 1000 to the first valve characteristic threshold 1002. In an example, the controller 606 determines the valve is in the unprimed state when one or more of the coil characteristics 704, 1000 is equal to or less than the first valve characteristic threshold 1002. As shown in FIG. 10 the magnitude of the valve operator translation signature 714A (corresponding to a peak current load during the first cycle) is less than the magnitude of the first valve characteristic threshold 1002. Accordingly, the controller 606 determines the valve is in the unprimed state in the first valve operator cycle because the valve operator translation signature 714A is less than the first valve characteristic threshold 1002.

In another example, the comparator 904 of the controller 606 compares the valve characteristics to a second valve characteristic threshold 1004. For instance, the second valve characteristic threshold 1004 corresponds to a current value indicative of the valve in the primed state. In an example, the comparator 904 compares one or more of the first coil electrical characteristic 704 or the second coil characteristic 1000 to the second valve characteristic threshold 1004. In another example, the controller 606 determines the valve is in the primed state when one or more of the coil characteristics 704, 1000 (e.g., their peaks, inflection points or the like) exceed the second valve characteristic threshold 1004. For example, FIG. 10 shows the magnitude of the valve operator translation signature 714B is greater than the second valve characteristic threshold 1004. Accordingly, the controller 606 determines the valve is in the primed state because the valve operator translation signature 714*j*B exceeds the second valve characteristic threshold 1004.

In an example, the agricultural product application system 900 uses the valve operator translation signatures 714 to determine one or more valve operator transition times corresponding to a time duration for movement of the valve operator 400 between open and closed positions. In another example, the first valve operator translation signature 714A corresponds to the inflection point 710A of the coil electric characteristic 704 (at T1'). The first inflection point 710A corresponds to the valve operator (e.g., valve operator 400, shown in FIG. 4) initiating movement from the closed position to the open position (shown with the valve operator position 708 in FIG. 10) during the first valve operator cycle. The second inflection point 710B corresponds to a second valve operator translation signature 714B indicating the valve operator is fully in the open position. Thus, the controller 606 monitors the coil electric characteristic 704 and determines that the valve operator has fully moved to the open position based on the valve operator translation signature 714B at time T2. For example, the controller 606 uses the valve operator translation signatures 714A, 714B to determine valve operator transition times. For instance, the controller 606 determines a time duration between valve signature 714A and valve signature 714B. In another example, the controller 606 determines a time duration between times T1' and T2. The valve operator transition times change in correspondence with priming (or depriming) of the valve 304.

In yet another example, a fifth valve operator translation signature 714E corresponds to the inflection point 710B of the coil electric characteristic 1000 (at T3). The inflection point 710B corresponds to the valve operator (e.g., valve operator 400, shown in FIG. 4) initiating movement from the closed position to the open position (shown with the valve operator position 1001 in FIG. 10) during the second valve operator cycle. The fourth inflection point 710D corresponds to a sixth valve operator translation signature 714F indicating the valve operator is fully in the open position. Thus, the controller 606 monitors the coil electric characteristic 1000 and determines that the valve operator has fully moved to the open position based on the valve operator translation signature 714F at time T4.

In yet another example, the valve characteristics include a valve operator transition time. The controller 606 determines one or more valve operator transition times for a valve operator cycle. For instance, the controller 606 determines one or more valve operator transition times using the coil electrical characteristics 704, 1000. As described herein, as a valve operator moves (indicated with the valve operator position 708), the inductance of the coil begins to change as more of the volume inside the solenoid is converted from fluid with a low magnetic permeability to the valve operator material with a relatively higher magnetic permeability. When the valve operator reaches the top of the valve 304 (fully open, shown in FIG. 4) and shown at T2 for coil electrical characteristic 704 in FIG. 10—the valve operator 400 stops moving and no longer generates a counter current in the coil 420. As shown with the coil electric characteristic 704, the current ceases decreasing at a third inflection point 710C and begins to rise again (indicating the valve operator has moved to the fully open position). In an example, the controller 606 determines the valve operator transition time with the comparator 904. For instance, the comparator 904 determines the difference between T1' and T2 in FIG. 10. The valve operator transition time in the first valve operator cycle corresponds to the difference between times T1' and T2.

Further, FIG. 10 shows the valve operator position 1001 indicating the position of the valve operator (e.g., the valve operator 400) during the second valve operator cycle (corresponding to the second coil electrical characteristic 1000). Similar to the first valve operator cycle, the controller 606 determines the valve operator transition time for the second valve operator cycle. For instance, the comparator 904 determines the difference between times between T3 (corresponding to valve operator translation signature 714E) and T4 (corresponding to valve operator translation signature 714F) in FIG. 10. The valve operator transition time to move from closed to open in the second valve operator cycle corresponds to the difference between times T3 and T4.

In still yet another example, the controller 606 monitors a valve operator transition time to determine whether each of the valves 301 are in the primed state or the unprimed state. As described herein, changes in the fluidic mixture within the valve affect the performance of the valve operator of the valve. For instance, liquid 802 in the fluid chamber 800 (shown in FIGS. 8A-8D) induces greater drag on the valve operator. Accordingly, the fluidic mixture including the liquid 802 increases the valve operator transition time due to the increased drag on the valve operator. Accordingly, the controller 606 monitors the valve operator transition time between valve operator cycles to determine whether the valves 301 are in the primed state or the unprimed state. In an example, the first transition time corresponds to a time difference between signatures 714A and 714C. In another example, a second transition time corresponds to a time difference between signatures 714E and 714F. The second (longer) transition time is indicative of priming in the valve 301 because the valve operator takes longer to move through the surrounding liquid in comparison to gas.

For instance, the comparator 904 of the controller 606 compares the determined valve operator transition times to a valve characteristic threshold (e.g., a specified time duration, previous time duration of a prior opening movement, or the like). In an example, a third valve characteristic threshold 1006 includes a first transition time threshold corresponding to the unprimed state. In yet another example, a fourth valve characteristic threshold 1008 includes a second transition time threshold corresponding to the primed state.

The comparator 904 of the controller 606 compares the determined valve operator transition time (e.g., time span between T1' and T2 or time span between T3 and T4) to the third valve characteristic threshold 1006 and the fourth valve characteristic threshold 1008. For instance, the controller 606 determines the valve is in the unprimed state during the first valve operator cycle when the determined valve operator transition time is less than or equal to the third valve characteristic threshold 1006. In another example, the controller 606 determines the valve is in the primed state when the determined valve operator transition time exceeds the fourth valve characteristic threshold 1008. For instance, the controller 606 determines the valve is in the primed state when the valve operator transition time (e.g., the time span between T3 and T4) is greater than the second transition time threshold 1008. In yet another example, the controller 606 determines the valve is in the unprimed state when the valve operator transition time (e.g., the time span between T1' and T4) is less than or equal to the first transition time threshold. Accordingly, the controller 606 determines the valve is in the primed state or the unprimed state according to the comparison of valve characteristics to one or more valve characteristic thresholds.

Figure 11:
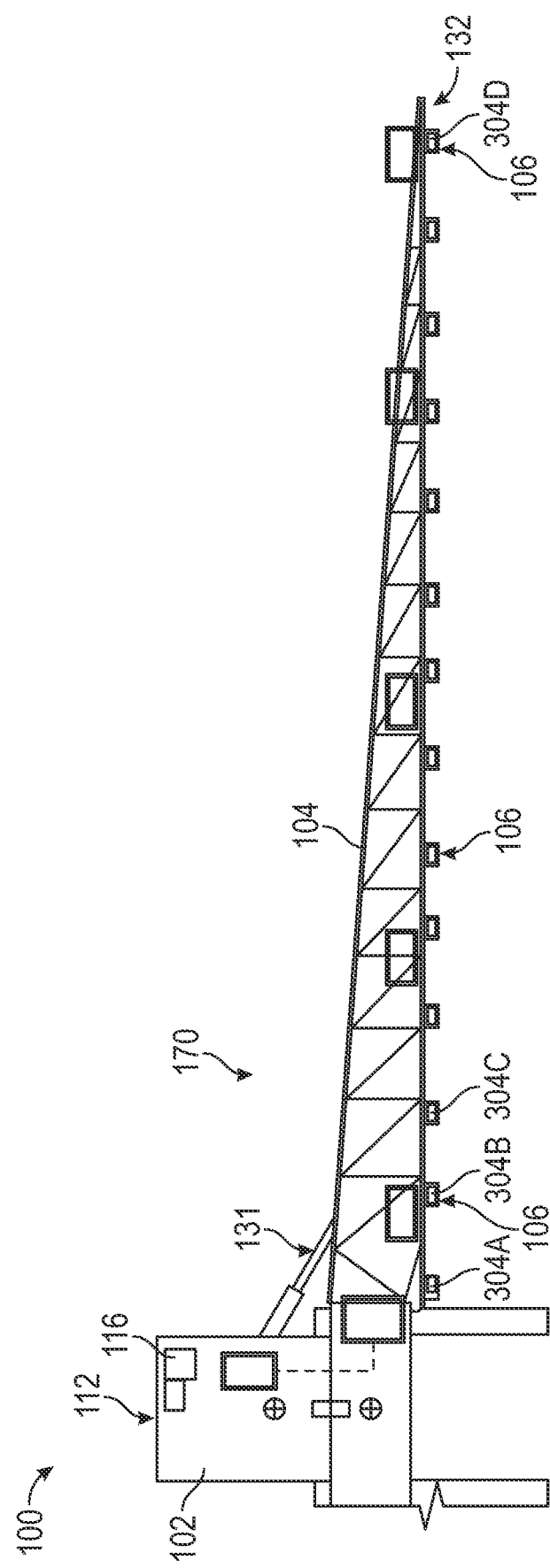
FIG. 11 illustrates a schematic view of another example of the agricultural sprayer.

FIG. 11 illustrates a rear perspective view of another example of the agricultural sprayer 100. The sprayer 100 includes a prime mover 112 and a boom 104 extending from the prime mover 112. The one or more controllers 116 operate the sprayer 100 or components of the sprayer 100. For example, the controller 116 controls the supply of fluid (e.g., agricultural fluid, or the like) to the smart nozzles 106. In an example, the reservoir tank 102 is in communication with the smart nozzles 106, and the reservoir tank 102 supplies agricultural fluid to the smart nozzles 106. The smart nozzles 106 include a control valve (e.g., 304A, B, C) and one or more associated nozzles that receive flow according to operation of the control valve.

In an example, the controller 116 (e.g., the controller 606 shown in FIG. 6 and FIG. 9, or the like) communicates with the valves 304A-304D to open and close the valves 304A-304D (and regulate the flow of fluid therethrough). In another example, the controller 116 primes the valves 304A-304D. For example, the controller 116 determine each of the valves 304A-304D are in the primed state or the unprimed state (as described herein). The controller 116 optionally cascades priming of the valves 304A-304D along the boom 104. In an example, the controller 116 cascades priming of the valves 304A-304D along the boom 104 while determining whether individual ones of the control valves 304A-304D are in the primed state or the unprimed state. For instance, the controllers 116 prime each of the control valves in sequence from a proximal end 1100 to a distal end 1102 of the boom 104. In another example, the controllers 116 prime each of the control valves in sequence from the distal end 1102 to the proximal end 1100 of the boom 104. As priming of the respective valves 304A, B, C, D is confirmed (e.g., with the system and analysis discussed herein) the valves are shut while unprimed valves continue with the priming procedure. Unnecessary delivery of additional agricultural fluid through primed valves is thereby arrested while unprimed valves continue with priming.

For instance, the controller 116 repeatedly opens and closes the first control valve 304A. The controllers 116 determine the control valve 304A is in the primed state from characteristics as discussed herein. After determination of the primed state at the valve 304A the controller 116 maintains the valve operator of the control valve 304A in the closed position. Other valves 304B, C, D that are not yet primed continue with opening and closing operations until each is primed, and at that priming operation of the now primed valve ends and the valve remains closed and ready for application operations (e.g., use in the field). The controllers 116 optionally prime the valves 304A-304D in sequence, for instance by priming the second control valve 304B after the first control valve 304A is in a primed state. For example, the controllers 116 optionally maintain the valve operator for the first valve 304A in the closed position while repeatedly opening and closing the valve operator for the second valve 304B. Accordingly, the controllers 116 maintain the first valve 304A in the primed state while priming the second valve 304B. Thus, the valves 304A-304D are transitioned between the primed state and the unprimed state on an individual basis. In other examples, a priming operation is conducted with all or a subset of the valves 304A-D at the same time, and as a primed state is detected in one or more of the valves 304A-D that primed valve is closed and the priming operation stopped, while priming continues with the other valves until also primed.

In another example, the controller 116 directs and controls priming of the valves 304A-304D from the proximal end 1100 of the boom 104 to the distal end 1102 of the boom 104. In still yet another example, the controller 116 primes the valves 304A-304D from the distal end 1102 of the boom 104 to the proximal end 1100 of the boom 104. In a further example, the controller 116 simultaneously primes the valves 304A-304D, and closes each of the valves 304A-304D as the individual valves 304A-304D transition between the unprimed state and the primed state. Thus, the controller 116 in at least one example primes and assesses priming of each of the valves 304A-304D on an individual basis.

Still yet further, the controller 116 optionally deprimes the valves 304A-304D, for example by depriming the valves 304A-304D in sequence from the distal end 1102 toward the proximal end 1100 of the boom 104. In this example, air is delivered through the sprayer boom to the valves 304A-304D and the controller 116 analyses the valves to identify the unprimed state, and thereafter closes valves that are unprimed (e.g., agricultural liquid is evacuated). Thus, the controller 116 optionally deprimes and identifies depriming of the valves 304A-304D on an individual basis.

Figure 12:
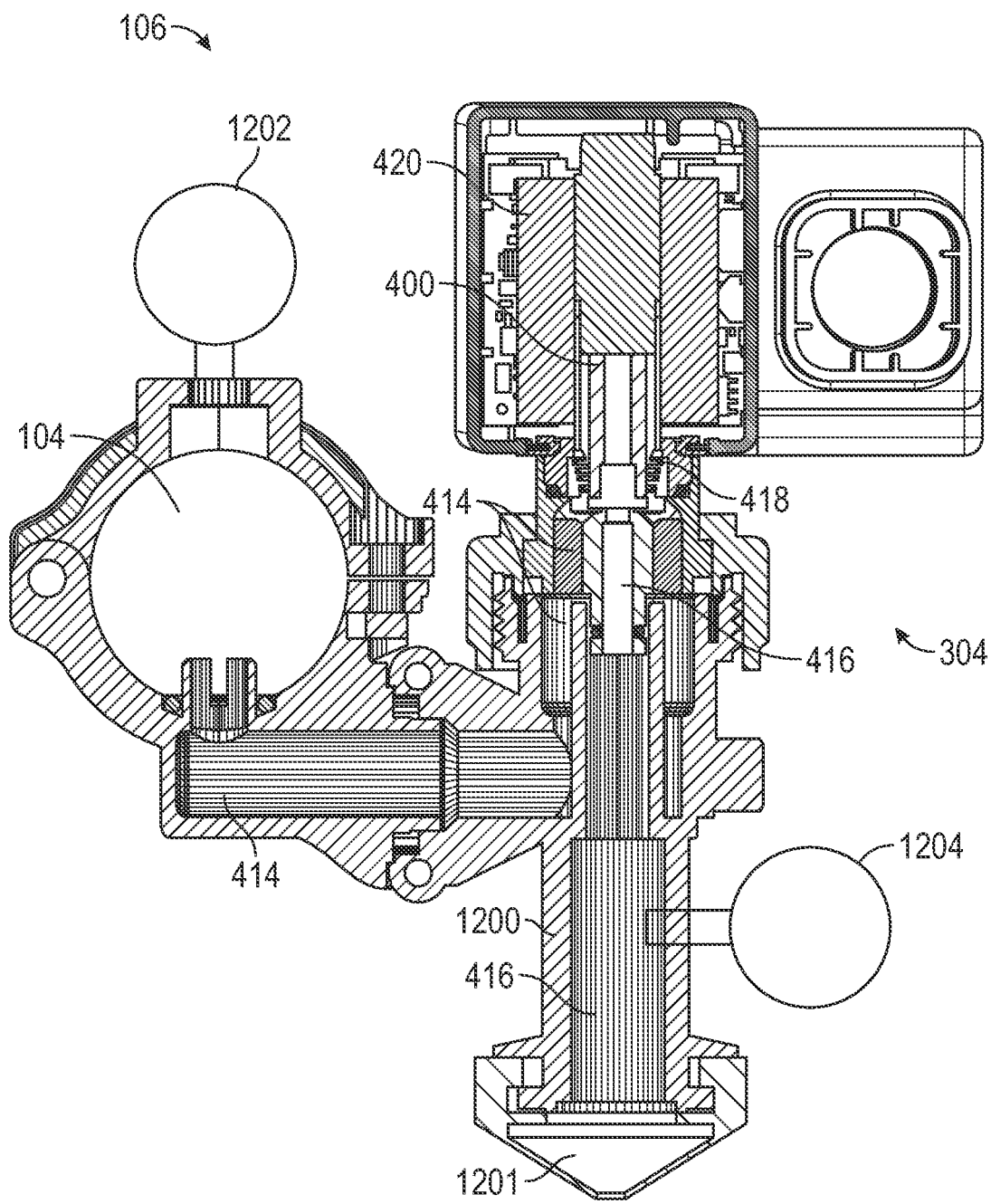
FIG. 12 illustrates an example of a smart nozzle including the valve of FIG. 4.

FIG. 12 illustrates an example of the smart nozzle 106 including the valve 304. The smart nozzle 106 is in communication with the boom 104, and the boom 104 supplies fluid to the valve 304. The valve 304 regulates flow of the fluid through a nozzle 1200, for instance to apply an agricultural product with the sprayer 100 (shown in FIG. 1). In an example, the nozzle 1200 includes an application tip 1201. The application tip 1201 facilitates dispersion of the fluid from the smart nozzle 106. For instance, the application tip 1201 controls the spray pattern (e.g., fan-shaped, cone-shaped, or the like) of fluid from the nozzle 106. In another example, the application tip 1201 controls the droplet size (e.g., super fine, fine, coarse, super coarse or the like) of fluid flowing from the nozzle 1200. In some approaches, flow of fluid through the nozzle 1200 is restricted by an obstruction (e.g., debris, gelled agricultural product, product residue or the like) fully or partially. Accordingly, the nozzle 1200 includes a restricted state (where nozzle flow is restricted full or partially relative to a specified flow rate range) or an unrestricted state (where nozzle flow is unrestricted, and approaches or equals a specified flow rate range) collectively referred to as blocked.

In some examples, the smart nozzle 106 includes one or more of a boom pressure sensor 1202 or a tip pressure sensor 1204 in communication with one or more of the valve inlet 414 or the valve outlet 416. For instance, the boom pressure sensor 1202 optionally measures pressure in the boom 104, and accordingly measures fluid pressure supplied to the valve inlet 414. Optionally, the smart nozzle 106 includes the tip pressure sensor 1204 in communication with the valve outlet 416. In another example, the tip pressure sensor 1204 facilitates monitoring of pressure proximate to the valve outlet 416 (however the present subject matter is not so limited). In yet another example, instead of (or in addition to) one or more pressure sensors 1202, 1204 the controller 606 monitors characteristics indicative of blocking of valve 304 or nozzle 1200 using monitored valve characteristics (e.g., current, voltage, or the like).

As described herein, opening of the valve 304 supplies fluid to the valve outlet 416 and the associated nozzle 1200. The fluid flows through the application tip 1201 and is discharged to the environment. For example, fluid is discharged from the application tip 1201 while the valve operator 400 is in the open position. While the valve 304 is open the pressure at the valve outlet 416 corresponds to the pressure in the boom 104, and the pressure drives fluid through the application tip 1201. With the valve operator 400 in the closed position, pressure in the valve outlet 416 decays toward ambient atmospheric pressure as the valve outlet 416 is isolated from the boom 104 and the higher pressure therein.

The rate of pressure decay in the valve outlet 416 changes in correspondence with restriction of the nozzle 1200. In an example, pressure at the valve outlet 416 decays at a first rate with the nozzle 1200 in the unrestricted state. Fluid remaining in the valve outlet 416 immediately after valve 304 closure is applied and the outlet 416 equalizes with ambient pressure. In contrast, the pressure at the valve outlet 416 decays at a second lesser rate with the nozzle 1200 in the restricted state, for instance partially or fully obstructed or blocked. For instance, blockage of the application tip 1201 inhibits fluid flow through the application tip 1201. Accordingly, after closure of the valve 304 the pressure of the fluid in the valve outlet 416 decays at a slower rate (in comparison to the unrestricted state) due to inhibited fluid flow caused by the blockage. In another example, a total blockage of the application tip 1201 (or the valve outlet 416) maintains the fluid pressure at the valve outlet 416 proximate to the pressure of the boom 104 because the fluid in the smart nozzle 1200 is trapped in the valve outlet 416. In this circumstance decay of pressure in the valve outlet is minimal (e.g. remains proximate to the boom pressure even after valve 304 closure).

In an example, valve characteristics, monitored with the systems described herein, change in correspondence with the pressure decay (or lack thereof) at the valve outlet 416. During normal operation (e.g., with the nozzle 1200 in an unrestricted state) with the valve operator 400 in the closed position, pressure upstream (e.g., at the valve inlet 414) of the valve operator 400 measured with the pressure sensor 1202 is higher than pressure downstream (e.g., at the valve outlet 416) of the valve operator 400 measured with the pressure sensor 1204. Accordingly, a pressure differential exists at the valve operator 400 during normal operation. The pressure differential biases the valve operator 400 to remain closed. When opening of the valve 304 is desired, a current is applied to the coil 420 to move the valve operator 400. The current applied to the coil 420 varies in correspondence with one or more valve characteristics including the pressure differential. With a greater pressure differential, for instance the differential between a boom pressure (upstream) and ambient (downstream) the valve operator is robustly biased in the closed position. With a smaller pressure differential, for example with a blockage that decreases or slows pressure decay the valve operator is biased in the closed position but less affirmatively because of the smaller pressure differential. In one example, measurement of the pressure differential with the pressure sensors 1202 and 1204 (upstream or downstream) or with the downstream sensor 1204 (along with a boom pressure set point) facilitates identification of a blockage. Large pressure differentials (at valve closure) approaching the predicted differential between boom pressure and ambient air pressure indicate the smart nozzle 106 including the valve 304 and the nozzle 1200 are unrestricted (e.g., not blocked). In contrast, pressure differentials less than the predicted differential at valve closure indicate a slower pressure decay downstream from the valve 304 and blockage of one or more of the valve or nozzle 1200. In an example, the controller 606 monitors one or both pressure measurements from one or both of the pressure sensors 1202, 1204 to determine unrestricted and restricted states of the smart nozzle 106 and thereby identify if the smart nozzle 106 (e.g., the valve 304 or nozzle 1200) is blocked.

In an example, the controller 606 includes the comparator 904 (shown in FIG. 9). For instance, the comparator 904 compares measured valve characteristics (e.g., pressure, current, or the like) between valve operator cycles to determine whether the smart nozzle 106 is in the unrestricted or restricted states. For example, the comparator 904 determines differences between valve characteristics of valve operator cycles to determine whether the nozzle 106 is in the unrestricted or restricted states. For instance, the comparator 904 compares a first pressure measurement corresponding to a first valve operator cycle to a second pressure measurement corresponding to a second valve operator cycle to determine a pressure differential between valve operator cycles. In another example, the comparator 904 compares current supplied to the coil 420 (shown in FIG. 4) in the first valve operator cycle to current supplied to the coil 420 in the second valve operator cycle to determine differences in pressure between the first valve operator cycle and the second valve operator cycle.

As discussed herein, the amount of current to move the valve operator 400 from the closed position to the open position changes in correspondence with the pressure differential across the valve operator 400. In the unrestricted state (no or minimal blockage) the downstream pressure rapidly decays toward ambient and the greater upstream (boom) pressure affirmatively biases the valve operator 400 to the closed position. Conversely, a blockage (full or partial) of the valve 304, nozzle 1200 or the like lengthens pressure decay after valve closure and the pressure differential between the upstream and downstream sides the valve is slower. With the greater pressure differential of an unrestricted smart nozzle 106 (having the valve 304 and the nozzle 1200) more current is required to overcome the pressure differential bias that robustly seats the valve operator 400 in the closed position. In contrast, with a smaller pressure differential (e.g., with a partial or full blockage) the current to overcome the bias provided by the (smaller) differential is measurably less.

In one example the comparator 904 compares the monitored current to open the valve 304 (move the valve operator 400) with a predicted or threshold current value to determine if the smart nozzle 106 having the valve 304 is blocked in the valve 304 or the nozzle 1200 (or both). For instance, in an unrestricted state (no or minimal blockage) the monitored current should approach or exceed the threshold current. In contrast, in the restricted state (full or partial blockage), the pressure differential noted here is less because pressure decay is slower when the valve is closed. Accordingly the current to move the valve operator 400 is less. The comparator 904 determines the applied current is below the threshold current and the controller 606 provides an indication the smart nozzle 106 is blocked.

In some examples, the agricultural product application system 900 provides a notification (e.g., to a user, technician, or the like) of the status of the nozzle 1200. For example, the agricultural product application system 900 displays on a screen whether the nozzle 1200 is in the restricted state or the unrestricted state. In another example, the system 900 applies remedial action (e.g., flushing of the valve 304, flushing of the nozzle 1200, rapid opening or closing of the valve operator 400 to break up residue or the like) based on the determination of whether the nozzle 1200 is in the restricted state or the unrestricted state.

Figure 13:
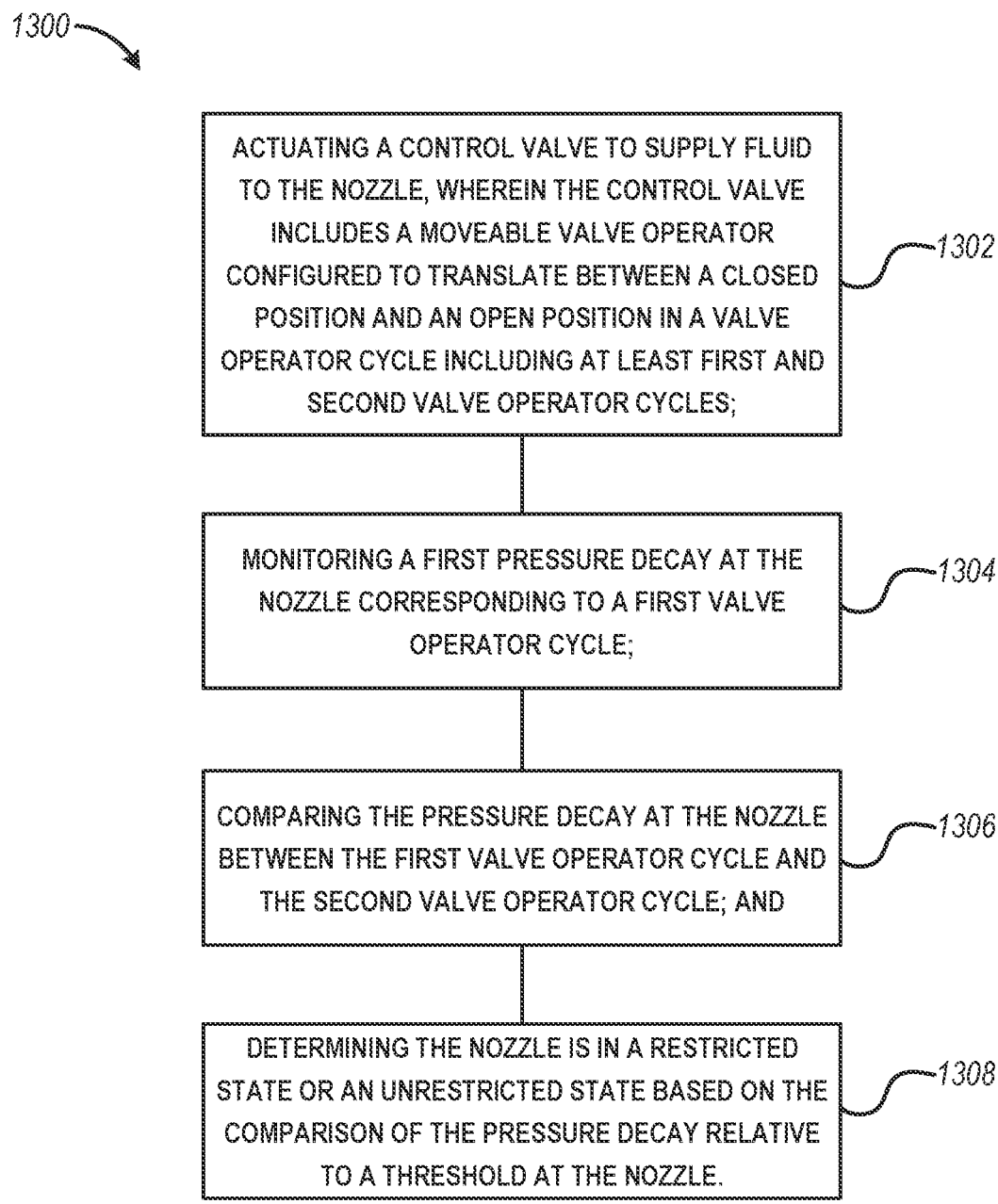
FIG. 13 illustrates one example of a method for monitoring restriction of flow of a fluid through a nozzle.

FIG. 13 shows one example of a method 1300 for monitoring restriction of flow of a fluid through a nozzle, including one or more of the nozzle 1200 described herein. In describing the method 1300, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 1300 include, but are not limited to, the corresponding numbered elements provided herein and other corresponding elements described herein (both numbered and unnumbered) as well as their equivalents.

The method 1300 includes monitoring restriction of flow of a fluid through a nozzle 1200, for instance of a smart nozzle 106 (shown in FIG. 12). Restriction of the nozzle includes one or more of partial or total blockage of fluid flow (e.g., including fouling) through the nozzle 106, failure of the application tip 1201, damage of the application tip 1201, or the like. Accordingly, the nozzle 1200 includes a restricted state (where nozzle flow is restricted relative to a specified flow rate range) or an unrestricted state (where nozzle flow is unrestricted, and approaches or equals a specified flow rate range). In an example, debris (e.g., dirt, gelled or residue agricultural product, or the like) clogs the application tip 1201 and inhibits flow of fluid through the application tip 1201. In an approach, restriction of the nozzle inhibits flow through the nozzle 1200, and leads to a misapplication or failure of application of agricultural product by the smart nozzle 106. Thus, the system 900 monitors whether the nozzle 1200 is in the restricted state or the unrestricted state (and provided notification or remedial action) to enhance performance of the sprayer 100. For instance, the system 200 minimizes misapplication of agricultural product because of (previously) unidentified restrictions of the nozzles, associated valves 304 or the like.

As described herein, the actuator interface 902 operates the valve 304 to regulate flow of fluid through the valve 304. In an example, at 1302, the method 1300 includes actuating the valve 304 to supply fluid to the nozzle 106. For instance, the actuator interface 902 operates the valve 304 to translate the valve operator 400 between open and closed positions. Accordingly, in some examples, the actuator interface 902 cycles the valve 304 by opening and closing the valve operator 400, with a cycle in one example including the valve closed, transitioning to open, arriving at the opened position, transitioning to closed and arriving at the closed position to complete the cycle. In another example, the actuator interface 902 operates the valve 304 to cycle the valve in a first valve operator cycle and a second valve operator cycle. The system 200 monitors valve characteristics, such as pressure decay of the nozzle 1200 (shown in FIG. 12), current applied to open the valve or the like corresponding to the valve operator cycles.

In an example, the controller 606 (shown in FIG. 6) monitors valve characteristics, for instance to determine health of the valve 304. In another example, the controller 606 monitors valve characteristics during at least the first valve operator cycle and the second valve operator cycle. In yet another example, the controller 606 monitors pressure decay at the nozzle 1200. For example, the controller 606 monitors pressure decay corresponding to a cycle of the nozzle 1200.

In a further example, the controller 606 monitors the pressure decay at the nozzle 1200 after moving the valve operator 400 to the closed position during the first valve operator cycle. At 1304, the method 1300 includes monitoring a first pressure decay at the nozzle 1200 corresponding to the first valve operator cycle. The controller 606 operates the valve 304 for the second valve operator cycle, and the controller 606 monitors the valve characteristics of the nozzle 1200. For instance, the method 1300 optionally includes monitoring a second pressure decay at the nozzle 1200 corresponding to the second valve operator cycle. In some examples, the controller 606 monitors valve characteristics, such as pressure, between valve operator cycles (e.g., while the valve is closed). For instance, the controller 606 monitors valve characteristics between moving the valve operator 400 to the closed position in the first valve operator cycle, and moving the valve operator 400 to the open position in the second valve operator cycle.

At 1306, the method 1300 includes comparing the pressure decay at the nozzle between the first valve operator cycle and the second valve operator cycle. In an example, comparing the pressure decay between valve operator cycles facilitates determining whether the nozzle 1200 is in the restricted state or the unrestricted state. For instance, in the first valve operator cycle the actuator interface 902 moves the valve operator 400 to the closed position according to a specified duty cycle (e.g., the specified duty cycle 713, shown in FIG. 7). In the second valve operator cycle, the actuator interface 902 optionally moves the valve operator 400 outside the specified duty cycle (applied during the first valve operator cycle). In a third valve operator cycle, the actuator interface 902 moves the valve operator 400 to the open position according to the specified duty cycle.

In an example, the specified duty cycle includes a specified delay period (e.g., a diagnostic period) between moving the valve operator 400 to the closed position in the first valve operator cycle, and moving the valve operator 400 to the next open position in the third valve operator cycle. The second valve operator cycle is in one example different than the specified duty cycle, and the actuator interface 902 moves the valve operator 400 to the open position outside of the specified delay period of the specified duty cycle. For example, in the second valve operator cycle, the actuator interface 902 moves the valve operator 400 within a pressure detection time period. The pressure detection time period is less than the specified delay period, and accordingly the valve operator 400 is moved to the open position outside the specified duty cycle in the second valve operator cycle.

Opening of the valve operator 400 outside of the specified duty cycle facilitates pressure monitoring of the nozzle 1200. As described herein, the rate of pressure decay in the valve outlet 416 changes in correspondence with restriction of the nozzle 1200. The valve operator 400 is opened outside the specified duty cycle to monitor the pressure at the valve outlet 416. For example, the controller 606 monitors current supplied to the coil while the pressure is decaying at the valve outlet 416 (e.g., at a time within the pressure detection time period, or the like). The current supplied to the coil changes in correspondence with restriction of the nozzle 1200 (due to changes in the force balance acting upon the valve operator 400). Accordingly, opening the valve operator 400 outside the specified duty cycle allows for monitoring of the pressure decay at the valve outlet using changes in current needed to open move the valve operator 400.

In one example, determining the pressure at the nozzle 1200 facilitates determining the flow coefficient (e.g., $C_v$, or the like) for components of the smart nozzle 106, including one or more of a flow coefficient for the valve 304 or flow coefficient for the application tip 1201. Determining the flow coefficient for the smart nozzle 106 facilitates monitoring the performance of the smart nozzle 106, for instance to determine a size of the application tip 1201 (shown in FIG. 12). For example, the flow coefficient of the valve 304 includes pressure drop across the valve 304 based on the flow rate of fluid through the valve 304. In a further example, determining the pressure at the nozzle 1200 facilitates determining the pressure difference across the valve 304 (e.g., a pressure differential between the valve inlet 414 and the nozzle 1200). The system 900 determines the flow coefficient using the determined pressure at the nozzle 1200 and one or more flow rates of the system 900, for instance one or more of a nozzle flow rate, system flow rate, or the like. In another example, determining the pressure at the nozzle 1200 facilitates determining the flow coefficient for the application tip 1201. For example, monitoring the pressure at the nozzle 1200 facilitates determining a pressure differential across the application tip 1201. In an example, the system 900 determines the flow coefficient of the application tip 1201 using the pressure differential across the application tip 1201 and one or more flow rates of the system 900.

In yet another example, the system 900 (shown in FIG. 9) uses the determined flow coefficient of the valve 304 or the application tip 1201 to monitor performance of the smart nozzle 106. For instance, the system 900 determines the size of the application tip 1201 (e.g., a size of an orifice of the application tip 1201, or the like) using the determined flow coefficient of the valve 304 and the application tip 1201. For example, a user exchanges a first application tip (e.g., application tip 1201) with a first flow coefficient for a second application tip having a second flow coefficient. The system 900 monitors the flow coefficient of the smart nozzle 106 to determine whether the first application tip or the second application tip is attached to the smart nozzle 106. For example, the system 900 determines the first application tip is attached to the smart nozzle 106 when the flow coefficient for the application tip 1201 has the first flow coefficient. In another example, the system 900 determines the second application tip is attached to the smart nozzle 106 when the flow coefficient for the application tip 1201 has the second flow coefficient. Accordingly, the system 900 determines the size of the application tip 1201, for instance to monitor a flow rate through the application tip 1201. Further, the system monitors the flow coefficient (or changes in the flow coefficient) to determine whether the nozzle 1200 is damaged, blocked, fowled, or the like. In an example, damage to the application tip 1201 changes the flow coefficient of the application tip 1201, and the system monitors the flow coefficient (or changes in the flow coefficient) to determine the application tip 1201 is damaged. For instance, the controller compares the determined flow coefficient to a flow coefficient threshold and makes valve health determinations based on the comparison.

FIG. 13 shows at 1308 the method 1300 includes determining the nozzle 1200 is in the restricted state or the unrestricted state based on the comparison of the pressure decay corresponding to a valve operator cycle relative to a restricted nozzle threshold. For example, the comparator 904 compares the monitored pressure decay to the restricted nozzle threshold. The controller 606 determines the nozzle 1200 is in the restricted state when the pressure decay of a valve operator cycle exceeds the restricted nozzle threshold. For example, the controller 606 determines the nozzle 1200 is in the restricted state when a first pressure decay rate corresponding to a first valve operator cycle is greater than a pressure decay rate corresponding to a (later) second valve operator cycle. For instance, blockage of the nozzle 1200 inhibits flow out of the nozzle, and reduces the rate of pressure decay at the valve outlet 416. The comparator 904 compares the rate of pressure decay to the restricted nozzle threshold, and determines the nozzle 1200 is in the restricted state when the restricted nozzle threshold is exceeded (e.g., when the second pressure decay rate is reduced below a specified value, or the like).

Several options for the method 1300 follow. In an example, the method 1300 optionally includes issuing a notification if the nozzle 1200 transitions from the unrestricted state to the restricted state. For example, issuing a notification includes displaying the notification on a screen in a cab of a prime mover, such as the agricultural sprayer 100. In another example, the method 1300 includes applying remedial action based on the determination of whether the nozzle 1200 is in the restricted state or the unrestricted state. For example, flushing of the valve 304 (or nozzle 1200) using one or more of a change in duty cycle, increase in pressure supplied to the valve 304 (e.g., pressure at the valve inlet 414), or cycling of the valve operator 400.

Figure 14:
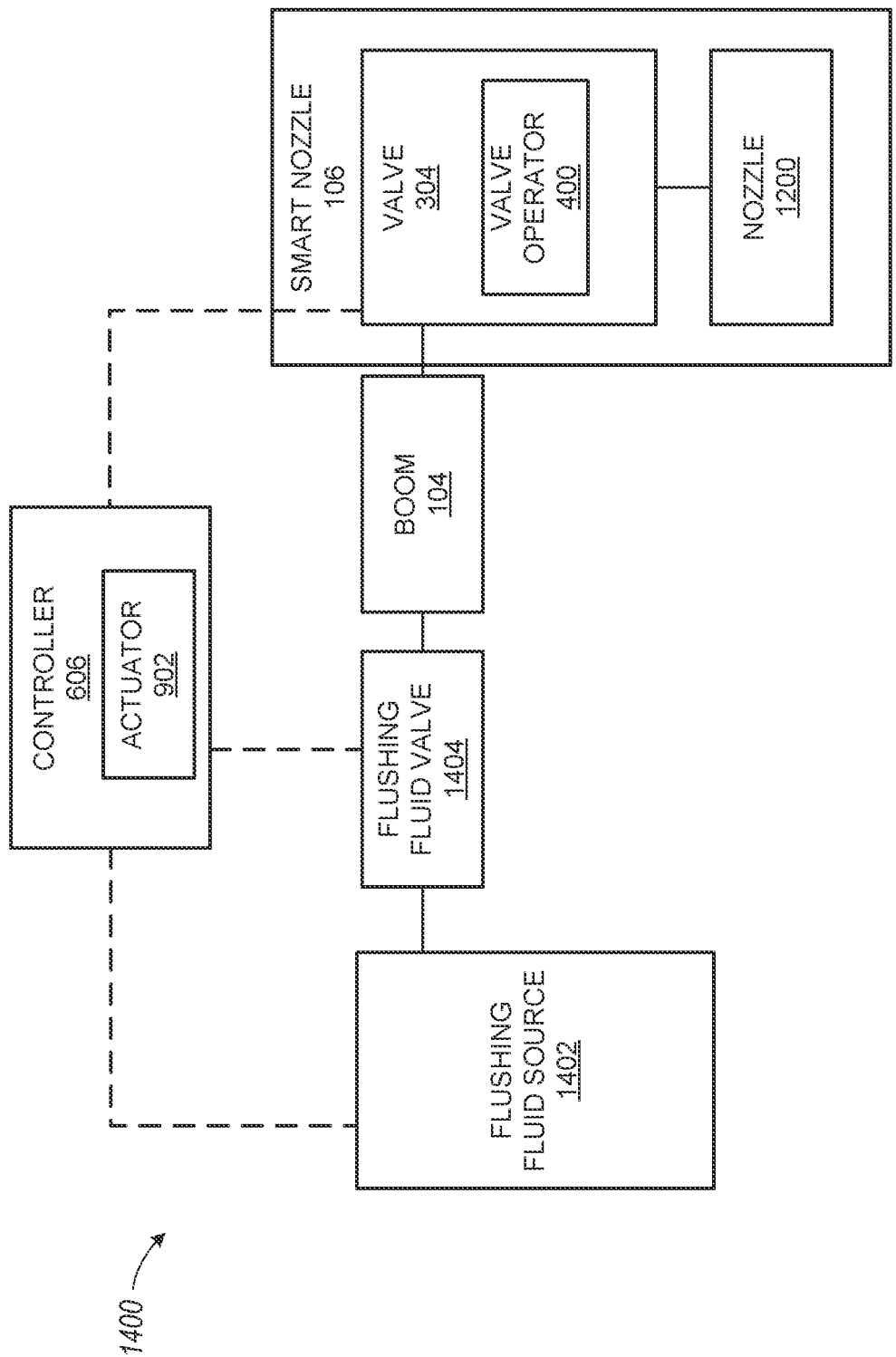
FIG. 14 illustrates a schematic view of an example system for applying agricultural product.

FIG. 14 illustrates a schematic view of an example system 1400 for applying agricultural product. In an example, the system 1400 facilitates flushing of components of the agricultural sprayer 100 (shown in FIG. 1). For example, the system 1400 applies remedial action (e.g., flushing of the valve 304, flushing of the nozzle 1200, rapid opening or closing of the valve operator 400 to break up residue or the like) based on a determination that the nozzle 1200 is in the restricted state or the unrestricted state.

In another example, the system 1400 flushes components of the agricultural sprayer 100 to remove agricultural product from the agricultural sprayer 100. For instance, the system 1400 delivers a flushing fluid (e.g., water without agricultural product) to the booms 104 (shown in FIG. 1), and the flushing fluid flows through the boom 104 to the smart nozzles 106 having the valves 304 and associated nozzles 1200. In yet another example, the flushing fluid flows through the smart nozzles 106. For instance, the flushing fluid flows through the fluid chamber 800 of the valve 304 (shown in FIGS. 8A-8D) to reduce the amount of agricultural product present in the fluid chamber 800. In a further example, the flushing fluid flows through one or more of the nozzle 1200 having the application tip 1201 (shown in FIG. 12).

Referring to FIG. 14, the system 1400 for applying agricultural product includes a flushing fluid source 1402 (e.g., a tank, container, reservoir, or the like) in communication with the boom 104 and the valve 304 (shown with solid lines in FIG. 14). The flushing fluid source 1402 includes a flushing fluid (e.g., water, air, or the like) and optionally is the carrier fluid without an agricultural product (fertilizer, herbicide or the like) injected to the carrier fluid. Thus, flow of the flushing fluid through components of the sprayer 100 (shown in FIG. 1) reduces the concentration of agricultural product in the components of the sprayer 100. For example, the system 1400 flushes the agricultural sprayer 100 prior to the sprayer 100 crossing a public roadway. In another example, the system 1400 flushes the agricultural sprayer 100 to remove a first agricultural product from the sprayer 100. The flushing fluid removes the first agricultural product (e.g., an herbicide, or the like) from the sprayer 100. Accordingly, system 1400 facilitates application of a second agricultural product (e.g., fertilizer, or the like) without (errantly) applying the first agricultural product or mixing the first agricultural product with the second agricultural product.

For instance, the system 1400 includes a flushing fluid valve 1404 in communication with the flushing fluid source 1402 and one or more of the boom 104 or the valve 304. The controller 606 communicates with the flushing fluid valve 1404 to deliver flushing fluid from the flushing fluid source 1402 to the components of the sprayer 100. For instance, the actuator interface 902 operates the flushing fluid valve 1404 to permit delivery of flushing fluid to the boom 104. The flushing fluid flows through the boom 104 to the valve 304. In some examples, the actuator interface 902 opens and closes the valve 304 while the flushing fluid valve 1404 is open. For example, the controller 606 monitors one or more valve characteristics of the valve 304 to determine whether flushing fluid flows through the valve 304. In one example, the flushing fluid includes air, and the system 600 monitors valve characteristics to determine whether the air displaces liquid in the valve 304 (and accordingly changes the fluid mechanical characteristics in the valve 304) in a detectable manner corresponding to an unprimed state as discussed herein.

Various Notes & Examples

Example 1 is a system for applying an agricultural product, the system comprising: a control valve including: a moveable valve operator configured to translate between a closed position and an open position; one or more sensors configured to monitor one or more control valve characteristics; and a valve controller in communication with the one or more sensors, wherein the valve controller includes: an actuator configured to repeatedly open and close the valve operator with agricultural product delivered to the control valve; a comparator configured to compare the monitored one or more control valve characteristics to a primed valve characteristic threshold; and wherein the valve controller is configured to determine the control valve is in one or more of a primed state or an unprimed state based on the comparison of the one or more control valve characteristics to the primed valve characteristic threshold.

In Example 2, the subject matter of Example 1 optionally includes wherein the one or more characteristics of the control valve includes at least one operator transition time corresponding to a time span for the valve operator to translate between the closed position and the open position.

In Example 3, the subject matter of Example 2 optionally includes wherein the operator transition time includes the time span for the valve operator to transition from the closed position to the open position.

In Example 4, the subject matter of any one or more of Examples 2-3 optionally include wherein the at least one operator transition time includes: a first operator transition time corresponding to the unprimed state; and a second operator transition time corresponding to the primed state.

In Example 5, the subject matter of Example 4 optionally includes wherein the second operator transition time is greater than the first operator transition time.

In Example 6, the subject matter of any one or more of Examples 4-5 optionally include wherein the primed valve characteristic threshold includes the first operator transition time.

In Example 7, the subject matter of any one or more of Examples 2-6 optionally include wherein: the primed valve characteristic threshold includes a transition time threshold; and the comparator is configured to compare the at least one operator transition time to the transition time threshold.

In Example 8, the subject matter of Example 7 optionally includes wherein the valve controller determines the control valve is in the primed state with the operator transition time exceeding the transition time threshold In Example 9, the subject matter of any one or more of Examples 1-8 optionally include wherein a valve operator cycle includes movement of the valve operator between the closed and open positions, and wherein: the actuator is configured to open the valve operator in a first valve operator cycle; the actuator is configured to open the valve operator in a second valve operator cycle; the comparator is configured to compare the control valve characteristics of the first and second valve operator cycles; the valve characteristic threshold includes the control valve characteristics of the first valve operator cycle; and wherein the valve controller is configured to determine the control valve is in one or more of the primed state or the unprimed state based on the comparison of the control valve characteristics of the second valve operator cycle to the control valve characteristics of the first valve operator cycle and a difference therebetween.

In Example 10, the subject matter of Example 9 optionally includes wherein the control valve characteristics of the control valve include one or more electrical characteristics of the control valve.

In Example 11, the subject matter of Example 10 optionally includes wherein: the control valve includes a coil configured to generate a magnetic flux, the valve operator is configured to translate with respect to the coil based on the magnetic flux; and the one or more sensors are configured to measure one or more of current through the coil or voltage across the coil as the control valve characteristics.

In Example 12, the subject matter of Example 11 optionally includes wherein the valve controller is configured to determine the control valve is in one or more of the primed state or the unprimed state based on a comparison of the current through the coil in the second valve operator cycle to the current through the coil in the first valve operator cycle and a different therebetween.

In Example 13, the subject matter of Example 12 optionally includes wherein the valve controller determines the control valve is in the primed state if the current through the coil in the second valve operator cycle is greater than the current through the coil in the first valve operator cycle.

In Example 14, the subject matter of any one or more of Examples 11-13 optionally include wherein: the one or more characteristics of the control valve includes at least one operator transition time corresponding to a time span for the valve operator to translate between the closed position and the open position; and the controller is configured to determine the operator transition time based on one or more of the current through the coil or the voltage across the coil.

In Example 15, the subject matter of Example 14 optionally includes wherein the valve controller determines the control valve is in the primed state if the transition time for the valve operator in the second valve operator cycle is greater than the operator transition time in the first valve operator cycle.

In Example 16, the subject matter of any one or more of Examples 10-15 optionally include wherein: the valve controller is configured to determine at least one operator transition time based on the electrical characteristics of the control valve; and the at least one operator transition time corresponds to a time span for the valve operator to translate between the closed position and the open position.

In Example 17, the subject matter of Example 16 optionally includes wherein the valve operator transition time in the second valve operator cycle is greater than the valve operator transition time in the first valve operator cycle.

In Example 18, the subject matter of any one or more of Examples 1-17 optionally include wherein the actuator is configured to maintain the valve operator in the closed position if the valve controller determines the control valve is in the primed state.

In Example 19, the subject matter of any one or more of Examples 1-18 optionally include wherein: the control valve includes a fluid chamber configured to receive a fluidic mixture of one or more of a gas or a liquid including the agricultural product; in the unprimed state, a volume of the gas in the fluid chamber is greater than a volume of the liquid in the fluid chamber; and in the primed state, the volume of liquid in the fluid chamber is greater than the volume of gas in the fluid chamber.

In Example 20, the subject matter of any one or more of Examples 1-19 optionally include wherein: the control valve includes a fluid chamber configured to receive a fluidic mixture of one or more of a gas or a liquid including the agricultural product; in the unprimed state, the fluidic mixture in the fluid chamber has a first fluidic composition; in the primed state, the fluidic mixture in the fluid chamber has a second fluidic composition; and the second fluidic composition is different than the first fluidic composition.

In Example 21, the subject matter of any one or more of Examples 1-20 optionally include a flushing fluid source in communication with the control valve, wherein: the flushing fluid source includes a flushing fluid, the flushing fluid is different than the agricultural product; and the valve controller is configured to supply the flushing fluid to the control valve while repeatedly opening and closing the valve operator to flush the agricultural product from the control valve.

Example 22 is a method of priming a control valve, comprising: delivering an agricultural product to the control valve, the control valve in an unprimed state; detecting whether the control valve is in a primed state, detecting including: repeatedly opening and closing of the control valve while delivering flow of the agricultural product to the control valve, wherein repeatedly opening and closing of the control valve includes moving a valve operator between closed and open positions; monitoring one or more control valve characteristics while repeatedly opening and closing the control valve; comparing the monitored control valve characteristics of the valve operator with a primed valve characteristic threshold; and determining that the control valve is in one or more of the unprimed state or the primed state based on the comparison of the monitored control valve characteristics to the primed valve characteristic threshold.

In Example 23, the subject matter of Example 22 optionally includes wherein the one or more characteristics of the control valve includes at least one operator transition time corresponding to a time span for the valve operator to translate between the closed position and the open position.

In Example 24, the subject matter of Example 23 optionally includes wherein the operator transition time includes the time span for the valve operator to transition from the closed position to the open position.

In Example 25, the subject matter of any one or more of Examples 23-24 optionally include wherein the at least one operator transition time includes: a first operator transition time corresponding to the unprimed state; and a second operator transition time corresponding to the primed state.

In Example 26, the subject matter of Example 25 optionally includes wherein the second operator transition time is greater than the first operator transition time.

In Example 27, the subject matter of any one or more of Examples 25-26 optionally include wherein the primed valve characteristic threshold includes the first operator transition time.

In Example 28, the subject matter of any one or more of Examples 23-27 optionally include wherein the primed valve characteristic threshold includes a transition time threshold, and the method further comprising: comparing the at least one operator transition time to the transition time threshold.

In Example 29, the subject matter of Example 28 optionally includes determining the control valve is in the primed state with the operator transition time exceeding the transition time threshold.

In Example 30, the subject matter of any one or more of Examples 22-29 optionally include wherein a valve operator cycle includes movement of the valve operator between the closed and open positions, the method further comprising: opening the valve operator in a first valve operator cycle, wherein the valve characteristic threshold includes the control valve characteristics of the first valve operator cycle; opening the valve operator in a second valve operator cycle; comparing the control valve characteristics of the first and second valve operator cycles; and determining the control valve is in one or more of the primed state or the unprimed state based on the comparison of the control valve characteristics of the second valve operator cycle to the control valve characteristics of the first valve operator cycle and a difference therebetween.

In Example 31, the subject matter of Example 30 optionally includes wherein the control valve characteristics of the control valve include one or more electrical characteristics of the control valve.

In Example 32, the subject matter of Example 31 optionally includes wherein the control valve includes a coil configured to generate a magnetic flux, and the valve operator is configured to translate with respect to the coil based on the magnetic flux, and the method further comprising: measuring one or more of current through the coil or voltage across the coil as the control valve characteristics.

In Example 33, the subject matter of Example 32 optionally includes determining the control valve is in one or more of the primed state or the unprimed state, including: comparing the current through the coil in the second valve operator cycle to the current through the coil in the first valve operator cycle; and determining a difference between the current through the coil in the second valve operator cycle to the current through the coil in the first valve operator cycle.

In Example 34, the subject matter of Example 33 optionally includes determining the control valve is in the primed state, including: determining if the current through the coil in the second valve operator cycle is greater than the current through the coil in the first valve operator cycle.

In Example 35, the subject matter of Example 34 optionally includes wherein the one or more characteristics of the control valve includes at least one operator transition time corresponding to a time span for the valve operator to translate between the closed position and the open position, and the method further includes: determining the operator transition time based on one or more of the current through the coil or the voltage across the coil.

In Example 36, the subject matter of Example 35 optionally includes determining the control valve is in the primed state, including: comparing the transition time for the valve operator in the second valve operator cycle to the operator transition time in the second valve operator cycle; and determining if the transition time for the valve operator in the second valve is greater than the operator transition time in the first valve operator cycle.

In Example 37, the subject matter of any one or more of Examples 31-36 optionally include determining at least one operator transition time based on the electrical characteristics of the control valve; and wherein the at least one operator transition time corresponds to a time span for the valve operator to translate between the closed position and the open position.

In Example 38, the subject matter of Example 37 optionally includes wherein the valve operator transition time in the second valve operator cycle is greater than the valve operator transition time in the first valve operator cycle.

In Example 39, the subject matter of any one or more of Examples 22-38 optionally include maintaining the valve operator in the closed position if the valve controller determines the control valve is in the primed state.

In Example 40, the subject matter of any one or more of Examples 22-39 optionally include wherein the control valve is repeatedly opened and closed according to one or more duty cycles, and the method includes: repeatedly opening and closing the control valve according to a first duty with the control valve in the unprimed state; and repeatedly opening and closing the control valve according to a second duty cycle with the control valve in the primed state.

In Example 41, the subject matter of any one or more of Examples 22-40 optionally include wherein the control valve is repeatedly opened and closed according to one or more duty cycles, and the method includes: transitioning the control valve between the unprimed state and the primed state; varying the duty cycle of the control valve while transitioning between the unprimed state and the primed state, wherein: the control valve is repeatedly opened and closed according to a first duty cycle while transitioning from the unprimed state to the primed state; and the control valve is repeatedly opened and closed according to a second duty cycle while transitioning from the primed state to the unprimed state.

Example 42 is a system for applying an agricultural product, the system comprising: a plurality of control valves including a first control valve and a second control valve, each of the plurality of control valves including: a moveable valve operator configured to translate between a closed position and an open position; one or more sensors configured to monitor one or more control valve characteristics of individual ones of the plurality of control valves; and a valve controller in communication with the one or more sensors, wherein the valve controller includes: an actuator configured to repeatedly open and close the movable valve operator for the plurality of control valves, wherein agricultural product is delivered to the control valve with the actuator opening and closing the moveable valve operator; a comparator configured to compare of the monitored one or more control valve characteristics to a primed valve characteristic threshold; and wherein the valve controller is configured to determine each of the control valves is in one or more of a primed state or an unprimed state based on the comparison of the one or more control valve characteristics to the primed valve characteristic threshold.

In Example 43, the subject matter of Example 42 optionally includes wherein the valve controller is configured to cascade priming of the plurality of control valves as the valve controller determines control valves of the plurality of control valves are in the primed state.

In Example 44, the subject matter of Example 43 optionally includes wherein: the plurality of control valves are located along a boom of an agricultural sprayer, and the boom extends between a proximal boom end and a distal boom end; and cascading priming of the control valves includes priming each of the control valves in sequence from the proximal boom end to the distal boom end.

In Example 45, the subject matter of Example 44 optionally includes wherein: the first control valve is adjacent to the second valve along the boom; the first control valve is proximal with respect to the second control valve; priming each of the control valves in sequence includes: priming the first control valve; priming the second control valve with the first control valve in the primed state.

In Example 46, the subject matter of any one or more of Examples 43-45 optionally include wherein the valve controller is configured to cascade depriming of the plurality of control valves as the valve controller determines control valves of the plurality of control valves are in the unprimed state.

In Example 47, the subject matter of any one or more of Examples 42-46 optionally include wherein the valve controller is configured to cascade depriming of the plurality of control valves as the valve controller determines control valves of the plurality of control valves are in the unprimed state.

In Example 48, the subject matter of Example 47 optionally includes wherein: the plurality of control valves are located along a boom of an agricultural sprayer, and the boom extends between a proximal boom end and a distal boom end; and cascading depriming of the control valves includes depriming each of the control valves in sequence from the proximal boom end to the distal boom end.

In Example 49, the subject matter of Example 48 optionally includes wherein: the first control valve is adjacent to the second valve along the boom; the first control valve is proximal with respect to the second control valve; depriming each of the control valves in sequence includes: transitioning the first control valve from the primed state to the unprimed state; transitioning the second control valve from the primed state to the unprimed state.

In Example 50, the subject matter of any one or more of Examples 42-49 optionally include wherein: the plurality of control valves includes a first set of control valves and a second set of control valves; the first set of control valves includes the first control valve; the second set of control valves includes the second control valve; the first set of control valves are located along a first boom section of an agricultural sprayer, and the first boom section extends between a first proximal boom end and a first distal boom end; the second set of control valves are located along a second boom section of the agricultural sprayer, and the second boom section extends between a second proximal boom end and a second distal boom end.

In Example 51, the subject matter of Example 50 optionally includes wherein the valve controller is configured to operate the first set of control valves independent of the second set of control valves.

In Example 52, the subject matter of Example 51 optionally includes wherein: the valve controller is configured to maintain the moveable valve operator of one of more of the first set of control valves in the closed position while repeatedly opening and closing the valve operator of one or more of the second set of control valves.

In Example 53, the subject matter of any one or more of Examples 51-52 optionally include wherein: the valve controller is configured to maintain the moveable valve operator of one of more of the first set of control valves in the open position while repeatedly opening and closing the valve operator of one or more of the second set of control valves.

Example 54 is a method of monitoring restriction of flow of a fluid through a nozzle, the method comprising: actuating a control valve to supply fluid to the nozzle, wherein the control valve includes a moveable valve operator configured to translate between a closed position and an open position in a valve operator cycle including at least first and second valve operator cycles; monitoring a first pressure decay at the nozzle corresponding to a first valve operator cycle; comparing the pressure decay at the nozzle between the first valve operator cycle and a blockage detection threshold; and determining the nozzle is in a restricted state or an unrestricted state based on the comparison of the pressure decay relative to the blockage detection threshold.

In Example 55, the subject matter of Example 54 optionally includes issuing a notification if the nozzle transitions from the unrestricted state to the restricted state.

In Example 56, the subject matter of Example 55 optionally includes wherein issuing a notification includes displaying the notification on a screen in a cab of a prime mover.

In Example 57, the subject matter of any one or more of Examples 54-56 optionally include wherein determining the nozzle is in the restricted state or the unrestricted state includes: closing a valve operator of the valve in the first valve operator cycle according to a specified duty cycle; opening the valve operator in a second valve operator cycle, wherein the valve operator in the second valve operator cycle is opened outside the specified duty cycle of valve operator.

In Example 58, the subject matter of Example 57 optionally includes opening the valve operator in a third valve operator cycle according to the specified duty cycle.

In Example 59, the subject matter of any one or more of Examples 54-58 optionally include wherein determining the nozzle is in the restricted state or the unrestricted state includes: closing a valve operator of the valve in the first valve operator cycle; opening the valve operator in the second valve operator cycle, wherein the valve operator is opened within a specified time period after closing the valve operator in the first valve operator cycle.

In Example 60, the subject matter of any one or more of Examples 54-59 optionally include wherein a pressure sensor is in communication with the nozzle and configured to measure pressure at the nozzle, and monitoring the pressure the first pressure decay includes receiving measured pressure at the nozzle.

In Example 61, the subject matter of any one or more of Examples 54-60 optionally include wherein monitoring the first pressure decay includes monitoring one or more valve characteristics.

In Example 62, the subject matter of Example 61 optionally includes wherein the actuating the control valve includes energizing a coil of a solenoid, and the valve characteristics include an electrical characteristic of the coil.

Example 63 may include or use, or may optionally be combined with any portion or combination of any portions of any one or more of Examples 1 through 62 to include or use, subject matter that may include means for performing any one or more of the functions of Examples 1 through 62, or a machine-readable medium including instructions that, when performed by a machine, cause the machine to perform any one or more of the functions of Examples 1 through 62.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for applying an agricultural product, the system comprising:
    a control valve including:
        a moveable valve operator configured to translate between a closed position and an open position;
        one or more sensors configured to monitor one or more control valve characteristics; and
        a valve controller in communication with the one or more sensors, wherein the valve controller includes:
            an actuator configured to repeatedly open and close the valve operator with agricultural product delivered to the control valve;
            a comparator configured to compare the monitored one or more control valve characteristics to a primed valve characteristic threshold; and
            wherein the valve controller is configured to determine the control valve is in one or more of a primed state or an unprimed state based on the comparison of the one or more control valve characteristics to the primed valve characteristic threshold.

2. The system of claim 1, wherein the one or more characteristics of the control valve includes at least one operator transition time corresponding to a time span for the valve operator to translate between the closed position and the open position.

3. The system of claim 2, wherein the operator transition time includes the time span for the valve operator to transition from the closed position to the open position.

4. The system of claim 2, wherein the at least one operator transition time includes:
    a first operator transition time corresponding to the unprimed state; and
    a second operator transition time corresponding to the primed state.

5. The system of claim 4, wherein the second operator transition time is greater than the first operator transition time.

6. The system of claim 4, wherein the primed valve characteristic threshold includes the first operator transition time.

7. The system of claim 2, wherein:
    the primed valve characteristic threshold includes a transition time threshold; and
    the comparator is configured to compare the at least one operator transition time to the transition time threshold.

8. The system of claim 7, wherein the valve controller determines the control valve is in the primed state with the operator transition time exceeding the transition time threshold.

9. The system of claim 1, wherein a valve operator cycle includes movement of the valve operator between the closed and open positions, and wherein:
    the actuator is configured to open the valve operator in a first valve operator cycle;
    the actuator is configured to open the valve operator in a second valve operator cycle;
    the comparator is configured to compare the control valve characteristics of the first and second valve operator cycles;
    the valve characteristic threshold includes the control valve characteristics of the first valve operator cycle; and
    wherein the valve controller is configured to determine the control valve is in one or more of the primed state or the unprimed state based on the comparison of the control valve characteristics of the second valve operator cycle to the control valve characteristics of the first valve operator cycle and a difference therebetween.

10. The system of claim 9, wherein the control valve characteristics of the control valve include one or more electrical characteristics of the control valve.

11. The system of claim 10, wherein:
    the control valve includes a coil configured to generate a magnetic flux,
    the valve operator is configured to translate with respect to the coil based on the magnetic flux; and
    the one or more sensors are configured to measure one or more of current through the coil or voltage across the coil as the control valve characteristics.

12. The system of claim 11, wherein the valve controller is configured to determine the control valve is in one or more of the primed state or the unprimed state based on a comparison of the current through the coil in the second valve operator cycle to the current through the coil in the first valve operator cycle and a different therebetween.

13. The system of claim 12, wherein the valve controller determines the control valve is in the primed state if the current through the coil in the second valve operator cycle is greater than the current through the coil in the first valve operator cycle.

14. The system of claim 11, wherein:
    the one or more characteristics of the control valve includes at least one operator transition time corresponding to a time span for the valve operator to translate between the closed position and the open position; and the controller is configured to determine the operator transition time based on one or more of the current through the coil or the voltage across the coil.

15. The system of claim 14, wherein the valve controller determines the control valve is in the primed state if the transition time for the valve operator in the second valve operator cycle is greater than the operator transition time in the first valve operator cycle.

16. The system of claim 10, wherein:
the valve controller is configured to determine at least one operator transition time based on the electrical characteristics of the control valve; and
the at least one operator transition time corresponds to a time span for the valve operator to translate between the closed position and the open position.

17. The system of claim 16, wherein the valve operator transition time in the second valve operator cycle is greater than the valve operator transition time in the first valve operator cycle.

18. The system of claim 1, wherein the actuator is configured to maintain the valve operator in the closed position if the valve controller determines the control valve is in the primed state.

19. The system of claim 1, wherein:
the control valve includes a fluid chamber configured to receive a fluidic mixture of one or more of a gas or a liquid including the agricultural product;
in the unprimed state, a volume of the gas in the fluid chamber is greater than a volume of the liquid in the fluid chamber; and
in the primed state, the volume of liquid in the fluid chamber is greater than the volume of gas in the fluid chamber.

20. The system of claim 1, wherein:
the control valve includes a fluid chamber configured to receive a fluidic mixture of one or more of a gas or a liquid including the agricultural product;
in the unprimed state, the fluidic mixture in the fluid chamber has a first fluidic composition;
in the primed state, the fluidic mixture in the fluid chamber has a second fluidic composition; and
the second fluidic composition is different than the first fluidic composition.

21. The system of claim 1, further comprising a flushing fluid source in communication with the control valve, wherein:
the flushing fluid source includes a flushing fluid, the flushing fluid is different than the agricultural product; and
the valve controller is configured to supply the flushing fluid to the control valve while repeatedly opening and closing the valve operator to flush the agricultural product from the control valve.

22. A method of priming a control valve, comprising:
delivering an agricultural product to the control valve, the control valve in an unprimed state; and
detecting whether the control valve is in a primed state, detecting including:
repeatedly opening and closing of the control valve while delivering flow of the agricultural product to the control valve, wherein repeatedly opening and closing of the control valve includes moving a valve operator between closed and open positions;

monitoring one or more control valve characteristics while repeatedly opening and closing the control valve;
comparing the monitored control valve characteristics of the valve operator with a primed valve characteristic threshold; and
determining that the control valve is in one or more of the unprimed state or the primed state based on the comparison of the monitored control valve characteristics to the primed valve characteristic threshold.

23. The method of claim 22, wherein the one or more characteristics of the control valve includes at least one operator transition time corresponding to a time span for the valve operator to translate between the closed position and the open position.

24. The method of claim 23, wherein the operator transition time includes the time span for the valve operator to transition from the closed position to the open position.

25. The method of claim 22, wherein a valve operator cycle includes movement of the valve operator between the closed and open positions, the method further comprising:
opening the valve operator in a first valve operator cycle, wherein the valve characteristic threshold includes the control valve characteristics of the first valve operator cycle;
opening the valve operator in a second valve operator cycle;
comparing the control valve characteristics of the first and second valve operator cycles; and
determining the control valve is in one or more of the primed state or the unprimed state based on the comparison of the control valve characteristics of the second valve operator cycle to the control valve characteristics of the first valve operator cycle and a difference therebetween.

26. The method of claim 22, further comprising maintaining the valve operator in the closed position if the valve controller determines the control valve is in the primed state.

27. A system for applying an agricultural product, the system comprising:
a plurality of control valves including a first control valve and a second control valve, each of the plurality of control valves including:
a moveable valve operator configured to translate between a closed position and an open position;
one or more sensors configured to monitor one or more control valve characteristics of individual ones of the plurality of control valves; and
a valve controller in communication with the one or more sensors, wherein the valve controller includes:
an actuator configured to repeatedly open and close the movable valve operator for the plurality of control valves, wherein agricultural product is delivered to the control valve with the actuator opening and closing the moveable valve operator;
a comparator configured to compare of the monitored one or more control valve characteristics to a primed valve characteristic threshold; and
wherein the valve controller is configured to determine each of the control valves is in one or more of a primed state or an unprimed state based on the comparison of the one or more control valve characteristics to the primed valve characteristic threshold.

28. The system of claim 27, wherein the valve controller is configured to cascade priming of the plurality of control valves as the valve controller determines control valves of the plurality of control valves are in the primed state.

29. The system of claim 28, wherein:
the plurality of control valves are located along a boom of an agricultural sprayer, and the boom extends between a proximal boom end and a distal boom end; and
cascading priming of the control valves includes priming each of the control valves in sequence from the proximal boom end to the distal boom end.

30. The system of claim 29, wherein:
the first control valve is adjacent to the second valve along the boom;
the first control valve is proximal with respect to the second control valve; and
priming each of the control valves in sequence includes:
priming the first control valve;
priming the second control valve with the first control valve in the primed state.

31. The system of claim 27, wherein:
the plurality of control valves includes a first set of control valves and a second set of control valves;
the first set of control valves includes the first control valve;
the second set of control valves includes the second control valve;
the first set of control valves are located along a first boom section of an agricultural sprayer, and the first boom section extends between a first proximal boom end and a first distal boom end; and
the second set of control valves are located along a second boom section of the agricultural sprayer, and the second boom section extends between a second proximal boom end and a second distal boom end.

* * * * *